United States Patent [19]

Musch

[11] 4,009,379
[45] Feb. 22, 1977

[54] PORTABLE PROGRAMMABLE CALCULATOR DISPLAYING ABSOLUTE LINE NUMBER ADDRESSES AND KEY CODES AND AUTOMATICALLY ALTERING DISPLAY FORMATS

[75] Inventor: Bernard E. Musch, Palo Alto, Calif.

[73] Assignee: Hewlett-Packard Company, Palo Alto, Calif.

[22] Filed: Dec. 16, 1974

[21] Appl. No.: 533,430

[52] U.S. Cl. .............................. 235/156; 340/172.5
[51] Int. Cl.² ........................................ G06F 15/04
[58] Field of Search .......... 235/156, 159, 160, 164; 340/172.5

[56] References Cited

UNITED STATES PATENTS

| | | | |
|---|---|---|---|
| 3,588,841 | 6/1971 | Ragen | 340/172.5 |
| 3,594,734 | 7/1971 | Wang | 340/172.5 |
| 3,693,162 | 9/1972 | Spangler | 340/172.5 |
| 3,760,171 | 9/1973 | Wang et al. | 235/156 |
| 3,839,630 | 10/1974 | Olander et al. | 235/156 |

*Primary Examiner*—David H. Malzahn
*Attorney, Agent, or Firm*—Theodore S. Park

[57] ABSTRACT

A battery-powered hand-held programmable calculator for performing arithmetic, trigonometric and logarithmic functions and displaying the results thereof is provided with the capability of being fully programmable including branching based on data value. Absolute line number addressing is provided. Program line numbers and the key code associated with an executable step are displayed. The top of the programmable memory is configured as a nonexecutable line corresponding to an automatic stop and all other programmable lines are initially programmed upon start up as being an automatic branch to the top of the memory. Key codes representing a plurality of actuated keys corresponding to a branch instruction are merged to require only one program line in memory.

21 Claims, 7 Drawing Figures

PORTABLE PROGRAMMABLE CALCULATOR DISPLAYING ABSOLUTE LINE NUMBER ADDRESSES AND KEY CODES AND AUTOMATICALLY ALTERING DISPLAY FORMATS

BACKGROUND OF THE INVENTION

This invention relates generally to calculators and more particularly to programmable electronic calculators in which keyboard operations become program instructions. In this particular type of calculator no special language is required. When a key is pressed one program step is completed. Programmable electronic calculators generally utilize memories which enable them to store instructions and data for repetitive and iterative solution. In order to enter the program into memory the user depresses the calculator keys in a given sequence. The result of each sequence step may be displayed for the convenience of the user as he progresses through his calculation. The key code for each program step may also be displayed. Key codes generally are alphanumeric representations of the keys on the keyboard. If the user wishes to modify or edit his program after initial entry into memory he must precisely determine to which key he should return in order to implement the change. To make that determination for calculators constructed according to the prior art, the user had to refer to a separate machine unique association table and a program to determine the specific key to depress relative to a particular program step.

For programming convenience key codes and program line numbers should be easily interpreted by a user. An object of this invention is to improve the ease of program debugging and editing by introducing a programmable calculator which displays a key position on the keyboard and absolute program line numbers. A further object of this invention is to provide a calculator having a convenient way for a user to get to the top of memory and eliminate the need for an AND key or a RETURN key. The invention provides a programmable calculator having preprogrammed branch instructions to the top of memory.

A further object of this invention is to provide a calculator wherein a user can program a branch instruction to another place in the program by merely actuating a single key and entering a line number address of the branch destination. Another object is to increase the utilization of available program memory by merging key codes representing a plurality of actuated keys corresponding to a branch instruction.

A further object is to provide an improved error display wherein the invention displays and flashes the contents of a register within an operational stack.

Another object is to provide an improved display wherein the invention automatically changes its format when in underflow or overflow.

DESCRIPTION OF THE PREFERRED EMBODIMENT

Figure 1:
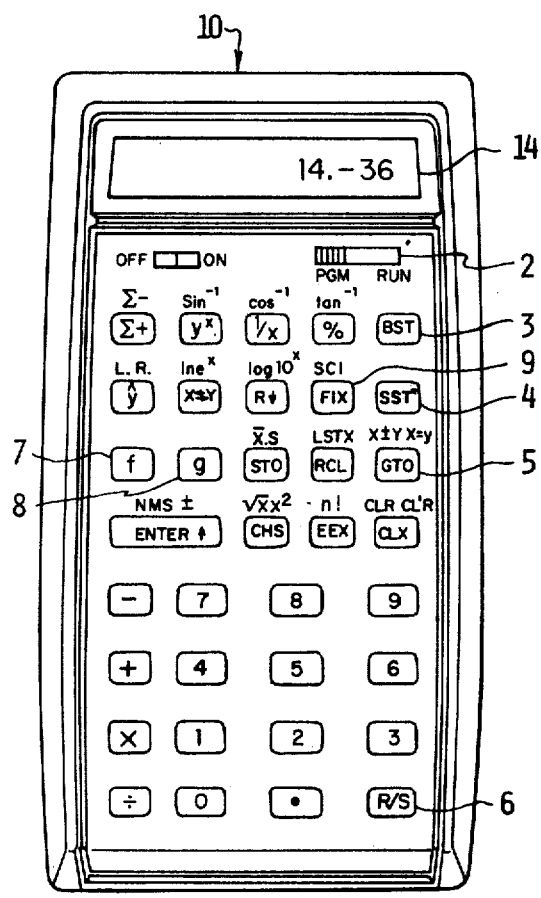
FIG. 1 is a front view of a calculator according to the preferred embodiment of the present invention.
Figure 2:
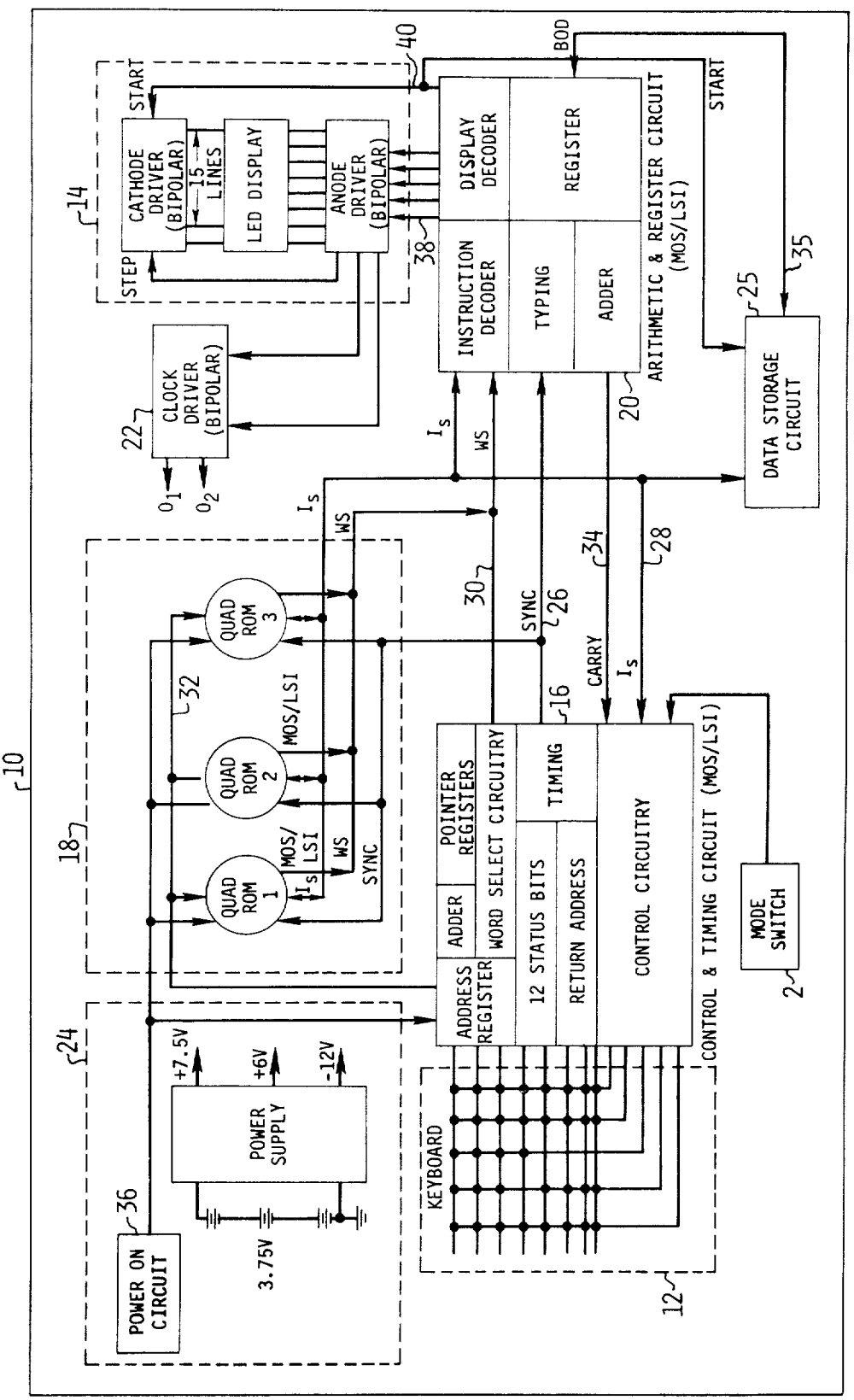
FIG. 2 is a block diagram of the calculator of FIG. 1.

Referring to FIGS. 1 and 2, there is shown a pocket-size electronic calculator 10 including a keyboard input unit 12 for entering data and instructions into the calculator and a seven-segment LED output display unit 14 for displaying each data entry and the results of calculations performed by the calculator. As shown in FIG. 2, calculator 10 also includes an MOS control and timing circuit 16, an MOS read-only memory circuit 18 (including QUAD ROM's 1, 2 and 3), an MOS arithmetic and register circuit 20, a bipolar clock driver 22, a solid state power supply unit 24, and MOS auxiliary data storage circuit 25.

The MOS circuits are two-phase dynamic MOS/LSI circuits with low thresholds allowing compatibility with TTL bipolar circuits and allowing extremely low-power operation (less than one hundred milliwatts for all three circuits). They are organized to process fourteen-digit BCD words in a digit-serial, bit-serial manner. The maximum bit rate or clock frequency is 196 kilohertz, which gives a word time of 280 microseconds (permitting a floating point addition to be completed in 60 milliseconds).

Figure 3:
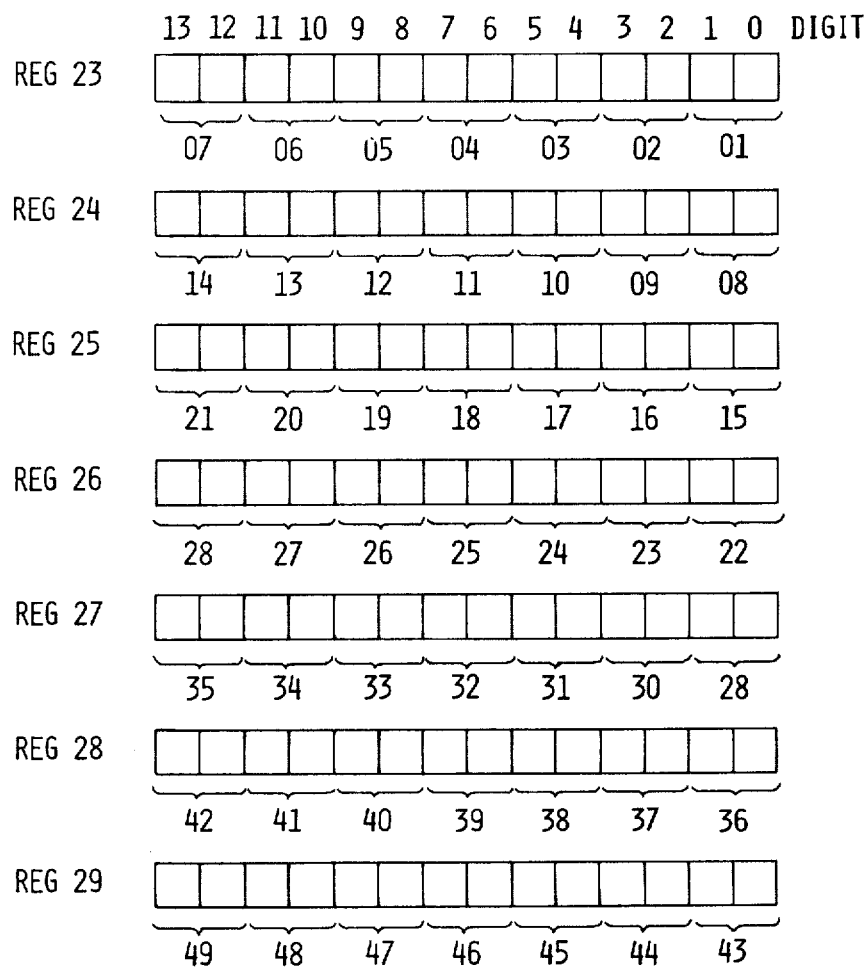
FIG. 3 is a representation of the contents of seven storage registers used as a program memory in the calculator of FIG. 1.

Control and timing circuit 16, read-only memory circuit 18, arithmetic and register circuit 2, and data storage circuit 25 are tied together by a synchronization (SYNC) bus 26, an instruction ($I_s$) bus 28, a work select (WS) but 30, an instruction address ($I_a$) line 32, and a carry line 34. All operations occur on a fifty-six bit ($b_0$–$b_{55}$) word cycle (fourteen four bit BCD digits). The timing sequence for the interconnecting busses and lines 26–34 are as shown in FIG. 3 of U.S. Pat. No. 3,863,060 filed Oct. 30, 1972, entitled "General Purpose Calculator with Capability for Performing Interdisciplinary Business Calculations" by France Rode, et al.

The SYNC bus 26 carries synchronization signals from control and timing circuit 16 to QUAD ROMS 1, 2 and 3 in read-only memory circuit 18 and to arithmetic and register circuit 20 to synchronize the calculator system. It provides one output each word time. This output also functions as a tenbit wide window ($b_{45}$–$b_{54}$) during which $I_s$ bus 28 is active.

The $I_s$ bus 28 carries ten-bit instructions from the active QUAD ROM in the read-only memory circuit 18 to the other QUAD ROM's, control and timing circuit 16, arithmetic and register circuit 20, and auxiliary data storage circuit 25, each of which decodes the instructions locally and responds to or acts upon them if they pertain thereto and ignores them if they do not. For example, the ADD instruction affects arithmetic and register circuit 20 but is ignored by control and timing circuit 16. Similarly, the SET STATUS BIT 5 instruction sets a status flip-flop in control and timing circuit 16 but is ignored by arithmetic and register circuit 20.

The actual implementation of an instruction is delayed one word time from its receipt. For example, an instruction may require the addition of digit 2 in two of the registers in arithmetic and register circuit 20. The ADD instruction would be received by arithmetic and register circuit 20 during bit times $b_{45}-b_{54}$ of word time N and the addition would actually occur during bit times $b_8-b_{11}$ of word time N+1. Thus, while one instruction is being executed the next instruction is being fetched.

The WS bus 30 carries an enable signal from control and timing circuit 16 or one of the QUAD ROM's in a read-only memory circuit 18 to arithmetic and register circuit 20 to enable the instruction being executed thereby. Thus, in the example of the previous paragraph, addition occurs only during digit 2 since the adder in the arithmetic and register circuit 20 is enabled by WS bus 30 only during this portion of the word. When WS bus 30 is low, the contents of the registers in arithmetic and register circuit 20 are recirculated unchanged. Three examples of WS timing signals are shown in FIG. 3 of prior filed, commonly owned and allowed U.S. Pat. Ser. No. 3,863,060. In the first example, shown in said patent application, digit position 2 is selected out of the entire word. In the second example, the last eleven digits are selected. This corresponds to the mantissa portion of a floating point word format. In the third example, the entire word is selected. Use of the word select feature allows selective addition, transfer, shifting or comparison of portions of the registers within arithmetic and register circuit 20 with only one basic ADD, TRANSFER, SHIFT, or COMPARE instruction. Some customization in the QUAD ROM word select fields is available via masking options.

The $I_a$ line 32 serially carries the addresses of the instructions to be read from the QUAD ROM's. These addresses originate from control and timing circuit 16, which contains an instruction address register that is incremented each word time unless a JUMP SUBROUTINE or a BRANCH instruction is being executed. Each address is transferred to ROM's during bit times $b_{19}-b_{26}$ and is stored in an address register of each ROM. However, only one QUAD ROM is active at a time, and only the active QUAD ROM responds to an address by outputting an instruction on the $I_s$ line 28.

The carry line 34 transmits the status of the carry output of the adder in arithmetic and register circuit 20 to control and timing circuit 16. The control and timing circuit uses this information to make conditional branches, dependent upon the numerical value of the contents of the registers in arithmetic and register circuit 20.

A BCD input/output line 35 interconnects data storage circuit 25 and the C register of arithmetic and register circuit 20. This line always outputs the contents of the C register of arithmetic and register circuit 20 unless a specific instruction to input to the C register of the arithmetic and register circuit is being executed.

Control and timing circuit 16 is organized to scan a five-by-eight matrix of switches in search of an interconnection that designates actuation of a key. Any type of metal-to-metal contact may be used as a key. Key bounce problems are overcome by programmed lockouts in the key entry routine. Each key has an associated six-bit code.

A power on circuit 36 in power supply unit 24 supplies a signal forcing the calculator to start up in a known condition when power is supplied thereto. Power is supplied to the calculator when the on-off switch of keyboard input unit 12 (see FIG. 1) is moved to the ON position.

The primary outputs of the calculator are five output lines 38 connected between a display decoder of arithmetic and register circuit 20 and an anode driver of output display unit 14. Data for a seven-segment display plus a decimal point is time-multiplexed onto these five output lines. A start line 40 is connected from the display decoder of arithmetic and register circuit 20 to the auxiliary data storage circuit 25 and a cathode driver of output display unit 14 and indicates when the digit 0 occurs.

A mode switch 2 is provided having a program and a run position. When switch 2 is in program position, an input line to the control and timing circuit 16 is grounded. This sets one of the 12 internal status bits. The status of this status bit is interrogated by the microprocessor and the key code which has been generated is either stored in the appropriate location in digital storage circuit 25 or decoded and executed by arithmetic and register circuit 20.

The Control and Timing Circuit 16, Read Only Memory Circuit 18, Arithmetic and Register Circuit 20, Clock Driver 22, Display Unit 14, Keyboard 12, LED Display, Selected Instruction Sets and their operation are described in detail in commonly owned, and allowed U.S. Pat. Ser. No. 3,863,060 entitled "General Purpose Calculator with Capability for Performing Interdisciplinary Business Calculations" filed on Oct. 30, 1972, by France´ Rode´, et al. Said patent is fully incorporated herein by reference.

Referenced U.S. Pat. Ser. No. 3,863,060 describes a nonprogrammable business calculator having seven registers A-F and M, as shown for example in FIG. 11 of said patent. In contrast, the preferred embodiment of the instant application has 37 56-bit registers. Each of these registers is capable of containing 14 BCD digits. The 37 registers (A-F, M, and 30 storage registers) can be divided into four groups: the working registers A, B and C with C also being the bottom register of a four register operational stack; the next three registers D, E and F in the stack; 30 separate storage registers within data storage 25 and the M register which is put to use to maintain status information in addition to that maintained by 12 status bits internal to the control and timing circuit 16. The structure and operation of a stack formed by registers C, D, E and F are fully described in reference U.S. Pat. Ser. No. 3,863,060 and further described in U.S. Pat. No. 3,781,820 entitled PORTABLE ELECTRONIC CALCULATOR filed on May 30, 1972, by David S. Cochran, et al. and issued on Dec. 25, 1973. Registers C, D, E and F represent an operational stack. Registers A and B are the working registers throughout which various algorithms are implemented. The A and B registers also provide the information which is decoded into signals for the display drivers of display unit 14. The M register is of the same structure as the single storage register employed in U.S. Patent Application Ser. No. 3,863,060 but in the preferred embodiment the data storage registers within data storage circuit 25 provide ample supplementary storage and the M register manages status information in addition to that maintained by 12 status bits internal to Control and Timing Circuit 16. The M register stores information such as which angular format is in effect, which display format is in effect and the state of programming affairs, for example, whether the function is being executed from the keyboard as a result of executing a run stop command or as a result of a single step instruction as further described hereinafter. Digit positions 4 and 3, the least significant mantissa digits of the M register, contain the two digits of the current line number of program memory.

Referring to FIG. 3 there is shown a representation of the contents of seven registers 23 through 29 within data storage 25. If a key other than BST 3, SST 4, or GTO 5 is pressed, a microprogram stored in ROM 18 transfers control to a portion of the read-only memory which generates a two digit key code which is built up into the exponent field of the C register. These key codes match the matrix location of the key on the keyboard. An indexing scheme for directly associating displayed key codes with the physical position of non-numeric or the identity of digit keys contained on a key-board is fully described in U.S. Pat. No. 3,855,461 entitled CALCULATOR WITH KEY CODE ASSOCIATION AND DISPLAY FEATURES by Richard Kent Stockwell, et al. issued on Dec. 17, 1974. In the preferred embodiment the key codes generally match the matrix location of the key on the keyboard in a row-column configuration. The key code list for the preferred embodiment is:

| Key | Key Code | Key | Key Code |
|---|---|---|---|
| Σ+ | 11 | − | 48 |
| $y^x$ | 12 | + | 38 |
| 1/x | 13 | × | 28 |
| % | 14 | ÷ | 18 |
| $\wedge y$ | 21 | . | 16 |
| x ⇄ y | 22 | R/S | 15 |
| R ↓ | 23 | 0 | 00 |
| FIX | 24 | 1 | 01 |
| f | 31 | 2 | 02 |
| g | 32 | 3 | 03 |
| STO | 33 | 4 | 04 |
| RCL | 34 | 5 | 05 |
| ENTER ↑ | 41 | 6 | 06 |
| CHS | 42 | 7 | 07 |
| EEX | 43 | 8 | 08 |
| CLX | 44 | 9 | 09 |

The f and g keys are prefix keys whose function is as described in referenced U.S. Pat. No. 3,855,461.

Exceptions to the row-column matrix key code are the digit keys which have key codes matching the digit and the keys −, +, ×, ÷, ., and R/S key 6.

Figure 4:
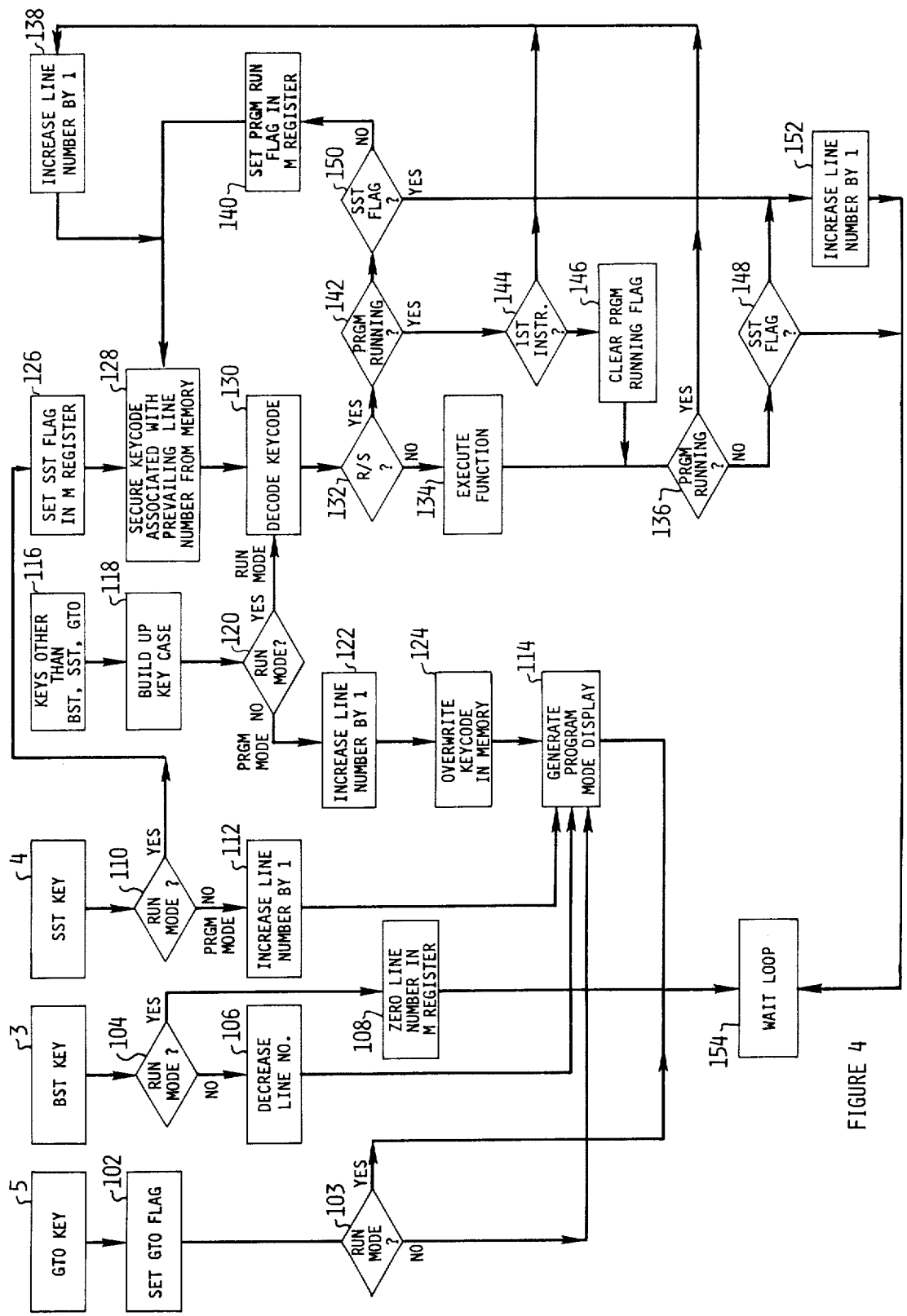
FIG. 4 shows a flow diagram for the programming features of the calculator of FIG. 1.

Following the build up of the key code the position of multi-position switch 2 is implemented by a microcode in ROM 18 and the flow of the program is as shown in FIG. 4.

Referring to FIG. 4, in the routine to display the key codes, the nines complement of the key code is taken before it is displayed if the least significant digit is greater than or equal to 5 and the most significant digit is not equal to 0. This maintains the matrix row-column rule and key codes 50-99 are reserved for merged GO TO's as described hereafter.

Figure 5:
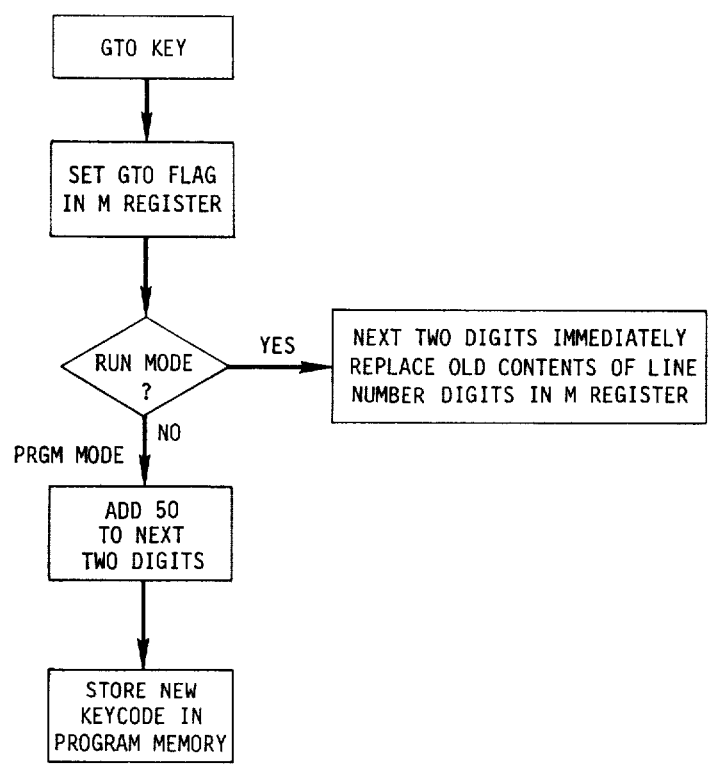
FIG. 5 shows a flow diagram for implementing branch instructions in the calculator of FIG. 1.

Referring to FIG. 5, a flag is set and the next two digits which are pressed become the destination of a branch instruction in a program when the GO TO key 5 is pressed. If switch 2 is in a run position these two digits immediately replace the old line number digits stored in the M register. If switch 2 is in a program position, 50 is added to the two digits and the new key code is placed in program memory. For example GO TO 00 has key code 50; GO TO 05 has key code 55; GO TO 46 has key code 96; etc.

The routine to display the key codes subtracts 50 from the key code and supplements the display by lighting a minus sign in the exponent sign field if the most significant digit is greater than or equal to 5, thereby indicating a branch instruction with the minus sign.

In the process of decoding a key code, if 1 has been subtracted from the tens digit 5 times and a carry has not been detected, the key code is a GO TO and the remaining key code is the destination line number which immediately replaces the old line number digits in the M register.

Referring to FIG. 4, the program is begun by setting status information in the M register by actuating the R/S key 6 from the keyboard. The key code associated with the prevailing line number is secured from program memory, placed in the exponent field of the M register and the function is decoded and executed.

When the SST key 4 is pressed a flag is set in the M register. If switch 2 is in program position, the line number is increased by one and control branches to a routine which generates the program mode display. Only the key code associated with the prevailing line number is executed if switch 2 is in run mode.

The line number is decreased by one and control branches to the routine which generates the program mode display when the BST key 3 is pressed while switch 2 is in the program position. If switch 2 is in run mode the line number in the M register is zeroed. This enables a user to transfer control to line 00 by pressing only one key while in the run mode.

Whenever a line number becomes 50 or 99 by adding 1 to 49 or subtracting 1 from 00, it is readjusted to 00 by the program. Also any time program control is transferred to line 00 in a running program, program execution stops.

Each state of program memory contains a 50 when the calculator is turned on, representing a GO TO 00. This enables a user upon keying in a simple program to have control automatically branch to line 00 after completion of the last program step. The program stops and is ready to be run again. This precludes the requirement for an END key or a RETURN key or some other program terminator key.

Referring to FIG. 1, a user programs a conditional branch instruction by actuating an f key 7 or a g key 8 from the keyboard. Status bits generated by actuating an f key 7 or a g key 8 create flags which preclude the calculator from completing a branch if conditions corresponding to the key actuated are not met. For example, actuation of the f prefix key 7 followed by actuation of GTO key 5 corresponds to X less than or equal to Y and actuation of the g prefix key 8 followed by actuating GTO key 5 corresponds to X = Y. The branch will be completed only if a condition indicated is true. When the condition is not true, the line number indexes by one if the calculator is executing a program or if a user is actuating a single step series. If a conditional branch is attempted from the keyboard and the condition is not true, then the line number remains unchanged.

A user begins to program the calculator by sliding the switch 2 to PRGM. A user will see 00. in the display.
Pressing SST key 4 displays 01. −00
Pressing SST key 4 again displays 02. −00

Pressing (SST) key 4 again displays 03. –00 The number on the left is a program step number (or line number). SST stands for single step, and by repeatedly pressing SST key 4 a user steps through the contents of the program memory one line at a time.

Pressing (BST) key 3 displays 02. –00

Pressing (BST) key 3 again displays 01. –00

Pressing (BST) key 3 again displays 00. BST stands for backstep.

The preferred embodiment has fifty addressable line numbers labeled 00. to 49. If the first digit of the GTO address is 5 or greater, the GTO is ignored.

All lines initially have -00 in them except line 00 since the –00 is the actual program instruction contained in each line. Line 00. is the "top of the memory", and as such cannot contain an instruction. A user can easily transfer control to line 00. with the GTO (GO TO) key 5.

Assume a user wishes to write a program that computes the length of the hypotenuse of a right triangle using the Pythagorian Theorem. The theorem says that $C^2 = a^2 + b^2$ or $c = \sqrt{a^2 + b^2}$. The user translates this formula into keystrokes taking advantage of the operational stack.

Referring to FIG. 1 and assuming that a and b are in the X and Y registers, the correct keystrokes are $\left.\begin{array}{c}g\\CHS\end{array}\right\} x^2$ $x \rightleftarrows y$ $\left.\begin{array}{c}g\\CHS\end{array}\right\} x^2$ $+$ $\left.\begin{array}{c}f\\CHS\end{array}\right\} x$ The f and g keys actuated in this sequence perform the function of prefix keys as fully described in commonly owned U.S. Patent Application Ser. No. 425,341 entitled "Calculator Having Merged Key Codes" filed on Dec. 17, 1973, by Thomas E. Osborne, et al.

A user keys these steps in the program memory with the switch in PRGM mode and the program pointer (line number in the display) at 00.

| Key Depressed | Display |
|---|---|
| Press g | 01. 32 |
| Press CHS | 02. 42 |
| Press x ⇄ y | 03. 22 |
| Press g | 04. 32 |
| Press CHS | 05. 42 |
| Press + | 06. 61 |
| Press f | 07. 31 |
| Press CHS | 08. 42 |

The numbers 32, 42, etc., following the displayed line number are the two digit key codes associated with the series of keys pressed: 32 for (g), 42 for (CHS), etc. A user easily makes the association by locating the key on the keyboard assuming that the code is rc (row column) as hereinbefore described. In other words, (g) is 32, third row (from the top), second column (from the left). The exception to this rule is the digit keys, which have the code 0d (d = digit), 0 is 00, 1 is 01, etc.

A user terminates the program with a (R/S). Pressing (R/S) displays 09. 84.

R/S stands for RUN/STOP. When pressed from the keyboard (in RUN mode) the program begins running. When the R/S key code is encountered in a running program, the program stops, and the calculator displays the contents of the X register. When R/S is pressed program execution begins with the line at which the program pointer is located.

A user knows where the program pointer is by switching to PRGM. For example, by switching to PRGM 09. 84. is displayed thereby indicating the program pointer is at line 09. To execute the program a user must get to the top of memory. By switching to RUN and pressing (GTO) (0) (0), keying in some data, as, for example, 3 (ENTER ↑) 4 and pressing (R/S) a user will see 5.00, the hypotenuse of a 3-4-5 right triangle.

displaying, respectively, the line where the program stopped and where the point currently is.

If a user wants to run the program again he must get to top of memory again. Flipping to RUN, pressing (GTO) (0) (0), keying in new data, 5 (ENTER ↑) 12 (R/S) a user sees 13.00, the hypotenuse of a 5-12-13 right triangle.

A user does not have to press (GTO) (0) (0) every time he wants to run a program with new data. Using the (GTO) key is only one way of doing it. Another way is to press (BST) in RUN mode. Pressing BST in run mode does two things:

b. It clears any prefix keys which may have been pressed.

This is convenient, if, for example, a user has inadvertently pressed a prefix key. The easiest way of getting back to the top of program memory after a user has finished executing is to include a programmed (GTO) (0) (0) instruction at the end of the program and let the program move the pointer.

When a program is keyed into the calculator the contents of each line are replaced with a new key code one line at a time, each key code being placed into a line one line downstream from the one in the display when a key is pressed so a user can see each step as he keys in his program.

Therefore, in order to change, for example, line 37 a user presses (GTO) (3) (7) in RUN mode. By flipping switch 2 to PRGM, 37.–00 is displayed. To change line 37 to a R/S, for example, (R/S) is pressed and 37. 84. is displayed. If a user wishes to change the program to transfer control to line 37 after it has computed the hypotenuse example given hereinabove, for example he does the following:

Flips to RUN. Presses (GTO) (0) (9).

Flips to PRGM. Sees 09. 84, the old R/S instruction.

Presses (BST) and sees 08. 42.

To make line 09 a GTO 37, a user presses (GTO) and sees 09 – presses (3) and sees 09 –3 presses (7) and sees 09 –37

Line 09 now contains the complete 3 KEYSTROKE instruction GTO 37. The sign indicates that the instruction is a GO TO and the 37 is the line number of the destination.

The -00's originally observed are one line GTO 00 instructions. When a user first turns the calculator on every instruction is a GTO 00. When a user writes his first program, the last line will always be followed by a GO TO 00. This transfers control to the top of memory automatically.

Executing line 00. in a program causes the calculator to stop. Line 00. acts as if it has a permanent R/S instruction programmed in it.

The program example as now written computes a hypotenuse, jumps to line 37, and stops (because line 37 contains a R/S).

To change the GTO 37 in line 09 to GTO 00 a user switches to RUN, presses (GTO)(0)(8), switches to PRGM, presses GTO (0)(0)and sees 09. -00. A user runs his program as many times as he wants with fresh data just by keying in data,(R/S), data,(R/S), data(R/S), etc.

With switch 2 in RUN mode program execution always begins with the number at which the pointer is pointing unless the program step contained in this line is a R/S (84). In that case execution begins at the next line so a user can program a R/S into his program, for purposes of new data entry or to review intermediate calculations, and then get started again by pressing R/S. This exception also applies to line 00.

A user can single step through his program in RUN modes. Assume a user is at the top of program memory (line 00). A user can key in some new data and single step through as follows:

Key in 9(ENTER↑)12.
Press(SST)See 12.00 A user moves to 01.
Press(SST)See 12.00 A user executes (g)
Press(SST)See 144.00 A user executes $x^2$ ((g)(CHS))
Continue pressing SST see
9.00
9.00
81.00
225.00
225.00
15.00

15.00 is the answer and the program pointer is at line 09. One more(SST)will execute line 09. -00. A user is now at line 00.

The activities of the calculator in PRGM modes may be summarized. Pressing(SST)will increment the program pointer and display that line number and key code. If the pointer is at line 00, pressing BST will leave it at line 00.

Pressing any other key but GTO will cause the pointer to increment, the key code associated with that key to be stored in program memory at the incremented line, and that line and key code to be displayed. If the program pointer is at line 49 when a new key is pressed, the pointer moves to line 00 and the new key is ignored.

Pressing(GTO)does NOT move the program pointer, but the step number in the display WILL increment and only the - sign will light in the key code field.

If the(GTO)is followed by legitimate digit keys (i.e., 23, 47,00) these digits will light in the key code field one at a time and only then will the program pointer increment, storing the merged GO TO statement into memory. If the(GTO)is followed by an illegitimate key (i.e., 5, R↓ EEX), the GTO is ignored and the key code for the subsequent key is stored in program memory and displayed.

The calculator can be commanded to perform a requested GO TO only if a certain relational condition between the contents of the X and Y registers is true. The allowable conditions are x < y and x = y. If the GTO is immediately preceded by an (f)(either from the keyboard or from the prior step in program memory) the GTO will only be performed if x is equal to or less than y. Likewise if the GTO is immediately preceded by a (g), the GTO will only be performed if x is equal to y.

As an example of this, the following is a program which will order the contents of the operational stack so that the largest number is in T, next largest in Z, next in Y, and smallest in X.

| 00.      | 11. 4    | 22. 3      | 33. GTO 12 |
|----------|----------|------------|------------|
| 01. STO  | 12. RCL  | 23. GTO 12 | 34. RCL    |
| 02. 1    | 13. 4    | 24. RCL    | 35. 1      |
| 03. R↓   | 14. RCL  | 25. 2      | 36. f      |
| 04. STO  | 15. 3    | 26. f      | 37. GTO 00 |
| 05. 2    | 16. f    | 27. GTO 34 | 38. STO    |
| 06. R↓   | 17. GTO 24 | 28. STO  | 39. 2      |
| 07. STO  | 18. STO  | 29. 3      | 40. R↓     |
| 08. 3    | 19. 4    | 30. R↓     | 41. STO    |
| 09. R↓   | 20. R↓   | 31. STO    | 42. 1      |
| 10. STO  | 21. STO  | 32. 2      | 43. GTO 12 |

If an illegal operation is attempted in a running program, the calculator will stop execution, the contents of the X register will flash and the program pointer will remain at the line number which contains the illegal operation.

There are 4 ways that a running program will stop execution.
1. Encountering a R/S after the first executed line.
2. Transferring program control to line 00, either by executing a GTO 00 or flowing through line 49.
3. Encountering an illegal operation as described hereinafter.
4. If the user presses any key during execution which is handy if a user gets caught in an endless loop.

Illegal operations include, for example:
1. Pressing ÷ with $x = 0$.
2. Pressing (1/x) with $x = 0$.

The contents of the x register is flashed, which in general is the illegal argument causing the error. The calculator restores the stack and the data storage registers to their conditions before the illegal operation was attempted. A user presses any key to stop the flashing.

Two digits are displayed to the right of the decimal point when a user switches on the calculator even though numbers are always maintained internally to ten significant digits.

Referring to FIG. 1, a user specifies a fixed decimal display by actuating FIX key 9 followed by a digit key 0-9. A user specifies scientific notation display by actuating prefix key f 7 and a digit key 0-9 that determines the number of digits displayed to the right of the decimal point.

Figures 6A, 6B:
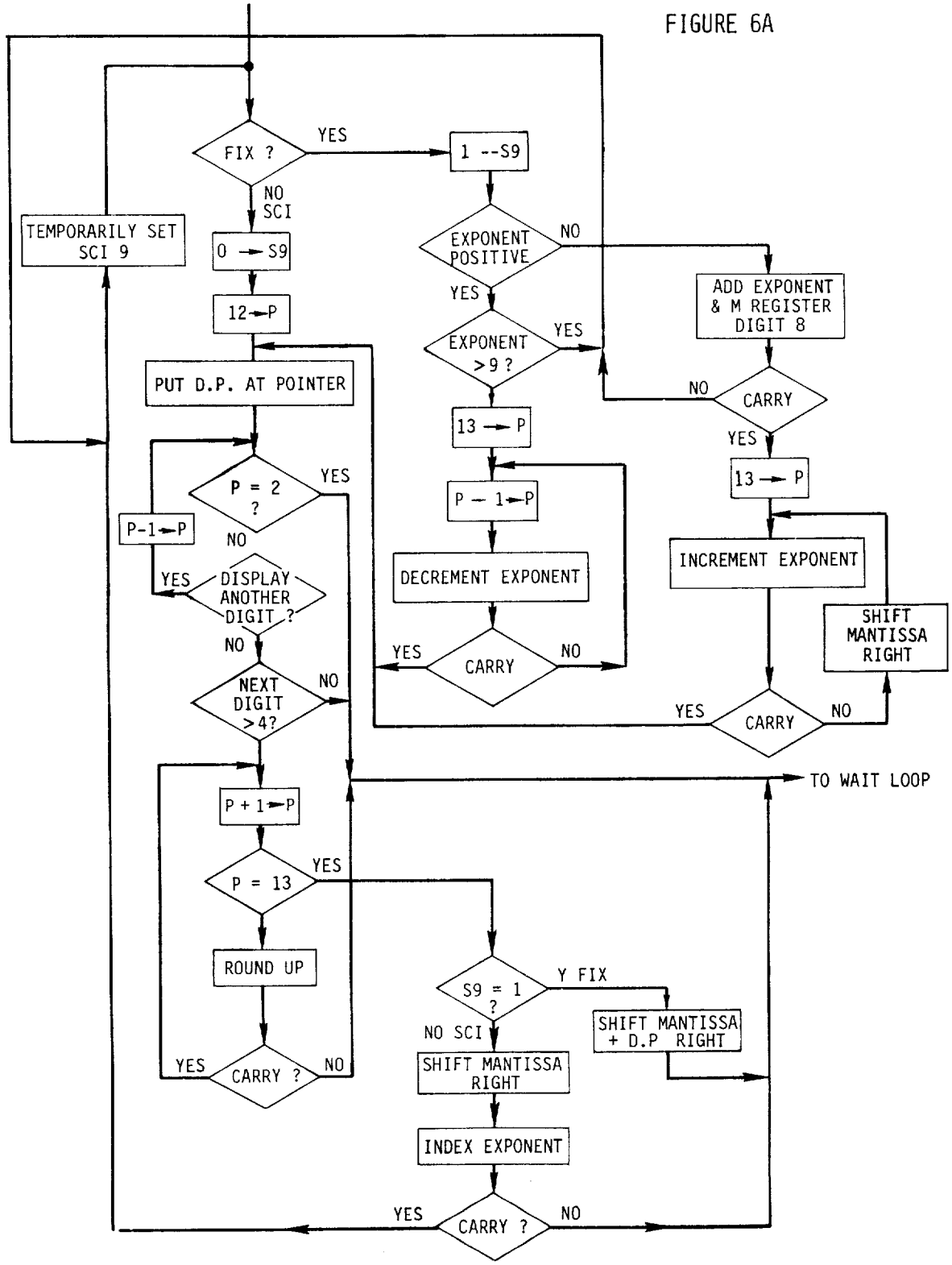
FIGS. 6A and 6B illustrate a number to be displayed in normalized form and a flow diagram of a display generating routine providing an automatic change in display format.

Referring to FIG. 6B a flow diagram for implementing display format is shown. If a number is too large or too small for a "FIX" format specified by a user, the calculator automatically displays the number in scientific notation displaying 10 significant digits. Values having a magnitude greater than or equal to ±9.999999999 × 10$^{99}$ are approximated by ±9.999999999 × 10$^{99}$. Values having a magnitude less than 10$^{-99}$ are approximated by zero.

Referring to FIG. 6A, the number to be displayed is shown in normalized form, 14 bits representing sign, matissa and magnitude. Referring to FIG. 6B, a flow chart of the display generating routing assumes a number to be displayed is in this normalized form and has a decimal point between digits eleven and twelve. The exponent in 10's complement form is in digit positions 0, 1, 2 and the sign is in digit position 13, 0 being + and 9 being −.

The number of digits to be displayed to the right of the decimal point (0-9) is stored in the M register digit position 6. A "0" is in digit position 7 if the calculator is in a fixed point format and a "1" is in digit position 7 if the calculator is in a scientific notation format.

A listing of routines and subroutines of instructions employed by the calculator and of all of the constants employed by these routines and subroutines is given below. Listings for implementing additional features are shown in referenced U.S. Pat. Ser. No. 3,863,060 and in U.S. Pat. Application Ser. No. 364,570 entitled "Improved Scientific Calculator" filed May 29, 1973, by Peter D. Dickinson, et al.

Routines, subroutines, and constants are stored in QUAD ROM's 1 through 3 of ROM 18. Each line in each QUAD ROM is separately numbered in the first column from the left-hand side of the page. This facilitates reference to different parts of the listing. Each address in QUAD ROM's 1, 2 and 3 is represented in octal form by five digits in the second column from the left-hand side of the page. The first two digits identify which QUAD ROM and the next three digits represent an eight-bit address. QUAD ROM 1 is identified by the first two digits being 00, 01, 02, or 03; QUAD ROM 2 is identified by the first two digits being 04, 05, 06, or 07, and QUAD ROM 3 is identified by the first two digits being 10, 11, 12 or 13. The instruction or constant stored in each address of QUAD ROM's 1, 2 and 3 is represented in binary form in the third column from the left-hand side of the page. Branching addresses are represented in octal form by four digits in the fourth column from the left-hand side of the page. Explanatory comments are given in the remaining columns.

```
  0   L00000;  .1.11111.1   -> L0137              JSB START
  1   L00001;  1.1111.1..            *****  MPY    ; DELAYED SELECT ROM 5
  2   L00002;  .1..111111   -> L0117                 GO TO 0117
  3   L00003;  .1.111.1..            *****  STOY   ; DELAYED SELECT ROM 2
  4   L00004;  .1111.1111   -> L0173                 GO TO 0173
  5   L00005;  .1.1...1..                   TTX    ; 1 -> S5
  6   L00006;  11.....11..                  ETX    ; 12 -> P
  7   L00007;  .1...1...    -> L2010   *****        SELECT ROM 2
  8   L00010;  .1111...1.                   START0;  C + 1 -> C[P]
  9   L00011;  1..11..1.1   -> L0231                 JSB CLR5
 10   L00012;  11....11..                            12 -> P
 11   L00013;  .1.1.11...                   START3; LOAD CONSTANT 5
 12   L00014;  .....11...                   START2; LOAD CONSTANT 0
 13   L00015;  111.1.11..                            IF P # 14
 14   L00016;  ....1.1111   -> L0013                   THEN GO TO START3
 15   L00017;  111.1.111.                            A EXCHANGE C[W]
 16   L00020;  .1....111.                            SHIFT LEFT A[W]
 17   L00021;  11....11..                            12 -> P
 18   L00022;  ..1..11...                            LOAD CONSTANT 2
 19   L00023;  ...11.11...                           LOAD CONSTANT 3
 20   L00024;  1.11..11..                            11 -> P
 21   L00025;  ..1....1111  -> L0043                 GO TO START5
 22   L00026;  .1.111...1   -> L0134         LOG    ; JSB STOX
 23   L00027;  .11..1.1..                            IF S6 # 1
 24   L00030;  .....1.111   -> L0005                   THEN GO TO TTX
 25   L00031;  .1.1...1..                   LOG1   ; 1 -> S5
 26   L00032;  1.1....1..                   LN1    ; 1 -> S10
 27   L00033;  1..1...1..                            1 -> S9
 28   L00034;  11....11..                            12 -> P
 29   L00035;  .1.111..1.            *****          DELAYED SELECT ROM 2
 30   L00036;  .....1.11    -> L0002                 GO TO 0002
 31   L00037;  .1.111...1   -> L0134         LN     ; JSB STOX
 32   L00040;  .11...1.1..                           IF S6 # 1
 33   L00041;  .....11.11   -> L0006                   THEN GO TO ETX
 34   L00042;  ...11.1.11   -> L0032                 GO TO LN1
 35   L00043;  .1111..1.1                   START5 ; C + 1 -> C[X]
 36   L00044;  1...1...1..                  START4 ; C -> DATA ADDRESS
 37   L00045;  111.1.111.                            A EXCHANGE C[W]
 38   L00046;  11.111..11   -> L0334                 GO TO START6
 39   L00047;  .1..1.1.1.                   SIN0   ; C -> STACK
 40   L00050;  .1..1...1..                  SIN    ; 1 -> S5
 41   L00051;  11.11....1   -> L0330                 JSB PR
 42   L00052;  .111111.11   -> L0176                 GO TO TAN
 43   L00053;  ....11..1..                  SQRT2  ; 0 -> S1
 44   L00054;  ..1..1..1..                  SQRT3  ; 0 -> S2
 45   L00055;  11....11..                            12 -> P
 46   L00056;  .....1.111.                           0 -> B[W]
```

```
47   L00057:  11...1....  -> L0060    *****         SELECT ROM 5
48   L00060:  .1..1.111.                 HMSA4  :   A -> B[W]
49   L00061:  1.111...11  -> L0270                  GO TO HMSA3
50   L00062:  1.1111.1..             $$$$$ OFL   :  DELAYED SELECT ROM 5
51   L00063:  ...1...111  -> L0021                  GO TO @021
52   L00064:  .11..1..1   -> L0144           SQRT :  JSB TST9
53   L00065:  .1.111..1   -> L0134                   JSB STOX
54   L00066:  .1...1.1..                             IF S4 # 1
55   L00067:  1...1..11   -> L0204                      THEN GO TO SQRT1
56   L00070:  .11...111.                     XSQ  :  C -> A[W]
57   L00071:  ......1.1   -> L0001                   JSB MPY
58   L00072:  1....11111  -> L0207                   GO TO EOF
59   L00073:  .11..11...                     MODE :  6 -> P
60   L00074:  ..........                             C EXCHANGE M
61   L00075:  ..........                             RETURN
62   L00076:  ..1.111.1             $$$$$   CON  :  DELAYED SELECT ROM 2
63   L00077:  ..11....11  -> L0140                   GO TO @140
64   L00100:  ..111.11.1  -> L0073           GRD  :  JSB MODE
65   L00101:  1..1.11...                             LOAD CONSTANT 2
66   L00102:  1.1111..11  -> L0374                   GO TO RAD1
67   L00103:  .1.111.1..            $$$$$   RCLY :  DELAYED SELECT ROM 2
68   L00104:  .11.1...11  -> L0150                   GO TO @150
69   L00105:  ..........                             NO OPERATION
70   L00106:  .11..1...1  -> L0144           LSTX :  JSB TST9
71   L00107:  .111.1.1..                             IF S7 # 1
72   L00110:  .1..1.1.11  -> L0112                      THEN GO TO LSTX1
73   L00111:  .1..1.1...                             C -> STACK
74   L00112:  1..1...1..  -> L0224           LSTX1:  JSB RCLX
75   L00113:  1....11111  -> L0207                   GO TO EOF
76   L00114:  .11..111..                     NINTY:  C -> A[W]
77   L00115:  ..11..111.                             0 -> C[W]
78   L00116:  11..11....                             12 -> P
79   L00117:  .1.11...1.                             C - 1 -> C[P]
80   L00120:  .1111.1...                             C + 1 -> C[X]
81   L00121:  11..1...11  -> L0310                   IF NO CARRY GO TO SUBOUT
82   L00122:  ..........                             NO OPERATION
83   L00123:  ..11.1..11  -> L0064           SQRT0:  GO TO SQRT
84   L00124:  1..11....1  -> L0230           CLR  :  JSB CLR0
85   L00125:  1....11111  -> L0207                   GO TO EOF
86   L00126:  ..........                             NO OPERATION
87   L00127:  ..1.1..1..                     NOTGRD: 0 - C -> C[P]
88   L00130:  ..1.1..1..                             0 - C -> C[P]
89   L00131:  1.1.1...11  -> L0250                   IF NO CARRY GO TO NOTRAD
90   L00132:  ..1.1.1...                             C EXCHANGE M
91   L00133:  1....111.   -> L0201                   GO TO TRIG2
92   L00134:  .1..1....   -> L2135    *****  STOX :  SELECT ROM 2
93   L00135:  1.1111.1..             $$$$$  DIV  :  DELAYED SELECT ROM 5
94   L00136:  ...111.111  -> L0035                   GO TO @035
95   L00137:  1..1.11.1   -> L0226           START:  JSB START1
96   L00140:  .11....1..                             1 -> S6
97   L00141:  1..11....1  -> L0230                   JSB CLRA
98   L00142:  11...11...                             12 -> P
99   L00143:  ....1..11   -> L0010                   GO TO START0
00   L00144:  1.1.1....   -> L5145    *****  TST9 :  SELECT ROM 5
01   L00145:  .1.11..1.                      HMSA2:  0 -> S5
02   L00146:  .1.....1..                             1 -> S4
03   L00147:  .11.1.1...                             STACK -> A
04   L00150:  11...11..1  -> L0306                   JSB ADD
05   L00151:  ..11..1..1  -> L0062                   JSB OFL
06   L00152:  ..11....11  -> L0060                   GO TO HMSA4
07   L00153:  ..1.1.1...                     TRIG1:  C EXCHANGE M
08   L00154:  .11...11..                             6 -> P
09   L00155:  .1111...1.                             C + 1 -> C[P]
10   L00156:  .1.11..1..                             C - 1 -> C[P]
11   L00157:  .1.1.11111  -> L0127                   IF NO CARRY GO TO NOTGRD
12   L00160:  ..1.1.1..                              C EXCHANGE M
13   L00161:  11.11.1..                              A - 1 -> A[X]
14   L00162:  11.11.1..                              A - 1 -> A[X]
15   L00163:  1.1.1.11.1  -> L0253                   JSB TORAD
16   L00164:  1..1...1..  -> L0224           AGAIN:  JSB RCLX
17   L00165:  ......1.1   -> L0001                   JSB MPY
18   L00166:  .11..1..1   -> L0062                   JSB OFL
19   L00167:  .1.1.1....                             C -> STACK
20   L00170:  .1...1..1   -> L0103                   JSB RCLY
21   L00171:  .11.1.1...                             STACK -> A
22   L00172:  .1..1.1..                              C -> STACK
```

```
123  L00173:  111.1.111.
124  L00174:  1..1...1..
125  L00175:  ..1..1..11  -> L0050
126  L00176:  .11...111.
127  L00177:  .1...1.1..
128  L00200:  .11.1.1111  -> L0153
129  L00201:  11.11....1  -> L0330
130  L00202:  ......11.1  -> L0003
131  L00203:  111...1.11  -> L0342
132  L00204:  ...111111.
133  L00205:  1111111.11  -> L0376
134  L00206:  ..1..11.1   -> L0053
135  L00207:  ...1..1...  -> L1210
136  L00210:  .1.1.1.1..
137  L00211:  1...11111.  -> L0207
138  L00212:  1.1.1.1...
139  L00213:  .11..1.111  -> L0145
140  L00214:  1.1.1..1..
141  L00215:  .11.1.1...
142  L00216:  .1..1.1...
143  L00217:  .1..1.111.
144  L00220:  1.111...11  -> L0270
145  L00221:  ..111.11.1  -> L0073
146  L00222:  .....11...
147  L00223:  1.1111..11  -> L0274
148  L00224:  .1.111.1..
149  L00225:  1...111.11  -> L0216
150  L00226:  .....11.1..
151  L00227:  111.1.1...
152  L00230:  ..11..111.
153  L00231:  .1111..1.1
154  L00232:  11....11..
155  L00233:  .11..1.1..
156  L00234:  1..1111.11  -> L0236
157  L00235:  .1111...1.
158  L00236:  1.11..11..
159  L00237:  1..111....
160  L00240:  1...1.111.
161  L00241:  1.1111....
162  L00242:  .1..1.1...
163  L00243:  1...1.111.
164  L00244:  .1111...1.
165  L00245:  1..1111111  -> L0237
166  L00246:  ..1...111.
167  L00247:  ....11....
168  L00250:  ..1.1.1...
169  L00251:  .1..11...1  -> L0114
170  L00252:  .1.111.1.1  -> L0135
171  L00253:  11..1.1..1  -> L0312
172  L00254:  ......1.1   -> L0001
173  L00255:  ...11...1.  -> L0062
174  L00256:  1.....111   -> L0201
175  L00257:  .1.111...1  -> L0134
176  L00260:  .1...1.1..
177  L00261:  1.11..1111  -> L0263
178  L00262:  ..1111111..
179  L00263:  .1..1.1..
180  L00264:  .1..1.1..
181  L00265:  .1.1....1..
182  L00266:  ..........
183  L00267:  1...1.111.
184  L00270:  1.1.11.1..
185  L00271:  .1..1.1...  -> L2272
186  L00272:  .111.11.1   -> L0073
187  L00273:  ...1.11...
188  L00274:  ..1.1.1...
189  L00275:  1.111.1...
190  L00276:  ...1..1111  -> L0023
191  L00277:  .11..1..1   -> L0144
192  L00300:  .111.1.1..
193  L00301:  11...1111   -> L0303
194  L00302:  .1..1.1..
195  L00303:  11.1..1.1   -> L0312
196  L00304:  1.1.1.111.
197  L00305:  1....11111  -> L0207
```

```
          COS   : A EXCHANGE C[W]
                  1 -> S9
                  GO TO SIN
          TAN   : C -> A[W]
                  IF S4 # 1
                    THEN GO TO TRIG1
          TRIG2 : JSB RR
                  JSB STOY
                  GO TO TRIG3
          SQRT1 : IF C[S] >= 1
                    THEN GO TO ERR0
                  JSB SQRT2
*****     EOF   : SELECT ROM 1
          EHMS  : IF S5 # 1
                    THEN GO TO EOF
                  IF S10 # 1
                    THEN GO TO HMSA2
                  0 -> S10
                  STACK -> A
                  C -> STACK
                  A -> B[W]
                  GO TO HMSA3
          DEG.  : JSB MODE
                  LOAD CONSTANT 0
                  GO TO RAD1
$$$$$     RCLX  : DELAYED SELECT ROM 2
                  GO TO @216
          START1: CLEAR STATUS
                  CLEAR REGISTERS
          CLR0  : 0 -> C[W]
          CLR5  : C + 1 -> C[X]
                  12 -> P
                  IF S6 # 1
                    THEN GO TO CLR1
                  C + 1 -> C[P]
          CLR1  : 11 -> P
          CLR2  : C -> DATA ADDRESS
                  B EXCHANGE C[W]
                  C -> DATA
                  C -> STACK
                  B EXCHANGE C[W]
                  C + 1 -> C[P]
                  IF NO CARRY GO TO CLR2
                  B -> C[W]
                  RETURN
          NOTRAD: C EXCHANGE M
                  JSB NINTY
                  JSB DIV
          TORAD : JSB HPI
                  JSB NPY
                  JSB OFL
                  GO TO TRIG2
          HMSA  : JSB STOX
          HMSADD: IF S4 # 1
                    THEN GO TO HMSA1
                  0 - C - 1 -> C[S]
          HMSA1 : 0 -> S4
                  1 -> S5
                  1 -> S10
                  NO OPERATION
                  B EXCHANGE C[W]
HMSA3 : DELAYED SELECT GROUP 1
*****             SELECT ROM 2
          RAD   : JSB MODE
                  LOAD CONSTANT 1
          RAD1  : C EXCHANGE M
$$$$$             DELAYED SELECT ROM 2
                  GO TO @023
          PI    : JSB TS19
                  IF S7 # 1
                    THEN GO TO PI1
                  C -> STACK
          PI1   : JSB HPI
                  C + C -> C[W]
                  IF NO CARRY GO TO EOF
```

```
198  L00306:  1.1111.1..              $$$$$  ADD    : DELAYED SELECT ROM 5
199  L00307:  1..11...11   -> L0230                   GO TO @230
200  L00310:  ..1...1...   -> L1311   *****  SUBOUT : SELECT ROM 1
201  L00311:  ..........                              NO OPERATION
202  L00312:  ...11..1..                      HPI   : 0 -> S1
203  L00313:  11...1....   -> L6314   *****          SELECT ROM 6
204  L00314:  11.11....1   -> L0330           FT0   : JSB RR
205  L00315:  1.1...1.1.                              IF S10 # 1
206  L00316:  11.1...1.1   -> L0324                       THEN GO TO TRIG10
207  L00317:  1..1.1....                              IF S9 # 1
208  L00320:  .111.1.11.   -> L0164                       THEN GO TO AGAIN
209  L00321:  1..1...1.1   -> L0224                   JSB RCLX
210  L00322:  ......1.1.   -> L0001                   JSB MPY
211  L00323:  ..........                              NO OPERATION
212  L00324:  .1..1.1...                      TRIG10: C -> STACK
213  L00325:  1..11.1...                              0 -> S9
214  L00326:  .1..11.1..   -> L0103                   JSB RCLY
215  L00327:  1....11111   -> L0207                   GO TO EOP
216  L00330:  ..11..1...                      RR    : 1 -> S3
217  L00331:  1.111..1..                              0 -> S11
218  L00332:  1......1..                              1 -> S8
219  L00333:  ....11....                              RETURN
220  L00334:  1.1111....                      START6: C -> DATA
221  L00335:  111.1.111.                              A EXCHANGE C[W]
222  L00336:  .1111...1.                              C + 1 -> C[P]
223  L00337:  ..1..1..11   -> L0044                   IF NO CARRY GO TO START4
224  L00340:  111.1.1...                              CLEAR REGISTERS
225  L00341:  11111...11   -> L0370                   GO TO START7
226  L00342:  .11.1.1...                      TRIG3 : STACK -> A
227  L00343:  ...1..1...                              1 -> S1
228  L00344:  1..1.1.1..                              IF S9 # 1
229  L00345:  111.1...11   -> L0350                       THEN GO TO SATEST
230  L00346:  ..1.11..11   -> L0054                   GO TO SQRT3
231  L00347:  1....1....   -> L4350   *****  MSD   : SELECT ROM 4
232  L00350:  111.1.111.                      SATEST: A EXCHANGE C[W]
233  L00351:  ..11..1.1.                              0 -> C[X]
234  L00352:  ......11..                              0 -> P
235  L00353:  .1.1.11...                              LOAD CONSTANT 5
236  L00354:  ..1.1.1.1.                              0 - C -> C[X]
237  L00355:  111.1.111.                              A EXCHANGE C[W]
238  L00356:  .11.111.1.                              IF C[XS] = 0
239  L00357:  ..1.11..11   -> L0054                       THEN GO TO SQRT3
240  L00360:  ....1..1..                              IF A >= C[X]
241  L00361:  1111..1111   -> L0363                       THEN GO TO SA
242  L00362:  ..1.11..11   -> L0054                   GO TO SQRT3
243  L00363:  .11...111.                      SA    : C -> A[W]
244  L00364:  .1...1.1..                              IF S4 # 1
245  L00365:  11..11..11   -> L0314                       THEN GO TO FT0
246  L00366:  .11111.1..                      $$$$$  IT0   : DELAYED SELECT ROM 3
247  L00367:  1...11.111   -> L0215                   GO TO @215
248  L00370:  1.1...11..                      START7: 10 -> P
249  L00371:  ....1.11..                              LOAD CONSTANT 1
250  L00372:  .111...1..                              7 -> P
251  L00373:  .1..11....                              LOAD CONSTANT 2
252  L00374:  .1.111.1..                      $$$$$          DELAYED SELECT ROM 2
253  L00375:  .11.11.11.   -> L0066                   GO TO @066
254  L00376:  .11111.1..                      $$$$$  ERR0  : DELAYED SELECT ROM 3
255  L00377:  11...1.11.   -> L0302                   GO TO @302

MERLO OBJECT PROGRAM

0   L01000:  ...1...1..                                1 -> S1
1   L01001:  ..111..111   -> L1071                     GO TO EOP
2   L01002:  ..11.11.1.                      FIX1  : 0 -> C[XS]
3   L01003:  1111111..1   -> L1376                     JSB FIX2
4   L01004:  ..........                                NO OPERATION
5   L01005:  .1.11...1.                      DEC14 : C - 1 -> C[P]
6   L01006:  1.1111..11   -> L1274                     IF NO CARRY GO TO DEC15
7   L01007:  .11......1   -> L1140           RS50  : JSB RR1
8   L01010:  1....1.1..                                IF S8 # 1
9   L01011:  1.11.11111   -> L1267                         THEN GO TO RS
10  L01012:  .1....111.                      RS52  : B -> C[W]
11  L01013:  1.111..111   -> L1271                     GO TO RS51
12  L01014:  .1.111.1..                      $$$$$  SWITCH: DELAYED SELECT ROM 2
13  L01015:  1....1111.   -> L1203                     GO TO @203
```

```
14   L01016:   1.1111..
15   L01017:   .1.111.111    -> L1135
16   L01020:   .1.11...1.
17   L01021:   ...111.111    -> L1035
18   L01022:   ..1.1.1...
19   L01023:   ...111111.
20   L01024:   .11..1.111    -> L1145
21   L01025:   ..1.1.1...
22   L01026:   ..1111.111    -> L1075
23   L01027:   ..11.1.1..
24   L01030:   .1.1111111    -> L1137
25   L01031:   1.11..1.1.
26   L01032:   1.1.1.1111    -> L1253
27   L01033:   1.1111.1..
28   L01034:   11..111.11    -> L1316
29   L01035:   ...1.1.1..
30   L01036:   .11.11111.
31   L01037:   ..1....111    -> L1041
32   L01040:   111.1111.1    -> L1357
33   L01041:   ..1.1.....
34   L01042:   .1.11...1.
35   L01043:   ..11....11    -> L1060
36   L01044:   1.1..1...1    -> L1244
37   L01045:   .1111.1111    -> L1173
38   L01046:   ...1.1.1..
39   L01047:   ....111.11    -> L1016
40   L01050:   111.1.111.
41   L01051:   ..1.1.1...
42   L01052:   1.....11..
43   L01053:   ...1.111.1
44   L01054:   11..111.11    -> L1316
45   L01055:   ...1..11..
46   L01056:   11..111111    -> L1317
47   L01057:   ..........
48   L01060:   .1.11...1.
49   L01061:   .1....1.11    -> L1102
50   L01062:   1.1..1...1    -> L1244
51   L01063:   11111..111    -> L1371
52   L01064:   ..1...111.
53   L01065:   1...1.1111    -> L1213
54   L01066:   1.1111.1..
55   L01067:   ...1...111    -> L1021
56   L01070:   ..1.1.1...
57   L01071:   .1.11111.1    -> L1137
58   L01072:   1...1.1.1.
59   L01073:   ..11.1..11    -> L1064
60   L01074:   1...1.1111    -> L1213
61   L01075:   11.1..11.1    -> L1323
62   L01076:   ..1..1.1..
63   L01077:   ..1..11.11    -> L1046
64   L01100:   .11111..1.
65   L01101:   1111.11.11    -> L1366
66   L01102:   .1.11...1.
67   L01103:   .1..111111    -> L1117
68   L01104:   1.1..1...1    -> L1244
69   L01105:   111.11...1    -> L1354
70   L01106:   1111.....1    -> L1360
71   L01107:   ..1.1.1...
72   L01110:   ...11.11.1
73   L01111:   .111111.1.
74   L01112:   ..1.....1.
75   L01113:   ..111...11    -> L1070
76   L01114:   .1..111.1.
77   L01115:   .1111.1111    -> L1173
78   L01116:   1.1..1....    -> L5117
79   L01117:   .1.11...1.
80   L01120:   1.1.111111    -> L1257
81   L01121:   1.1..1...1    -> L1244
82   L01122:   ....1.111.
83   L01123:   11.1..11.1    -> L1323
84   L01124:   ....11.1..
85   L01125:   ..111..111    -> L1071
86   L01126:   .111.1.1..
87   L01127:   .1.11..1.11   -> L1132
88   L01130:   1...1.111.
```

```
$$$$$   DIGENT:   DELAYED SELECT ROM 5
                  GO TO @135
        DECODE:   C - 1 -> C[P]
                  IF NO CARRY GO TO DEC1
        DIGIT :   C EXCHANGE M
        DIGIT9:   IF C[S] >= 1
                        THEN GO TO GTD
                  C EXCHANGE M
                  GO TO DIGIT1
        DRR1  :   IF S3 # 1
                        THEN GO TO RR
                  IF S11 # 1
                        THEN GO TO DRR4
$$$$$   DEC16 :   DELAYED SELECT ROM 5
                  GO TO @316
        DEC1  :   C EXCHANGE M
                  IF C[S] = 0
                        THEN GO TO DEC1A
                  JSB CLPX1
        DEC1A :   C EXCHANGE M
                  C - 1 -> C[P]
                  IF NO CARRY GO TO DEC2
        R1    :   JSB DEC10
        PCT   :   GO TO PCT1
        DIGIT2:   IF S1 # 1
                        THEN GO TO DIGENT
        FIXDIG:   A EXCHANGE C[W]
                  C EXCHANGE M
                  8 -> P
                  0 - C -> C[XS]
                  IF NO CARRY GO TO FXD1
                  LOAD CONSTANT 1
                  GO TO FXD3
                  NO OPERATION
        DEC2  :   C - 1 -> C[P]
                  IF NO CARRY GO TO DEC3
                  JSB DEC10
        FIX   :   GO TO FIX4
        EOP1  :   B -> C[W]
                  GO TO EOF1
$$$$$   OFL   :   DELAYED SELECT ROM 5
                  GO TO @021
        EOO   :   C EXCHANGE M
        EOP   :   JSB RR
                  IF S9 # 1
                        THEN GO TO EOP1
                  GO TO EOF1
        DIGIT1:   JSB TST46
                  IF S2 # 1
                        THEN GO TO DIGIT2
$$$$$             DELAYED SELECT ROM 3
                  GO TO @366
        DEC3  :   C - 1 -> C[P]
                  IF NO CARRY GO TO DEC4
        R3    :   JSB DEC10
        RCL   :   JSB TST6
                  JSB CLPX
                  C EXCHANGE M
                  0 -> C[XS]
                  C + 1 -> C[XS]
                  1 -> S2
                  GO TO EOO
$$$$$   STOY  :   DELAYED SELECT ROM 2
                  GO TO @173
*****   MPY   :   SELECT ROM 5
        DEC4  :   C - 1 -> C[P]
                  IF NO CARRY GO TO TRANS
        R4    :   JSB DEC10
        CLX   :   0 -> B[W]
                  JSB TST46
                  CLEAR STATUS
                  GO TO EOP
        DP2   :   IF S7 # 1
                        THEN GO TO DP3
                  B EXCHANGE C[W]
```

| | | | | | |
|---|---|---|---|---|---|
| 89 | L01131: | .1...1.1... | | | C -> STACK |
| 90 | L01132: | 1...1....1.. | | DP3 : | 1 -> S9 |
| 91 | L01133: | .111..1111 | -> L1163 | | GO TO DP99 |
| 92 | L01134: | .1...1.... | -> L2135 | ***** STOX : | SELECT ROM 2 |
| 93 | L01135: | .1.11...1. | | DEC13 : | C - 1 -> C[P] |
| 94 | L01136: | .....1.111 | -> L1005 | | IF NO CARRY GO TO DEC14 |
| 95 | L01137: | 1...1.1.. | | RR : | 0 -> S8 |
| 96 | L01140: | ..111..1.. | | RR1 : | 0 -> S3 |
| 97 | L01141: | 1.111..1.. | | | 0 -> S11 |
| 98 | L01142: | ....11.... | | | RETURN |
| 99 | L01143: | .......... | | | NO OPERATION |
| 100 | L01144: | 1.1..1.... | -> L5145 | ***** TST9 : | SELECT ROM 5 |
| 101 | L01145: | .1.111111. | | GTD : | C - 1 -> C[S] |
| 102 | L01146: | .11.11111. | | | IF C[S] = 0 |
| 103 | L01147: | 11.1.1.111 | -> L1325 | | THEN GO TO GTD2 |
| 104 | L01150: | 111.1.111. | | GTD1 : | A EXCHANGE C[W] |
| 105 | L01151: | ..1.1.1... | | | C EXCHANGE M |
| 106 | L01152: | ......11.. | | | 0 -> P |
| 107 | L01153: | .11.....1. | | | C -> A[P] |
| 108 | L01154: | 1.1.1..... | | | C + C -> C[P] |
| 109 | L01155: | 11...11111 | -> L1307 | | IF NO CARRY GO TO GTD3 |
| 110 | L01156: | 111.1...1. | | | A EXCHANGE C[P] |
| 111 | L01157: | ..1.1.1... | | | C EXCHANGE M |
| 112 | L01160: | 111.1.111. | | | A EXCHANGE C[W] |
| 113 | L01161: | 111.1111.1 | -> L1357 | | JSB CLPX1 |
| 114 | L01162: | ...1..1111 | -> L1023 | | GO TO DIGIT9 |
| 115 | L01163: | ..11..111. | | DP99 : | 0 -> C[W] |
| 116 | L01164: | 1.111.111. | | | 0 -> A[W] |
| 117 | L01165: | 11....11.. | | | 12 -> P |
| 118 | L01166: | .1.111..1. | | | C - 1 -> C[WP] |
| 119 | L01167: | .11111111. | | | C + 1 -> C[S] |
| 120 | L01170: | .11111111. | | | C + 1 -> C[S] |
| 121 | L01171: | 1...1.111. | | | B EXCHANGE C[W] |
| 122 | L01172: | 1111.1.111 | -> L1365 | | GO TO DP4 |
| 123 | L01173: | .11..1...1 | -> L1144 | PCT1 : | JSB TST9 |
| 124 | L01174: | .1.111..1 | -> L1134 | | JSB STOX |
| 125 | L01175: | 11.1..11.1 | -> L1323 | | JSB TST46 |
| 126 | L01176: | .11.1.1... | | | STACK -> A |
| 127 | L01177: | 111.1.111. | | | A EXCHANGE C[W] |
| 128 | L01200: | .1..1.1... | | | C -> STACK |
| 129 | L01201: | .1.11.1.1 | | | C - 1 -> C[X] |
| 130 | L01202: | .1.11.1.1. | | | C - 1 -> C[X] |
| 131 | L01203: | .1..111..1 | -> L1116 | | JSB MPY |
| 132 | L01204: | 1...1..11 | -> L1210 | | GO TO EOF |
| 133 | L01205: | .11.1..... | | FLIP : | STACK -> A |
| 134 | L01206: | .1..1..1.. | | | C -> STACK |
| 135 | L01207: | ....11.... | | | RETURN |
| 136 | L01210: | ....11.1.. | | EOF : | CLEAR STATUS |
| 137 | L01211: | ...11.11..1 | -> L1066 | | JSB OFL |
| 138 | L01212: | .111..11.. | | | 1 -> S7 |
| 139 | L01213: | 1.1.11.1. | | ***** EOF1 : | DELAYED SELECT GROUP 1 |
| 140 | L01214: | 1......111 | -> L1201 | | GO TO @201 |
| 141 | L01215: | 1.1111.1. | | $$$$$ SUB : | DELAYED SELECT ROM 5 |
| 142 | L01216: | 1..1.11111 | -> L1227 | | GO TO @227 |
| 143 | L01217: | .1..1.1... | | CB1 : | IF S4 # 1 |
| 144 | L01220: | 1..1..1111 | -> L1223 | | THEN GO TO BCH |
| 145 | L01221: | ...11..11. | | | IF C[M] >= 1 |
| 146 | L01222: | 111..11111 | -> L1347 | | THEN GO TO NOBCH |
| 147 | L01223: | ..1.1.1... | | BCH : | C EXCHANGE M |
| 148 | L01224: | .11...1.1. | | | C -> A[X] |
| 149 | L01225: | ...1..11.. | | | 1 -> P |
| 150 | L01226: | .1....111. | | BCH1 : | SHIFT LEFT A[W] |
| 151 | L01227: | ....1111.. | | | P + 1 -> P |
| 152 | L01230: | .1.1...1.. | | | IF P # 4 |
| 153 | L01231: | 1..1.11.11 | -> L1226 | | THEN GO TO BCH1 |
| 154 | L01232: | 111.11..1. | | | A EXCHANGE C[WP] |
| 155 | L01233: | 11....11.. | | | 12 -> P |
| 156 | L01234: | .11.1...1. | | | IF C[P] = 0 |
| 157 | L01235: | 1..1111111 | -> L1237 | | THEN GO TO BCH2 |
| 158 | L01236: | .1.11..11. | | | C - 1 -> C[M] |
| 159 | L01237: | ...1.1.... | | BCH2 : | C EXCHANGE M |
| 160 | L01240: | 111..11111 | -> L1347 | | GO TO NOBCH |
| 161 | L01241: | 1.11.1.1.. | | DRR3 : | IF S11 # 1 |
| 162 | L01242: | 11.1./.111 | -> L1321 | | THEN GO TO ROM6 |
| 163 | L01243: | 1.1.111.11 | -> L1256 | | GO TO DRR5 |

| | | | | | | |
|---|---|---|---|---|---|---|
| 164 | L01244: | .....11.. | | | DEC10 : | 0 -> P |
| 165 | L01245: | .1.11...1. | | | | C - 1 -> C[P] |
| 166 | L01246: | .1.11...1. | | | | C - 1 -> C[P] |
| 167 | L01247: | 1.1.1.111 | -> L1251 | | | IF NO CARRY GO TO DEC11 |
| 168 | L01250: | 1....1.... | -> L4251 | ***** | DRR2 : | SELECT ROM 4 |
| 169 | L01251: | .1.11...1. | | | DEC11 : | C - 1 -> C[P] |
| 170 | L01252: | 1.1.11..11 | -> L1254 | | | IF NO CARRY GO TO DEC12 |
| 171 | L01253: | .1....1... | -> L2254 | ***** | DRR4 : | SELECT ROM 2 |
| 172 | L01254: | .1.11...1. | | | DEC12 : | C - 1 -> C[P] |
| 173 | L01255: | .1.111.111 | -> L1135 | | | IF NO CARRY GO TO DEC13 |
| 174 | L01256: | .11..1.... | -> L3257 | ***** | DRR5 : | SELECT ROM 3 |
| 175 | L01257: | 111.1.111. | | | TRANS : | A EXCHANGE C[W] |
| 176 | L01260: | ...1.1.1... | | | | C EXCHANGE M |
| 177 | L01261: | 111.1.1.1. | | | | A EXCHANGE C[X] |
| 178 | L01262: | 1....1...1. | | | | 0 -> S8 |
| 179 | L01263: | 11.11.1111 | -> L1333 | | | GO TO GTD5 |
| 180 | L01264: | .1...1.1.. | | | GTD7 : | IF S4 # 1 |
| 181 | L01265: | 1..1..1111 | -> L1223 | | | THEN GO TO BCH |
| 182 | L01266: | 111...1.11 | -> L1342 | | | GO TO GTD8 |
| 183 | L01267: | .11..1...1 | -> L1144 | | RS : | JSB TST9 |
| 184 | L01270: | 1111.....1 | -> L1360 | | | JSB CLFX |
| 185 | L01271: | ..1.1.1... | | | RS51 : | C EXCHANGE M |
| 186 | L01272: | 1..1.11... | | ##### | | DELAYED SELECT GROUP 1 |
| 187 | L01273: | .1...1.... | -> L2274 | ***** | | SELECT ROM 2 |
| 188 | L01274: | .1.11...1. | | | DEC15 : | C - 1 -> C[P] |
| 189 | L01275: | ...11.1111 | -> L1033 | | | IF NO CARRY GO TO DEC16 |
| 190 | L01276: | 111.11...1 | -> L1354 | | DP : | JSB TST6 |
| 191 | L01277: | ..1..1.1.. | | | DP10 : | IF S2 # 1 |
| 192 | L01300: | 1111..1.11 | -> L1362 | | | THEN GO TO DP5 |
| 193 | L01301: | ....11...1 | -> L1014 | | DP12 : | JSB SWITCH |
| 194 | L01302: | ..1..1.11. | | | | 2 -> P |
| 195 | L01303: | ..1..11... | | | | LOAD CONSTANT 2 |
| 196 | L01304: | ...1.11.1. | | | | IF A >= C[XS] |
| 197 | L01305: | 1111...111 | -> L1361 | | | THEN GO TO DP1 |
| 198 | L01306: | 1111.11.1. | | | | A + C -> A[XS] |
| 199 | L01307: | ....11...1 | -> L1014 | | GTD3 : | JSB SWITCH |
| 200 | L01310: | ..111..111 | -> L1071 | | | GO TO EOP |
| 201 | L01311: | 1....1.11. | | | SUBOUT: | IF S8 # 1 |
| 202 | L01312: | ...1.11111 | -> L1027 | | | THEN GO TO DRR1 |
| 203 | L01313: | ..11.1.1.. | | | | IF S3 # 1 |
| 204 | L01314: | 1.1.1...11 | -> L1250 | | | THEN GO TO DRR2 |
| 205 | L01315: | 1.1....111 | -> L1241 | | | GO TO DRR3 |
| 206 | L01316: | .....11... | | | FXD1 : | LOAD CONSTANT 0 |
| 207 | L01317: | .1.111.1.. | | $$$$$ | FXD3 : | DELAYED SELECT ROM 2 |
| 208 | L01320: | ..11..11..11 | -> L1154 | | | GO TO @154 |
| 209 | L01321: | ...111..11 | | $$$$$ | ROM0 : | DELAYED SELECT ROM 0 |
| 210 | L01322: | 11.11...11 | -> L1330 | | | GO TO @330 |
| 211 | L01323: | 1....1..1. | | | TST46 : | 0 -> S8 |
| 212 | L01324: | .11..1.... | -> L3325 | ***** | | SELECT ROM 3 |
| 213 | L01325: | 111.1.111. | | | GTD2 : | A EXCHANGE C[W] |
| 214 | L01326: | ..1.1.1... | | | | C EXCHANGE M |
| 215 | L01327: | .1...1..1. | | | | SHIFT LEFT A[WP] |
| 216 | L01330: | ......11.. | | | | 0 -> P |
| 217 | L01331: | ..11....1. | | | | C -> A[P] |
| 218 | L01332: | 111.1.111. | | | | A EXCHANGE C[W] |
| 219 | L01333: | ..1.1.1... | | | GTD5 : | C EXCHANGE M |
| 220 | L01334: | 111.1.111. | | | | A EXCHANGE C[W] |
| 221 | L01335: | .11.1...1 | -> L1144 | | | JSB TST9 |
| 222 | L01336: | .1..11...1 | -> L1114 | | GTD4 : | JSB STOY |
| 223 | L01337: | 1....1.1.1 | -> L1205 | | | JSB FLIP |
| 224 | L01340: | .11..1.1.. | | | | IF S6 # 1 |
| 225 | L01341: | 1.11.1..11 | -> L1264 | | | THEN GO TO GTD7 |
| 226 | L01342: | 1...11.1.1 | -> L1215 | | GTD8 : | JSB SUB |
| 227 | L01343: | .11...1.1. | | | | IF S6 # 1 |
| 228 | L01344: | 1...111111 | -> L1217 | | | THEN GO TO CB1 |
| 229 | L01345: | .11.11111. | | | | IF C[S] = 0 |
| 230 | L01346: | 1..1..1111 | -> L1223 | | | THEN GO TO BCH |
| 231 | L01347: | 1..1.1.1.1 | -> L1205 | | NOBCH : | JSB FLIP |
| 232 | L01350: | 111.1.111. | | | | A EXCHANGE C[W] |
| 233 | L01351: | 1111.111.1 | -> L1367 | | | JSB RCLY |
| 234 | L01352: | .1.111.1.. | | $$$$$ | LVIT : | DELAYED SELECT ROM 2 |
| 235 | L01353: | ...1..1111 | -> L1023 | | | GO TO @023 |
| 236 | L01354: | 1....1.1.. | | | TST6 : | 0 -> S8 |
| 237 | L01355: | .11..1.... | -> L3356 | ***** | | SELECT ROM 3 |
| 238 | L01356: | .......... | | | | NO OPERATION |

```
239  L01357:  ..11.1111.
240  L01360:  .11..1...  -> L3361
241  L01361:  ....11...1 -> L1014
242  L01362:  1111.....1 -> L1360
243  L01363:  1..1.1.1..
244  L01364:  .1.1.11.11 -> L1126
245  L01365:  .111...1..
246  L01366:  ..111..111 -> L1071
247  L01367:  .1.111.1..
248  L01370:  .11..1111  -> L1150
249  L01371:  ..1..1.1..
250  L01372:  .11..1...
251  L01373:  .....1.11  -> L1002
252  L01374:  ..11.11.1.
253  L01375:  .111111.1.
254  L01376:  ..1.1.1...
255  L01377:  1111.....1 -> L1360

0    L02000:  ..11.1..1  -> L2064
1    L02001:  111111.111 -> U2375
2    L02002:  .11.1..11.
3    L02003:  .1..1.111  -> L2111
4    L02004:  ...111111.
5    L02005:  .1..1.111  -> L2111
6    L02006:  1..1.1.1..
7    L02007:  ..111.1.11 -> L2072
8    L02010:  ..1....1..
9    L02011:  .11...111.
10   L02012:  1..1.1.1..
11   L02013:  ..1111..11 -> L2074
12   L02014:  1.111.111.
13   L02015:  11.1...11.
14   L02016:  1.11..111.
15   L02017:  .1.111111.
16   L02020:  111..1...  -> L7021
17   L02021:  1.1111.1..
18   L02022:  1..11...11 -> L2230
19   L02023:  1..1.11..1 -> L2254
20   L02024:  1111.....1 -> L2360
21   L02025:  1...1.111.
22   L02026:  ..111...11 -> L2070
23   L02027:  .1..1.1...
24   L02030:  111.1.111.
25   L02031:  1..1....1..
26   L02032:  11....11..
27   L02033:  .....1...11 -> L2010
28   L02034:  1.1..1....  -> L5035
29   L02035:  .11..1...1 -> L2144
30   L02036:  11.1..1..1 -> L2324
31   L02037:  .11.1.1...
32   L02040:  .1..1.1...
33   L02041:  111.1.111.
34   L02042:  1....11111 -> L2207
35   L02043:  1.1.11.1.. -> L2270
36   L02044:  1.111...11 -> L2270
37   L02045:  .11...1..1 -> L2144
38   L02046:  .1.111.1.1 -> L2135
39   L02047:  11.1.1...1 -> L2324
40   L02050:  .11..1....
41   L02051:  1..111111.
42   L02052:  .1..11.111 -> L2115
43   L02053:  1..11..11.
44   L02054:  ....1.11.1 -> L2027
45   L02055:  ......1.11 -> L2002
46   L02056:  ..11..111.
47   L02057:  11....11..
48   L02060:  .1...11...
49   L02061:  .1111.1.1.
50   L02062:  .....11....
51   L02063:  ...111.111 -> L2035
52   L02064:  1.1111.1..
53   L02065:  .1..111111 -> L2117
54   L02066:  ..1.1.1...
55   L02067:  ....11.1..
56   L02070:  ..1..1....  -> L1071
```

```
         CLPX1 : 0 -> C[S]
*****    CLPX  : SELECT ROM 3
         DP1   : JSB SWITCH
         DP5   : JSB CLPX
                 IF S9 # 1
                    THEN GO TO DP2
         DP4   : 1 -> S7
                 GO TO EOP
$$$$$    RCLY  : DELAYED SELECT ROM 2
                 GO TO @150
         FIX4  : C EXCHANGE M
                 IF S6 # 1
                    THEN GO TO FIX1
                 0 -> C[XS]
                 C + 1 -> C[XS]
         FIX2  : C EXCHANGE M
                 JSB CLPX
         CON51 : JSB MPY
                 GO TO CON52
         LN5   : IF C[M] = 0
                    THEN GO TO ERROR
                 IF C[S] >= 1
                    THEN GO TO ERROR
                 IF S9 # 1
                    THEN GO TO ZERO
         XTY20 : 1 -> S2
         XTY21 : C -> A[W]
                 IF S10 # 1
                    THEN GO TO EXP22
                 0 -> A[W]
                 A - C -> A[M]
                 SHIFT RIGHT A[W]
                 C - 1 -> C[S]
*****            SELECT ROM 7
$$$$$    ADD   : DELAYED SELECT ROM 5
                 GO TO @230
         LVIT  : JSB RR
                 JSB CLPX
                 B EXCHANGE C[W]
                 GO TO EOP
         YTX1  : C -> STACK
                 A EXCHANGE C[W]
                 1 -> S10
                 12 -> P
                 GO TO XTY20
*****    DIV   : SELECT ROM 5
         XEY1  : JSB TST9
                 JSB TST46
                 STACK -> A
                 C -> STACK
                 A EXCHANGE C[W]
                 GO TO EOF
CON1  : DELAYED SELECT GROUP 1
                 GO TO @270
         YTX   : JSB TST9
                 JSB STOX
                 JSB TST46
                 STACK -> A
                 IF A[S] >= 1
                    THEN GO TO ERR2
                 IF A[M] >= 1
                    THEN GO TO YTX1
                 GO TO LN5
         LD40  : 0 -> C[W]
                 12 -> P
                 LOAD CONSTANT 4
                 C + 1 -> C[X]
                 RETURN
         XEY   : GO TO XEY1
$$$$$    MPY   : DELAYED SELECT ROM 5
                 GO TO @117
                 C EXCHANGE M
                 CLEAR STATUS
*****    EOP   : SELECT ROM 1
```

| | | | | | |
|---|---|---|---|---|---|
|57|L02071;|..........| | |NO OPERATION|
|58|L02072;|111.1.111.| |ZERO :|A EXCHANGE C[W]|
|59|L02073;|1....11111|-> L2207| |GO TO EOF|
|60|L02074;|.1.1.1..| |EXP22 :|IF S5 # 1|
|61|L02075;|.1....111|-> L2101| |THEN GO TO EXP21|
|62|L02076;|111111.1..| |$$$$$ EXP23 :|DELAYED SELECT ROM 7|
|63|L02077;|....1..111|-> L2011| |GO TO @011|
|64|L02100;|..........| | |NO OPERATION|
|65|L02101;|111..1....|-> L7102|***** EXP21 :|SELECT ROM 7|
|66|L02102;|..1..111.| |CHS1 :|B -> C[W]|
|67|L02103;|..1111111.| | |0 - C - 1 -> C[S]|
|68|L02104;|....1..11.1|-> L2023| |JSB LVIT|
|69|L02105;|.1111....1|-> L2360|G :|JSB CLPX|
|70|L02106;|.1.....1..| | |1 -> S4|
|71|L02107;|...111...11|-> L2070| |GO TO EOP|
|72|L02110;|..........| | |NO OPERATION|
|73|L02111;|1..1.1.1..| |ERROR :|IF S9 # 1|
|74|L02112;|.1..11.111|-> L2115| |THEN GO TO ERR2|
|75|L02113;|1..11.1..| | |0 -> S9|
|76|L02114;|.1.1...11|-> L2120| |GO TO ERR0|
|77|L02115;|111.1.111.| |ERR2 :|A EXCHANGE C[W]|
|78|L02116;|.1...1...| | |C -> STACK|
|79|L02117;|111.1.111.| |ERR3 :|A EXCHANGE C[W]|
|80|L02120;|.11111.1..| |$$$$$ ERR0 :|DELAYED SELECT ROM 3|
|81|L02121;|11.....1.11|-> L2302| |GO TO @302|
|82|L02122;|11.1.1....1|-> L2324|CHS :|JSB TST46|
|83|L02123;|1111.....1|-> L2360| |JSB CLPX|
|84|L02124;|1..1.1.1..| | |IF S9 # 1|
|85|L02125;|.1.....1.11|-> L2102| |THEN GO TO CHS1|
|86|L02126;|111.1.111.| | |A EXCHANGE C[W]|
|87|L02127;|1.1..1.1..| | |IF S10 # 1|
|88|L02130;|1.......11|-> L2200| |THEN GO TO CHS2|
|89|L02131;|..11111.1.| | |0 - C - 1 -> C[XS]|
|90|L02132;|.11...111.| | |C -> A[W]|
|91|L02133;|1.1111.1..| |$$$$$|DELAYED SELECT ROM 5|
|92|L02134;|.11.1.1.11|-> L2152| |GO TO @152|
|93|L02135;|...11..1..| |STOX :|0 -> S1|
|94|L02136;|..1..1.1..| |STOX1 :|0 -> S2|
|95|L02137;|1..1....11|-> L2220| |GO TO SAVE|
|96|L02140;|1.1.11...1|-> L2254|CON :|JSB RR|
|97|L02141;|1....11.1| | |JSB SWITCH|
|98|L02142;|......11..| | |0 -> P|
|99|L02143;|11.1.1.111|-> L2325| |GO TO CON0|
|100|L02144;|1..1.1....|-> L5145|***** TST9 :|SELECT ROM 5|
|101|L02145;|...111.1..| |$$$$$ SQRT :|DELAYED SELECT ROM 0|
|102|L02146;|..1.1.1111|-> L2053| |GO TO @053|
|103|L02147;|..........| | |NO OPERATION|
|104|L02150;|....1..1..| |RCLY :|1 -> S1|
|105|L02151;|1...111111|-> L2217| |GO TO RCLX1|
|106|L02152;|1.1111.1..| |$$$$$ OFL :|DELAYED SELECT ROM 5|
|107|L02153;|...1...111|-> L2021| |GO TO @021|
|108|L02154;|.1....111.| |FXD3 :|SHIFT LEFT A[W]|
|109|L02155;|.....111..| | |P - 1 -> P|
|110|L02156;|.....1.11.| | |IF P # 0|
|111|L02157;|.11.11..11|-> L2154| |THEN GO TO FXD3|
|112|L02160;|.111..11..| | |7 -> P|
|113|L02161;|111.1..1..| | |A EXCHANGE C[P]|
|114|L02162;|..1.1.1...| | |C EXCHANGE M|
|115|L02163;|111.1.111.| | |A EXCHANGE C[W]|
|116|L02164;|1.1.11...1|-> L2254| |JSB RR|
|117|L02165;|.11..1...1|-> L2144| |JSB TST9|
|118|L02166;|...1..1111|-> L2023| |GO TO LVIT|
|119|L02167;|?.........| | |NO OPERATION|
|120|L02170;|..........| | |NO OPERATION|
|121|L02171;|1.1111.1..| |$$$$$ SUB :|DELAYED SELECT ROM 5|
|122|L02172;|1..1.11111|-> L2227| |GO TO @227|
|123|L02173;|...1..1...| |STOY :|1 -> S1|
|124|L02174;|.1.1111.11|-> L2136| |GO TO STOX1|
|125|L02175;|111.1.111.| |PR :|A EXCHANGE C[W]|
|126|L02176;|...111..1.| |$$$$$|DELAYED SELECT ROM 0|
|127|L02177;|..1..11111|-> L2047| |GO TO @047|
|128|L02200;|..1111111.| |CHS2 :|0 - C - 1 -> C[S]|
|129|L02201;|.11...111.| | |C -> A[W]|
|130|L02202;|..111...11|-> L2070| |GO TO EOP|
|131|L02203;|..1.1.1...| |SWITCH:|C EXCHANGE M|

```
132  L02204:  111.1.111.
133  L02205:  ..1.1....
134  L02206:  11..1...11  -> L2310
135  L02207:  ..1..1....  -> L1210
136  L02210:  .1...1.1..
137  L02211:  1...11..11  -> L2214
138  L02212:  ..11.1...1  -> L2064
139  L02213:  1...11111.  -> L2207
140  L02214:  ....111..1  -> L2034
141  L02215:  1....11111  -> L2207
142  L02216:  ...11..1..
143  L02217:  ..1.....1.
144  L02220:  1...1.111.
145  L02221:  ..11..111.
146  L02222:  .1111.1.1.
147  L02223:  11....11..
148  L02224:  .1...11...
149  L02225:  ...1.1.1..
150  L02226:  1..11...11  -> L2230
151  L02227:  ...1.11...
152  L02230:  1..111....
153  L02231:  ..1..1.1..
154  L02232:  11..1..111  -> L2311
155  L02233:  1.11111...
156  L02234:  ...1.1.1..
157  L02235:  11..1...11  -> L2310
158  L02236:  111.1.111.
159  L02237:  .11.1.1...
160  L02240:  111.1.111.
161  L02241:  1.11111...
162  L02242:  .1...1.1..
163  L02243:  ..1...111.
164  L02244:  11..1...11  -> L2310
165  L02245:  ...111...1  -> L2034
166  L02246:  .1...1.1..
167  L02247:  .1.1111.1.
168  L02250:  .11.111.1.
169  L02251:  1.1111.111  -> L2275
170  L02252:  1.11...111  -> L2261
171  L02253:  ..........
172  L02254:  ...11...1.
173  L02255:  1.111..1..
174  L02256:  1...1..1..
175  L02257:  .....11...
176  L02260:  ..........
177  L02261:  .11111.1.
178  L02262:  .11.111.1.
179  L02263:  1.111...11  -> L2270
180  L02264:  .1.1111.1.
181  L02265:  ...1111.1.
182  L02266:  1.111..111  -> L2271
183  L02267:  .1.1111.1.
184  L02270:  ..11.1..1.  -> L2064
185  L02271:  ..11..111.
186  L02272:  .1111...1.
187  L02273:  ...1..1.1  -> L2021
188  L02274:  .11..1.1.1  -> L2145
189  L02275:  1.1111111.
190  L02276:  1...111..1  -> L2216
191  L02277:  .11..1..1.  -> L2064
192  L02300:  .11.1.1...
193  L02301:  .1...1.1..
194  L02302:  111.1.111.
195  L02303:  .11.1.1..1  -> L2152
196  L02304:  ...111.1..
197  L02305:  1......111  -> L2201
198  L02306:  ..1....111
199  L02307:  1.1111....
200  L02310:  ..1..1....  -> L1311
201  L02311:  ...1.1.1..
202  L02312:  11...11.11  -> L2306
203  L02313:  ..1...111.
204  L02314:  .1..1.111.
205  L02315:  .11.1.1...
206  L02316:  111.1.111.
```

```
              A EXCHANGE C[W]
              C EXCHANGE M
              GO TO SUBOUT
*****  EOF  : SELECT ROM 1
       CON50: IF S4 # 1
                 THEN GO TO CON53
              JSB MPY
              GO TO EOF
       CON53: JSB DIV
              GO TO EOF
       RCLX : 0 -> S1
       RCLX1: 1 -> S2
       SAVE : B EXCHANGE C[W]
              0 -> C[W]
              C + 1 -> C[X]
              12 -> P
              LOAD CONSTANT 2
              IF S1 # 1
                 THEN GO TO SAVE1
              LOAD CONSTANT 1
       SAVE1: C -> DATA ADDRESS
              IF S2 # 1
                 THEN GO TO SAVE2
              DATA -> C
              IF S1 # 1
                 THEN GO TO SUBOUT
              A EXCHANGE C[W]
              STACK -> A
              A EXCHANGE C[W]
              DATA -> C
              C -> STACK
       SAVE5: B -> C[W]
              GO TO SUBOUT
       RP1  : JSB DIV
              C -> STACK
              C - 1 -> C[XS]
              IF C[XS] = 0
                 THEN GO TO RP6
              GO TO RP11
              NO OPERATION
       RR   : 1 -> S3
              0 -> S11
              0 -> S8
              RETURN
              NO OPERATION
       RP11 : 0 - C - 1 -> C[XS]
              IF C[XS] = 0
                 THEN GO TO RP5
              C - 1 -> C[XS]
              IF C[XS] >= 1
                 THEN GO TO RP10
              C - 1 -> C[XS]
       RP5  : JSB MPY
       RP10 : 0 -> C[W]
              C + 1 -> C[P]
              JSB ADD
              JSB SQRT
       RP6  : 0 -> A[S]
              JSB RCLX
              JSB MPY
              STACK -> A
              C -> STACK
              A EXCHANGE C[W]
              JSB OFL
$$$$$         DELAYED SELECT ROM 0
              GO TO @201
       SAVE4: B -> C[W]
              C -> DATA
*****  SUBOUT: SELECT ROM 1
       SAVE2: IF S1 # 1
                 THEN GO TO SAVE4
              B -> C[W]
              A -> B[W]
              STACK -> A
              A EXCHANGE C[W]
```

```
207   L02317:   1.1111....
208   L02320:   .1..1.1...
209   L02321:   11..1.111.
210   L02322:   1.1....1111   -> L2243
211   L02323:   ..........
212   L02324:   .11..1....   -> L3325
213   L02325:   .11......1.
214   L02326:   1......11.1   -> L2203
215   L02327:   .11....11.1   -> L2144
216   L02330:   .1.111.1.1   -> L2135
217   L02331:   1....1.111.
218   L02332:   1.1.1.1...
219   L02333:   .1.111.111.
220   L02334:   ......11..
221   L02335:   .11......
222   L02336:   ...11..111.
223   L02337:   11.11.1.1.
224   L02340:   ..1...1111   -> L2043
225   L02341:   ..1...111.
226   L02342:   .1111.11.1   -> L2173
227   L02343:   .11.1.1...
228   L02344:   1..1...1..
229   L02345:   .1....1...
230   L02346:   .11111.111   -> L2175
231   L02347:   ...11.111.
232   L02350:   1.1..1.111   -> L2245
233   L02351:   1..11.111.
234   L02352:   111.11.111   -> L2355
235   L02353:   .1..1.1...
236   L02354:   1....11111   -> L2207
237   L02355:   .1..1.111.
238   L02356:   .11111.1..
239   L02357:   1...1..11   -> L2210
240   L02360:   .11..1....   -> L3361
241   L02361:   11..1.111.
242   L02362:   .1.1.1.1..
243   L02363:   1...1..11   -> L2210
244   L02364:   ..1.111..1   -> L2056
245   L02365:   ...1...1.1   -> L2021
246   L02366:   ...11..111.
247   L02367:   11.....11..
248   L02370:   ...1.11...
249   L02371:   1.....11..
250   L02372:   .1...1.1..
251   L02373:   .........11   -> L2000
252   L02374:   ...111...1   -> L2034
253   L02375:   ..1.111..1   -> L2056
254   L02376:   .1111..1.1   -> L2171
255   L02377:   1....11111   -> L2207

MERLO OBJECT PROGRAM

0    L03000:   111111.111   -> L3375
1    L03001:   111.1.111.
2    L03002:   11...11...
3    L03003:   ...1.11...
4    L03004:   .1111.1.1.
5    L03005:   1..111....
6    L03006:   ..1.1.1...
7    L03007:   111.1.111.
8    L03010:   ..1.1.1...
9    L03011:   .11..1....1   -> L3144
10   L03012:   ..1.1.1...
11   L03013:   .1.1111.1.
12   L03014:   1.....1111   -> L3203
13   L03015:   ..1.1.1...
14   L03016:   1.1111....
15   L03017:   1....11111   -> L3207
16   L03020:   1.1.1111.1
17   L03021:   .11....1.1   -> L3257
18   L03022:   1.1.11.1..
19   L03023:   ..11111111   -> L3077
20   L03024:   .11..1...1   -> L3144
21   L03025:   11.1.1.1.1   -> L3325
```

```
                    C -> DATA
                    C -> STACK
                    A EXCHANGE B[W]
                    GO TO SAVE5
                    NO OPERATION
*****  TST46 :      SELECT ROM 3
       CON0  :      C -> A[P]
                    JSB SWITCH
                    JSB TST9
                    JSB STOX
                    B EXCHANGE C[W]
                    M -> C
                    0 -> A[W]
                    0 -> P
                    C -> A[P]
                    0 -> C[W]
                    A - 1 -> A[X]
                    IF NO CARRY GO TO CON1
       RP    :      B -> C[W]
                    JSB STOY
                    STACK -> A
                    1 -> S10
                    IF S4 # 1
                       THEN GO TO PR
                    IF C[W] >= 1
                       THEN GO TO RP1
                    IF A[W] >= 1
                       THEN GO TO RP2
                    C -> STACK
                    GO TO EOF
       RP2   :      A -> B[W]
*****               DELAYED SELECT ROM 3
                    GO TO @210
*****  CLPX  :      SELECT ROM 3
       CONOUT:      A EXCHANGE B[W]
                    IF S5 # 1
                       THEN GO TO CON50
                    JSB LD40
                    JSB ADD
                    0 -> C[W]
                    12 -> P
                    LOAD CONSTANT 1
                    LOAD CONSTANT 8
                    IF S4 # 1
                       THEN GO TO CON51
                    JSB DIV
       CON52 :      JSB LD40
                    JSB SUB
                    GO TO EOF

GO TO SA1
                    A EXCHANGE C[W]
                    12 -> P
                    LOAD CONSTANT 1
                    C + 1 -> C[X]
                    C -> DATA ADDRESS
                    C EXCHANGE M
                    A EXCHANGE C[W]
                    C EXCHANGE M
                    JSB TST9
                    C EXCHANGE M
                    C - 1 -> C[XS]
                    IF NO CARRY GO TO SA2
       STORE :      C EXCHANGE M
                    C -> DATA
                    GO TO EOF
       CLOCK :      JSB RR
                    JSB TST9
*****               DELAYED SELECT GROUP 1
                    GO TO @077
       RDN1  :      JSB TST9
                    JSB TST46
```

| | | | | | |
|---|---|---|---|---|---|
| 22 | L03026: | 11..1.1... | | | DOWN ROTATE |
| 23 | L03027: | 1....11111 | -> L3207 | | GO TO EOF |
| 24 | L03030: | 1111...1.1 | -> L3361 | EEX1 : | JSB CLPX |
| 25 | L03031: | 1..1.1.1... | | | IF S9 # 1 |
| 26 | L03032: | 1.1..11111 | -> L3247 | | THEN GO TO EEX2 |
| 27 | L03033: | 1....1.111. | | | B EXCHANGE C[W] |
| 28 | L03034: | 1..11..11. | | | IF A[M] >= 1 |
| 29 | L03035: | ..11.1.111 | -> L3065 | | THEN GO TO EEX3 |
| 30 | L03036: | 11...11.. | | EEX4 : | 12 -> P |
| 31 | L03037: | 1.111.111. | | | 0 -> A[W] |
| 32 | L03040: | ...11..111. | | | 0 -> C[W] |
| 33 | L03041: | 11111...1. | | | A + 1 -> A[P] |
| 34 | L03042: | .1.111..1. | | | C - 1 -> C[WP] |
| 35 | L03043: | ..1..11... | | | LOAD CONSTANT 2 |
| 36 | L03044: | ..11.1.111 | -> L3065 | | GO TO EEX3 |
| 37 | L03045: | .1111..111 | -> L3171 | INV : | GO TO INV1 |
| 38 | L03046: | .1..11... | | NOTGRD: | C - 1 -> C[P] |
| 39 | L03047: | .1111...1. | | | C + 1 -> C[P] |
| 40 | L03050: | 11...1.111 | -> L3311 | | IF NO CARRY GO TO TRIG22 |
| 41 | L03051: | ...1.1.1... | | | C EXCHANGE M |
| 42 | L03052: | 11.11..1.1 | -> L3331 | | JSB NINTY |
| 43 | L03053: | 11.1..11.1 | -> L3323 | | JSB MPY |
| 44 | L03054: | ..11...1.1 | -> L3061 | TOGRD : | JSB HPI |
| 45 | L03055: | ..1.1111.. | -> L3057 | | JSB DIV |
| 46 | L03056: | 11..1.1.11 | -> L3312 | | GO TO TRIG23 |
| 47 | L03057: | 1.1111.1.. | | $$$$$ DIV : | DELAYED SELECT ROM 5 |
| 48 | L03060: | ...111.111 | -> L3035 | | GO TO @035 |
| 49 | L03061: | ...111.1.. | | $$$$$ HPI : | DELAYED SELECT ROM 0 |
| 50 | L03062: | 11..1.1.11 | -> L3312 | | GO TO @312 |
| 51 | L03063: | ...1.1..11 | -> L3024 | RDN : | GO TO RDN1 |
| 52 | L03064: | .......... | | | NO OPERATION |
| 53 | L03065: | ..11..1.1. | | EEX3 : | 0 -> C[X] |
| 54 | L03066: | 1.1....1.. | | | 1 -> S10 |
| 55 | L03067: | 1...1.111. | | EOP0 : | B EXCHANGE C[W] |
| 56 | L03070: | ..1..1.... | -> L1071 | ***** EOP : | SELECT ROM 1 |
| 57 | L03071: | .1.1111.1. | | SA7 : | C - 1 -> C[XS] |
| 58 | L03072: | ..11111.11 | -> L3076 | | IF NO CARRY GO TO STODIV |
| 59 | L03073: | 111......1 | -> L3340 | STOMPY: | JSB SABEG |
| 60 | L03074: | 11.1..11.1 | -> L3323 | | JSB MPY |
| 61 | L03075: | .11..1.111 | -> L3151 | | GO TO SAEND |
| 62 | L03076: | ...1.1.1... | | STODIV: | C EXCHANGE M |
| 63 | L03077: | .11.1.111. | | | IF C[W] = 0 |
| 64 | L03100: | 11....1.11 | -> L3302 | | THEN GO TO ERR0 |
| 65 | L03101: | 111....1.1 | -> L3341 | | JSB SABEG1 |
| 66 | L03102: | ..1.1111.1 | -> L3057 | | JSB DIV |
| 67 | L03103: | .11.1..111 | -> L3151 | | GO TO SAEND |
| 68 | L03104: | .......... | | | NO OPERATION |
| 69 | L03105: | 111..11.11 | -> L3346 | STO : | GO TO STO1 |
| 70 | L03106: | 1.111.111. | | CTDA : | 0 -> A[W] |
| 71 | L03107: | ......11.. | | | 0 -> P |
| 72 | L03110: | .11.....1. | | | C -> A[P] |
| 73 | L03111: | .1....111. | | CTDA1 : | SHIFT LEFT A[W] |
| 74 | L03112: | ....1111.. | | | P + 1 -> P |
| 75 | L03113: | 11..11.... | | | IF P # 12 |
| 76 | L03114: | .1..1..111 | -> L3111 | | THEN GO TO CTDA1 |
| 77 | L03115: | 111.1.111. | | | A EXCHANGE C[W] |
| 78 | L03116: | 1..111.... | | | C -> DATA ADDRESS |
| 79 | L03117: | 111.1.111. | | | A EXCHANGE C[W] |
| 80 | L03120: | ....11.... | | | RETURN |
| 81 | L03121: | .......... | | | NO OPERATION |
| 82 | L03122: | .11..1.1. | | EEX : | IF S6 # 1 |
| 83 | L03123: | ...11...11 | -> L3030 | | THEN GO TO EEX1 |
| 84 | L03124: | .11.1..1.1 | -> L3144 | XFT : | JSB TST9 |
| 85 | L03125: | .1.111..1 | -> L3134 | | JSB STOX |
| 86 | L03126: | 1.1.11.1.. | | ##### XFT0 : | DELAYED SELECT GROUP 1 |
| 87 | L03127: | .1...1.... | -> L2130 | ***** | SELECT ROM 2 |
| 88 | L03130: | 1.1111.1.. | | $$$$$ ADD : | DELAYED SELECT ROM 5 |
| 89 | L03131: | 1..11...11 | -> L3230 | | GO TO @230 |
| 90 | L03132: | .1.111.1.. | | $$$$$ RCLY : | DELAYED SELECT ROM 2 |
| 91 | L03133: | .11..1..11 | -> L3150 | | GO TO @150 |
| 92 | L03134: | .1...1...1 | -> L2135 | ***** STOX : | SELECT ROM 2 |
| 93 | L03135: | ...1.1.... | | OUT3 : | IF S1 # 1 |
| 94 | L03136: | .11.....11 | -> L3140 | | THEN GO TO OUT2 |
| 95 | L03137: | 1..11.1... | | OUT5 : | 0 -> S9 |
| 96 | L03140: | ..1..1.1.. | | OUT2 : | IF S2 # 1 |

```
 97  L03141:  1.1.11.111  -> L3255
 98  L03142:  1....11111  -> L3207
 99  L03143:  ..........
100  L03144:  1.1.1.....  -> L5145
101  L03145:  .1.1111.1.
102  L03146:  1.11.11111  -> L3267
103  L03147:  111......1  -> L3340
104  L03150:  .1.11....1  -> L3130
105  L03151:  1.111....1  -> L3274
106  L03152:  1.11111...
107  L03153:  111.1.111.
108  L03154:  1.1111....
109  L03155:  .111.1.111
110  L03156:  1....11111  -> L3207
111  L03157:  .1.111.1..
112  L03160:  1...111.11  -> L3216
113  L03161:  .1.1111.1.
114  L03162:  .11..1.111  -> L3145
115  L03163:  .1...11..1  -> L3106
116  L03164:  ..1.1.1...
117  L03165:  .111.1.1..
118  L03166:  1....11.11  -> L3206
119  L03167:  .1...1.1..
120  L03170:  1....11.11  -> L3206
121  L03171:  .11..1...1  -> L3144
122  L03172:  .1.111...1  -> L3134
123  L03173:  11.1.1.1.1  -> L3325
124  L03174:  .11.1.111.
125  L03175:  11....1.11  -> L3302
126  L03176:  1.111.111.
127  L03177:  11....11..
128  L03200:  1111...1..
129  L03201:  ..1.1111.1  -> L3057
130  L03202:  1....11111  -> L3207
131  L03203:  .1.1111.1.
132  L03204:  1.11..1111  -> L3263
133  L03205:  .111.1..11  -> L3164
134  L03206:  1.11111...
135  L03207:  ..1...1...  -> L1210
136  L03210:  1.1.1111.1  -> L3257
137  L03211:  ..11...1.1  -> L3061
138  L03212:  .....1111.
139  L03213:  1...11.111  -> L3215
140  L03214:  .1.111111.
141  L03215:  1.1.1111.1  -> L3257
142  L03216:  .1..1.1...
143  L03217:  ..11...111
144  L03220:  .1.11.1.1  -> L3132
145  L03221:  1.1...1.1.
146  L03222:  1..111..11  -> L3234
147  L03223:  .11.1111.1  -> L3157
148  L03224:  .11.11111.
149  L03225:  1..111..11  -> L3234
150  L03226:  ..11...1.1  -> L3061
151  L03227:  1.1.1.111.
152  L03230:  1..111111.
153  L03231:  1..11.1111  -> L3233
154  L03232:  .1.111111.
155  L03233:  .1.11....1  -> L3130
156  L03234:  111.1.111.
157  L03235:  .11....111
158  L03236:  ..1.1.1...
159  L03237:  .11...11..
160  L03240:  .1111...1.
161  L03241:  .1.11...1.
162  L03242:  ..1..11.11  -> L3046
163  L03243:  ..1.1.1...
164  L03244:  11111.1.1.
165  L03245:  11111.1.1.
166  L03246:  ..1.11..1  -> L3054
167  L03247:  .111.1.1..
168  L03250:  1.1.1.1111  -> L3253
169  L03251:  1....1.111
170  L03252:  .1..1.1...
171  L03253:  1..1....1.
```

THEN GO TO SUBOUT
            GO TO EOF
            NO OPERATION
***** TST9 :  SELECT ROM 5
      SA5  :  C - 1 -> C[XS]
              IF NO CARRY GO TO SA6
    STOADD:  JSB SABEG
              JSB ADD
      SAEND:  JSB OFL
              DATA -> C
              A EXCHANGE C[W]
              C -> DATA
              A EXCHANGE C[W]
              GO TO EOF
$$$$$ RCLX :  DELAYED SELECT ROM 2
              GO TO @216
      SA4  :  C - 1 -> C[XS]
              IF NO CARRY GO TO SA5
    RCLDP  :  JSB CTDA
    RECALL:  C EXCHANGE M
              IF S7 # 1
                THEN GO TO RECLL1
              C -> STACK
              GO TO RECLL1
      INV1 :  JSB TST9
              JSB STOX
              JSB TST40
              IF C[W] = 0
                THEN GO TO ERR0
              0 -> A[W]
              12 -> P
              A + 1 -> A[P]
              JSB DIV
              GO TO EOF
      SA2  :  C - 1 -> C[XS]
              IF NO CARRY GO TO SA3
              GO TO RECALL
    RECLL1:  DATA -> C
***** EOF  :  SELECT ROM 1
      RP2  :  JSB RR
              JSB HPI
              IF B[S] = 0
                THEN GO TO IT0
              C - 1 -> C[S]
      IT0  :  JSB RR
              C -> STACK
              C -> A[W]
              JSB RCLY
              IF S10 # 1
                THEN GO TO TRIG20
              JSB RCLX
              IF C[S] = 0
                THEN GO TO TRIG20
              JSB HPI
    TRIG50:  C + C -> C[W]
              IF A[S] >= 1
                THEN GO TO TRIG21
              C - 1 -> C[S]
    TRIG21:  JSB ADD
    TRIG20:  A EXCHANGE C[W]
              C -> A[W]
              C EXCHANGE M
              6 -> P
              C + 1 -> C[P]
              C - 1 -> C[P]
              IF NO CARRY GO TO HOTGRD
              C EXCHANGE M
              A + 1 -> A[X]
              A + 1 -> A[X]
              JSB TOGRD
      EEX2 :  IF S7 # 1
                THEN GO TO EEX5
              B EXCHANGE C[W]
              C -> STACK
      EEX5 :  1 -> S9

| | | | |
|---|---|---|---|
| 172 | L03254: | ...1111.11 -> L3036 | |
| 173 | L03255: | ..1111.1.. | |
| 174 | L03256: | 11..1..111 -> L3311 | |
| 175 | L03257: | ..11....1. | |
| 176 | L03260: | 1..11....1 | |
| 177 | L03261: | 1........1 | |
| 178 | L03262: | ....11.... | |
| 179 | L03263: | .1.1111.1. | |
| 180 | L03264: | .111...111 -> L3161 | |
| 181 | L03265: | .1...11..1 -> L3106 | |
| 182 | L03266: | ....11.111 -> L3015 | |
| 183 | L03267: | .1.1111.1. | |
| 184 | L03270: | ..111..111 -> L3071 | |
| 185 | L03271: | 111......1 -> L3340 | |
| 186 | L03272: | 11.1111..1 -> L3336 | |
| 187 | L03273: | .11.1..111 -> L3151 | |
| 188 | L03274: | 1.1111.1.. | |
| 189 | L03275: | ....1...111 -> L3021 | |
| 190 | L03276: | .......... | |
| 191 | L03277: | 1.1.1111.1 -> L3257 | |
| 192 | L03300: | .1.11..1.1 -> L3132 | |
| 193 | L03301: | .11.1111.1 -> L3157 | |
| 194 | L03302: | ..1.1.1... | |
| 195 | L03303: | 11....11.. | |
| 196 | L03304: | ..11.....1 | |
| 197 | L03305: | ..1.1.1... | |
| 198 | L03306: | ....11.1.. | |
| 199 | L03307: | .1.1...1.. | |
| 200 | L03310: | ..11.11111 -> L3067 | |
| 201 | L03311: | ..1.1..1.. | |
| 202 | L03312: | 1.1111...1 -> L3274 | |
| 203 | L03313: | 1..11..1.. | |
| 204 | L03314: | 1.1..1.1.. | |
| 205 | L03315: | 1....11111 -> L3207 | |
| 206 | L03316: | .11.1.1... | |
| 207 | L03317: | .1..1.1... | |
| 208 | L03320: | 1.1111111. | |
| 209 | L03321: | 111.1.111. | |
| 210 | L03322: | 1...11111 -> L3207 | |
| 211 | L03323: | 1.1111.1.. | |
| 212 | L03324: | .1..111111 -> L3117 | |
| 213 | L03325: | ..1.1.1... | |
| 214 | L03326: | 111.111.11 -> L3356 | |
| 215 | L03327: | .....1.... -> L0330 | |
| 216 | L03330: | .......... | |
| 217 | L03331: | ...111.1.. | |
| 218 | L03332: | .1..11..11 -> L3114 | |
| 219 | L03333: | ..1..1.1.. | |
| 220 | L03334: | .1.111.111 -> L3135 | |
| 221 | L03335: | .1.1111111 -> L3137 | |
| 222 | L03336: | 1.1111.1.. | |
| 223 | L03337: | 1..1.11111 -> L3227 | |
| 224 | L03340: | ..1.1.1... | |
| 225 | L03341: | .11...111. | |
| 226 | L03342: | 1.111111.. | |
| 227 | L03343: | 111.1.111. | |
| 228 | L03344: | 1.1111.... | |
| 229 | L03345: | ....11.... | |
| 230 | L03346: | 11.1.1.1.1 -> L3325 | |
| 231 | L03347: | 1111...1.1 -> L3361 | |
| 232 | L03350: | ..1.1.1... | |
| 233 | L03351: | ...11.11.1 | |
| 234 | L03352: | ..1....1.. | |
| 235 | L03353: | ..1.1.1... | |
| 236 | L03354: | ..111...11 -> L3070 | |
| 237 | L03355: | .......... | |
| 238 | L03356: | .11..1.1.. | |
| 239 | L03357: | 1.1.11.111 -> L3255 | |
| 240 | L03360: | 11.1.11111 -> L3327 | |
| 241 | L03361: | .11.1..1.. | |
| 242 | L03362: | ..1.1.1... | |
| 243 | L03363: | .1.1.1.1.. | |
| 244 | L03364: | ...11..1.. | |
| 245 | L03365: | 1.1.11.111 -> L3255 | |
| 246 | L03366: | 1.1.1111.1 -> L3257 | |

```
                    GO TO EEX4
$$$$$  SUBOUT:      DELAYED SELECT ROM 1
                    GO TO @311
       RR    :      1 -> S3
                    1 -> S11
                    1 -> S8
                    RETURN
       SA3   :      C - 1 -> C[XS]
                    IF NO CARRY GO TO SA4
       STODP :      JSB CTDA
                    GO TO STORE
       SA6   :      C - 1 -> C[XS]
                    IF NO CARRY GO TO SA7
       STOSUB:      JSB SAREG
                    JSB SUB
                    GO TO SAEND
$$$$$  OFL   :      DELAYED SELECT ROM 5
                    GO TO @021
                    NO OPERATION
       ERR1  :      JSB RR
                    JSB RCLY
                    JSB RCLX
       ERR0  :      C EXCHANGE M
                    12 -> P
                    0 -> C[P]
                    C EXCHANGE M
                    CLEAR STATUS
                    1 -> S5
                    GO TO EOP0
       TRIG22:      C EXCHANGE M
       TRIG23:      JSB OFL
                    0 -> S9
                    IF S10 # 1
                        THEN GO TO EOF
                    STACK -> A
                    C -> STACK
                    0 -> A[S]
                    A EXCHANGE C[W]
                    GO TO EOF
$$$$$  MPY   :      DELAYED SELECT ROM 5
                    GO TO @117
       TST46 :      IF S4 # 1
                        THEN GO TO TST6
*****  YES   :      SELECT ROM 0
                    NO OPERATION
$$$$$  NINTY :      DELAYED SELECT ROM 0
                    GO TO @114
       OUT   :      IF S2 # 1
                        THEN GO TO OUT3
                    GO TO OUT5
$$$$$  SUB   :      DELAYED SELECT ROM 5
                    GO TO @227
       SABEG :      C EXCHANGE M
       SABEG1:      C -> A[W]
                    DATA -> C
                    A EXCHANGE C[W]
                    C -> DATA
                    RETURN
       ST01  :      JSB TST46
                    JSB CLPX
                    C EXCHANGE M
                    0 -> C[XS]
                    1 -> S2
                    C EXCHANGE M
                    GO TO EOP
                    NO OPERATION
       TST6  :      IF S6 # 1
                        THEN GO TO SUBOUT
                    GO TO YES
       CLPX  :      0 -> S6
                    0 -> S2
                    0 -> S4
                    0 -> S1
                    GO TO SUBOUT
       SA    :      JSB RR
```

```
247  L03367:  ..1.1.1...                          C EXCHANGE M
248  L03370:  111.1.111.                          A EXCHANGE C[W]
249  L03371:  ..1.1.1...                          C EXCHANGE M
250  L03372:  .....11..                           0 -> P
251  L03373:  .11....1.                           C -> A[P]
252  L03374:  111.1.111.                          A EXCHANGE C[W]
253  L03375:  .1....111.              SA1       : SHIFT LEFT A[W]
254  L03376:  ....1111.                           P + 1 -> P
255  L03377:  1.111.11..                          IF P # 11

0  L04000:  .....11....                         RETURN
  1  L04001:  1..11.1..1  -> L4232      FIT5    : JSB RCLX
  2  L04002:  .1..111..1  -> L4116                JSB MPY
  3  L04003:  .11.1.1...                          STACK -> A
  4  L04004:  1..1.111.1  -> L4227                JSB ADD
  5  L04005:  .1...1.1..                          C -> STACK
  6  L04006:  ..11...1.1  -> L4061      FIT3    : JSB STAT
  7  L04007:  1.111....1  -> L4270                JSB R1
  8  L04010:  .11...111.                          C -> A[W]
  9  L04011:  .1..111..1  -> L4116                JSB MPY
 10  L04012:  1.111..1.1  -> L4271                JSB R0
 11  L04013:  .1.11111.1  -> L4137                JSB ECHK3
 12  L04014:  .1....11.1  -> L4103                JSB DIV
 13  L04015:  1.11.111.1  -> L4267                JSB R2
 14  L04016:  1..1.11..1  -> L4226                JSB SUB
 15  L04017:  .11..1.1..                          IF S6 # 1
 16  L04020:  1.1..11.11  -> L4246                      THEN GO TO FIT0
 17  L04021:  .11....1.1  -> L4141                JSB ECHK1
 18  L04022:  .1..1111.1  -> L4117                JSB STK
 19  L04023:  .1.111.1.1  -> L4135                JSB STOY
 20  L04024:  ..11...1.1  -> L4061      LIN11   : JSB STAT
 21  L04025:  1.11.1...1  -> L4264                JSB R5
 22  L04026:  .11...111.                          C -> A[W]
 23  L04027:  1.111....1  -> L4270                JSB R1
 24  L04030:  .1..111..1  -> L4116                JSB MPY
 25  L04031:  .1..1111.1  -> L4117                JSB STK
 26  L04032:  ..11...1.1  -> L4061                JSB STAT
 27  L04033:  1.11.11..1  -> L4266                JSB R3
 28  L04034:  .11...111.                          C -> A[W]
 29  L04035:  1.11.111.1  -> L4267                JSB R2
 30  L04036:  .1..111..1  -> L4116                JSB MPY
 31  L04037:  .11.1.1...                          STACK -> A
 32  L04040:  1..1.11..1  -> L4226                JSB SUB
 33  L04041:  1.111..1.1  -> L4271                JSB R0
 34  L04042:  .1....11.1  -> L4103                JSB DIV
 35  L04043:  .1..1.1...                          C -> STACK
 36  L04044:  1...1...11  -> L4210                GO TO LIN12
 37  L04045:  1.1111.1..               $$$$$  SIGP0 : DELAYED SELECT ROM 5
 38  L04046:  ..1.11..11  -> L4054                GO TO @054
 39  L04047:  .111.1.1..               RETIN1  : IF S7 # 1
 40  L04050:  11..1..11.  -> L4310                      THEN GO TO SIGP
 41  L04051:  .1.1111.1.                          C - 1 -> C[XS]
 42  L04052:  ...1111.1.                          IF C[XS] >= 1
 43  L04053:  11..1..11.  -> L4310                      THEN GO TO SIGP
 44  L04054:  1.1...11.1  -> L4243      RECSIG  : JSB EXX
 45  L04055:  1.11.11..1  -> L4266                JSB R3
 46  L04056:  .1..1111.1  -> L4117                JSB STK
 47  L04057:  1.1...11.1  -> L4243                JSB EXX
 48  L04060:  1....11.11  -> L4206                GO TO RSIG1
 49  L04061:  111.1.111.                STAT    : A EXCHANGE C[W]
 50  L04062:  1.1...1111  -> L4243                GO TO EXX
 51  L04063:  .11..1..1.  -> L4144      .FIT    : JSB TST9
 52  L04064:  .1...1.1..                          0 -> S4
 53  L04065:  .111...1..                          1 -> S7
 54  L04066:  .1.111...1  -> L4134                JSB STOX
 55  L04067:  .1.111.1.1  -> L4135                JSB STOY
 56  L04070:  .....11.11  -> L4006                GO TO FIT3
 57  L04071:  .1....1.1.                N       : IF S4 # 1
 58  L04072:  .1..1.1.11  -> L4112                      THEN GO TO N1
 59  L04073:  .1...1.1..                          0 -> S4
 60  L04074:  1.1...11.1  -> L4243                JSB EXX
 61  L04075:  1.111....1  -> L4271                JSB R0
 62  L04076:  1.111.111.                          0 -> A[W]
 63  L04077:  11111...1.                          A + 1 -> A[P]
```

| | | | | | | |
|---|---|---|---|---|---|---|
| 64 | L04100: | 11.1...111 | -> L4321 | | | IF NO CARRY GO TO CUMY |
| 65 | L04101: | 1.1111.1.. | | $$$$$ | OFL : | DELAYED SELECT ROM 5 |
| 66 | L04102: | ...1...111 | -> L4021 | | | GO TO @021 |
| 67 | L04103: | 1.1111.1.. | | $$$$$ | DIV : | DELAYED SELECT ROM 3 |
| 68 | L04104: | ...111.111 | -> L4035 | | | GO TO @035 |
| 69 | L04105: | 1..111...1 | -> L4234 | | F : | JSB CLPX |
| 70 | L04106: | .11.....1. | | | | 1 -> S6 |
| 71 | L04107: | 1.11..1.11 | -> L4262 | | | GO TO EOP |
| 72 | L04110: | .11111.1.. | | $$$$$ | TST46 : | DELAYED SELECT ROM 3 |
| 73 | L04111: | 11.1.1.111 | -> L4325 | | | GO TO @325 |
| 74 | L04112: | .1..1.1... | | | N1 : | C -> STACK |
| 75 | L04113: | 1..11....1 | -> L4230 | | | JSB RCLY |
| 76 | L04114: | 1.11...11. | -> L4260 | | | GO TO ENT2 |
| 77 | L04115: | ...1..1111 | -> L4047 | | RETIN : | GO TO RETIN1 |
| 78 | L04116: | 1.1....111 | -> L5117 | ***** | MPY : | SELECT ROM 5 |
| 79 | L04117: | .11.1.1... | | | STK : | STACK -> A |
| 80 | L04120: | .1..1.1... | | | | C -> STACK |
| 81 | L04121: | ....11.... | | | | RETURN |
| 82 | L04122: | 1.1.11.111 | -> L4255 | | ENT : | GO TO ENT1 |
| 83 | L04123: | 1.1......1 | -> L4240 | | Y1 : | JSB WHY |
| 84 | L04124: | 1.11.11..1 | -> L4266 | | | JSB R3 |
| 85 | L04125: | .111...1.. | | | | 1 -> S7 |
| 86 | L04126: | 11.1...111 | -> L4321 | | | GO TO CUMY |
| 87 | L04127: | 1...11.1.1 | -> L4232 | | X1 : | JSB RCLX |
| 88 | L04130: | 1.1...11.1 | -> L4243 | | | JSB EXX |
| 89 | L04131: | 1.111....1 | -> L4270 | | | JSB R1 |
| 90 | L04132: | .1.....1.. | | | | 1 -> S4 |
| 91 | L04133: | 11.1...111 | -> L4321 | | | GO TO CUMY |
| 92 | L04134: | .1......1. | -> L2135 | ***** | STOX : | SELECT ROM 2 |
| 93 | L04135: | .1.111.1.. | | $$$$$ | STOY : | DELAYED SELECT ROM 2 |
| 94 | L04136: | .1111.1111 | -> L4173 | | | GO TO @173 |
| 95 | L04137: | ...111111. | | | ECHK3 : | IF C[S] >= 1 |
| 96 | L04140: | 1.11111.11 | -> L4276 | | | THEN GO TO ERR1 |
| 97 | L04141: | .11.1..11. | | | ECHK1 : | IF C[M] = 0 |
| 98 | L04142: | 1.11111.11 | -> L4276 | | | THEN GO TO ERR1 |
| 99 | L04143: | ....11.... | | | | RETURN |
| 100 | L04144: | 1..1...1.. | -> L5145 | ***** | TST9 : | SELECT ROM 5 |
| 101 | L04145: | 1.111.111. | | | STD : | 0 -> A[W] |
| 102 | L04146: | 11111....1 | | | | A + 1 -> A[P] |
| 103 | L04147: | 1..1.11..1 | -> L4226 | | | JSB SUB |
| 104 | L04150: | 1111111..1 | -> L4376 | | | JSB ECHK2 |
| 105 | L04151: | .1..1111.1 | -> L4117 | | | JSB STK |
| 106 | L04152: | .1.111.1.1 | -> L4135 | | | JSB STOY |
| 107 | L04153: | ..11...1.. | -> L4061 | | | JSB STAT |
| 108 | L04154: | 1.11.11..1 | -> L4266 | | | JSB R3 |
| 109 | L04155: | .11...111. | | | | C -> A[W] |
| 110 | L04156: | .1..111..1 | -> L4116 | | | JSB MPY |
| 111 | L04157: | 1.111..1.1 | -> L4271 | | | JSB R0 |
| 112 | L04160: | .1...11..1 | -> L4103 | | | JSB DIV |
| 113 | L04161: | 1.11.1.1.1 | -> L4265 | | | JSB R4 |
| 114 | L04162: | 1..1.11..1 | -> L4226 | | | JSB SUB |
| 115 | L04163: | .1..1111.1 | -> L4117 | | | JSB STK |
| 116 | L04164: | ....11.11. | -> L4006 | | | GO TO FIT3 |
| 117 | L04165: | 1.111....1 | -> L4270 | | LIN0 : | JSB R1 |
| 118 | L04166: | .1..1111.1 | -> L4117 | | LIN1 : | JSB STK |
| 119 | L04167: | 1..11....1 | -> L4230 | | | JSB RCLY |
| 120 | L04170: | .1..1.111. | | | | A -> B[W] |
| 121 | L04171: | .1..1111.1 | -> L4117 | | | JSB STK |
| 122 | L04172: | ...1...111. | | | | B -> C[W] |
| 123 | L04173: | 111.1.111. | | | | A EXCHANGE C[W] |
| 124 | L04174: | .1...11..1 | -> L4103 | | | JSB DIV |
| 125 | L04175: | .1..1.1... | | | | IF S4 # 1 |
| 126 | L04176: | 1......111 | -> L4201 | | | THEN GO TO LIN2 |
| 127 | L04177: | ..11.1111. | | | | 0 -> C[S] |
| 128 | L04200: | 1..1111..1 | -> L4236 | | | JSB SQRT |
| 129 | L04201: | .1.....1.1 | -> L4101 | | LIN2 : | JSB OFL |
| 130 | L04202: | .111.1.1.. | | | | IF S7 # 1 |
| 131 | L04203: | 1....11111 | -> L4207 | | | THEN GO TO EOF |
| 132 | L04204: | .1111.1... | | | | 0 -> S7 |
| 133 | L04205: | .111.11.11 | -> L4166 | | | GO TO LIN1 |
| 134 | L04206: | 1.111...1 | -> L4270 | | RSIG1 : | JSB R1 |
| 135 | L04207: | ..1..1.... | -> L1210 | ***** | EOF : | SELECT ROM 1 |
| 136 | L04210: | ..11...1.1 | -> L4061 | | LIN12 : | JSB STAT |
| 137 | L04211: | 1.111....1 | -> L4270 | | | JSB R1 |
| 138 | L04212: | .11....111. | | | | C -> A[W] |

```
139  L04213:  1.11.11..1  -> L4266
140  L04214:  .1..111..1  -> L4116
141  L04215:  1.111..1.1  -> L4271
142  L04216:  .1....11.1  -> L4103
143  L04217:  1.11.1...1  -> L4264
144  L04220:  1..1.11..1  -> L4226
145  L04221:  .111.1.1..
146  L04222:  .......111  -> L4001
147  L04223:  .1..1111.1  -> L4117
148  L04224:  111.1.111.
149  L04225:  .111.11.11  -> L4166
150  L04226:  ..1111111.
151  L04227:  1.1..1....  -> L5230
152  L04230:  .1.111.1..
153  L04231:  .11.1...11
154  L04232:  .1.111.1..  -> L4150
155  L04233:  1...111.11  -> L4216
156  L04234:  .11111.1..
157  L04235:  1111...111  -> L4361
158  L04236:  ...111.1..
159  L04237:  ..1.1.1111  -> L4053
160  L04240:  .11.1.1...
161  L04241:  111.1.111.
162  L04242:  .1..1.1...
163  L04243:  .11..111..
164  L04244:  11.....11..
165  L04245:  .....11....
166  L04246:  .1...1.1..
167  L04247:  111...1111  -> L4343
168  L04250:  .111.11.11  -> L4166
169  L04251:  ..111..1..
170  L04252:  1.111..1..
171  L04253:  1......1..
172  L04254:  ....11....
173  L04255:  .11..1...1  -> L4144
174  L04256:  .1..1....1  -> L4110
175  L04257:  .1..1.1...
176  L04260:  1...1.111.
177  L04261:  ....11.1..
178  L04262:  ..1111.1..
179  L04263:  ..111..111  -> L4071
180  L04264:  .1.11...1.
181  L04265:  .1.11...1.
182  L04266:  .1.11...1.
183  L04267:  .1.11...1.
184  L04270:  .1.11...1.
185  L04271:  .1.1..111.
186  L04272:  1..111....
187  L04273:  ..........
188  L04274:  1.11111...
189  L04275:  ....11....
190  L04276:  .11..1....  -> L3277
191  L04277:  .111.1.1..
192  L04300:  ..111..111  -> L4071
193  L04301:  .1111..1..
194  L04302:  1..11.1..1  -> L4232
195  L04303:  1.1...11.1  -> L4243
196  L04304:  1.11.1...1  -> L4264
197  L04305:  111.1.111.
198  L04306:  .11.1.1...
199  L04307:  11..111...  -> L4317
200  L04310:  .1.111.1.1  -> L4135
201  L04311:  .1111..1..
202  L04312:  1.1.....1.
203  L04313:  1.1......1  -> L4240
204  L04314:  1.11.1.1.1  -> L4265
205  L04315:  111.1.111.
206  L04316:  .11.1.111.
207  L04317:  .1..111..1  -> L4116
208  L04320:  1.11111...
209  L04321:  111.1.111.
210  L04322:  .11.1.1...
211  L04323:  11.1.1.111  -> L4325
212  L04324:  ..1111111.
213  L04325:  1..1.111.1  -> L4227
```

```
                        JSB R3
                        JSB MPY
                        JSB R0
                        JSB DIV
                        JSB R5
                        JSB SUB
                        IF S7 # 1
                            THEN GO TO FIT5
                        JSB STK
                        A EXCHANGE C[W]
                        GO TO LIN1
              SUB  :    0 - C - 1 -> C[S]
*****  ADD         :    SELECT ROM 5
$$$$$  RCLY        :    DELAYED SELECT ROM 2
                        GO TO @150
$$$$$  RCLX        :    DELAYED SELECT ROM 2
                        GO TO @216
$$$$$  CLPX        :    DELAYED SELECT ROM 3
                        GO TO @361
$$$$$  SQRT        :    DELAYED SELECT ROM 0
                        GO TO @053
              WHY  :    STACK -> A
                        A EXCHANGE C[W]
                        C -> STACK
              EXX  :    C -> A[W]
                        12 -> P
                        RETURN
              FIT0 :    IF S4 # 1
                            THEN GO TO FIT1
                        GO TO LIN1
              RR   :    0 -> S3
                        0 -> S11
                        1 -> S8
                        RETURN
              ENT1 :    JSB TST9
                        JSB TST46
                        C -> STACK
              ENT2 :    B EXCHANGE C[W]
                        CLEAR STATUS
$$$$$  EOP         :    DELAYED SELECT ROM 1
                        GO TO @071
              R5   :    C - 1 -> C[P]
              R4   :    C - 1 -> C[P]
              R3   :    C - 1 -> C[P]
              R2   :    C - 1 -> C[P]
              R1   :    C - 1 -> C[P]
              R0   :    A - C -> C[W]
                        C -> DATA ADDRESS
                        NO OPERATION
                        DATA -> C
                        RETURN
*****  ERR1        :    SELECT ROM 3
              XY   :    IF S7 # 1
                            THEN GO TO N
                        0 -> S7
                        JSB RCLX
                        JSB EXX
                        JSB R5
                        A EXCHANGE C[W]
                        STACK -> A
                        GO TO XYA
              SIGP :    JSB STOY
                        0 -> S7
                        1 -> S10
              Y2   :    JSB WHY
                        JSB R4
              X2A  :    A EXCHANGE C[W]
                        C -> A[W]
              XYA  :    JSB MPY
                        DATA -> C
              CUMY :    A EXCHANGE C[W]
                        IF S6 # 1
                            THEN GO TO CUMY1
                        0 - C - 1 -> C[S]
              CUMY1 :   JSB ADD
```

| | | | |
|---|---|---|---|
| 214 | L04326: | .1.....1.1 -> L4101 | |
| 215 | L04327: | 1.1111.... | |
| 216 | L04330: | 1.1..1.1. | |
| 217 | L04331: | 1.11111111 -> L4277 | |
| 218 | L04332: | .111.1.1. | |
| 219 | L04333: | .1.1..1111 -> L4123 | |
| 220 | L04334: | .1...1.1.. | |
| 221 | L04335: | .1.1.11111 -> L4127 | |
| 222 | L04336: | 1..11.1.1 -> L4232 | |
| 223 | L04337: | 1.1...1.1 -> L4243 | |
| 224 | L04340: | 1.11.111.1 -> L4267 | |
| 225 | L04341: | 1.1.1..1. | |
| 226 | L04342: | 11..11.111 -> L4315 | |
| 227 | L04343: | .11....1.1 -> L4141 | |
| 228 | L04344: | .111.1.1.. | |
| 229 | L04345: | 11111..111 -> L4371 | |
| 230 | L04346: | .1111..1.. | |
| 231 | L04347: | ...1.1..11 -> L4024 | |
| 232 | L04350: | 1.1.1..1.1 -> L4251 | |
| 233 | L04351: | .11..1..1 -> L4144 | |
| 234 | L04352: | .1.111..1 -> L4134 | |
| 235 | L04353: | .1.111.1.1 -> L4135 | |
| 236 | L04354: | .111...1.. | |
| 237 | L04355: | ..11...1.1 -> L4061 | |
| 238 | L04356: | 1.111..1.1 -> L4271 | |
| 239 | L04357: | .11..1.1. | |
| 240 | L04360: | .11..1.111 -> L4145 | |
| 241 | L04361: | .1.11111.1 -> L4137 | |
| 242 | L04362: | .1..1111.1 -> L4117 | |
| 243 | L04363: | .1.111.1.1 -> L4135 | |
| 244 | L04364: | ..11...1.1 -> L4061 | |
| 245 | L04365: | 1.11.11..1 -> L4266 | |
| 246 | L04366: | .1..1111.1 -> L4117 | |
| 247 | L04367: | ..11...1.1 -> L4061 | |
| 248 | L04370: | .111.1.111 -> L4165 | |
| 249 | L04371: | .11.1.1... | |
| 250 | L04372: | .1....11.1 -> L4103 | |
| 251 | L04373: | .1..1.1... | |
| 252 | L04374: | 1..11....1 -> L4230 | |
| 253 | L04375: | 1....11111 -> L4207 | |
| 254 | L04376: | .11.11111. | |
| 255 | L04377: | 1.11111.11 -> L4276 | |

| | | | |
|---|---|---|---|
| 0 | L05000: | .1.11.111. | |
| 1 | L05001: | ...111.11.. | |
| 2 | L05002: | .....1..11 -> L5004 | |
| 3 | L05003: | ....1...11 -> L5010 | |
| 4 | L05004: | .111.1.1. | |
| 5 | L05005: | .....11111 -> L5007 | |
| 6 | L05006: | ........111 | |
| 7 | L05007: | 1...1..1.1 | |
| 8 | L05010: | 1.111.1.1. | |
| 9 | L05011: | 1....1.111. | |
| 10 | L05012: | .1.11.1.11 -> L5132 | |
| 11 | L05013: | ..11.1..1 | |
| 12 | L05014: | .1.111..1. | |
| 13 | L05015: | ..11.1..1. | |
| 14 | L05016: | 111....1.1 | |
| 15 | L05017: | 11.1..1.11 -> L5322 | |
| 16 | L05020: | ..11..111. | |
| 17 | L05021: | .11...111. | |
| 18 | L05022: | 11....11.. | |
| 19 | L05023: | .1..1.1.1. | |
| 20 | L05024: | .11..1.1.. | |
| 21 | L05025: | .11.111.1. | |
| 22 | L05026: | ...11.1..11 -> L5032 | |
| 23 | L05027: | ..1.1.1.1. | |
| 24 | L05030: | .1.1111.1. | |
| 25 | L05031: | ....1.1111 -> L5013 | |
| 26 | L05032: | 111.1.1.1. | |
| 27 | L05033: | .11...111. | |
| 28 | L05034: | 11..1..11 -> L5310 | |
| 29 | L05035: | 11....11.. | |
| 30 | L05036: | ....1.111. | |

```
                JSB OFL
                C -> DATA
                IF S10 # 1
                    THEN GO TO XY
                IF S7 # 1
                    THEN GO TO Y1
                IF S4 # 1
                    THEN GO TO X1
X2      :       JSB RCLX
                JSB EXX
                JSB R2
                0 -> S10
                GO TO X2A
FIT1    :       JSB ECHK1
                IF S7 # 1
                    THEN GO TO FIT2
                0 -> S7
                GO TO LIN11
MS1     :       JSB RR
                JSB TST9
                JSB STOX
                JSB STOY
                1 -> S7
                JSB STAT
                JSB R0
                IF S6 # 1
                    THEN GO TO STD
MEAN    :       JSB ECHK3
                JSB STK
                JSB STOY
                JSB STAT
                JSB R3
                JSB STK
                JSB STAT
                GO TO LIN0
FIT2    :       STACK -> A
                JSB DIV
                C -> STACK
                JSB RCLY
                GO TO EOF
ECHK2   :       IF C[S] = 0
                    THEN GO TO ERR1

ENT10   :       C - 1 -> C[W]
                IF P # 3
                    THEN GO TO ENT13
                GO TO ENT14
ENT13   :       IF S7 # 1
                    THEN GO TO ENT12
                P - 1 -> P
ENT12   :       SHIFT RIGHT C[WP]
ENT14   :       C -> A[X]
                B EXCHANGE C[W]
                GO TO EOP
OFL1    :       0 -> C[WP]
                C - 1 -> C[WP]
                0 -> C[XS]
                A + B -> A[X]
                IF NO CARRY GO TO HALT
OFL2    :       0 -> C[W]
OFL     :       C -> A[W]
OFL4    :       12 -> P
                A -> B[X]
                C -> A[X]
                IF C[XS] = 0
                    THEN GO TO OFL5
                0 - C -> C[X]
                C - 1 -> C[XS]
                IF NO CARRY GO TO OFL1
OFL5    :       A EXCHANGE C[X]
                C -> A[W]
                GO TO SUBOUT
DIV     :       12 -> P
DIV2    :       0 -> B[W]
```

| | | | |
|---|---|---|---|
| 31 | L05037: | ...11..1.. | |
| 32 | L05040: | ...1.1..1.. | |
| 33 | L05041: | 11.111.1.. | |
| 34 | L05042: | 1.1...11.11 | -> L5246 |
| 35 | L05043: | 1.1.1.111. | |
| 36 | L05044: | 11..1...11 | -> L5310 |
| 37 | L05045: | 1....1.1.1 | -> L5205 |
| 38 | L05046: | ..1..1.1.. | |
| 39 | L05047: | .1111.1111 | -> L5173 |
| 40 | L05050: | ...1111.1. | |
| 41 | L05051: | .1111.1111 | -> L5173 |
| 42 | L05052: | .111.11... | |
| 43 | L05053: | .1.11..111 | -> L5131 |
| 44 | L05054: | 11..111..1 | -> L5316 |
| 45 | L05055: | ..11..1.1.1 | -> L5145 |
| 46 | L05056: | .1111..1.. | |
| 47 | L05057: | ...1..1.1.. | |
| 48 | L05060: | .1..1..111 | -> L5111 |
| 49 | L05061: | .111...1.. | |
| 50 | L05062: | .1..1..111 | -> L5111 |
| 51 | L05063: | 1....1.1.1 | -> L5205 |
| 52 | L05064: | ..1...1.1.. | |
| 53 | L05065: | ..1111.111 | -> L5075 |
| 54 | L05066: | ...1111.1. | |
| 55 | L05067: | .1111.111 | -> L5075 |
| 56 | L05070: | .11..11... | |
| 57 | L05071: | .1.11..111 | -> L5131 |
| 58 | L05072: | 1......1. | |
| 59 | L05073: | 1.1.11.1.. | |
| 60 | L05074: | ..1..1.... | -> L1075 |
| 61 | L05075: | ..1..1.... | |
| 62 | L05076: | .11..1.1.1 | -> L5145 |
| 63 | L05077: | 1....11.1 | -> L5203 |
| 64 | L05100: | .1.111..1 | -> L5134 |
| 65 | L05101: | .11.1.1... | |
| 66 | L05102: | .1..1111.1 | -> L5117 |
| 67 | L05103: | 1.....1.11 | -> L5202 |
| 68 | L05104: | .......... | |
| 69 | L05105: | 1....1.1.1 | -> L5205 |
| 70 | L05106: | 1..11.1111 | -> L5263 |
| 71 | L05107: | .11.....1. | |
| 72 | L05110: | .11.1.1.11 | -> L5152 |
| 73 | L05111: | .1..1..1.. | |
| 74 | L05112: | .1.111...1 | -> L5134 |
| 75 | L05113: | 1.1.1.1... | |
| 76 | L05114: | .1..11.1.1 | -> L5115 |
| 77 | L05115: | 1..111.1.. | |
| 78 | L05116: | 1.1.1...111 | -> L5251 |
| 79 | L05117: | ..1.1.1.1. | |
| 80 | L05120: | ...11..11.. | |
| 81 | L05121: | ...1111.11 | -> L5036 |
| 82 | L05122: | 1....1.1.1 | -> L5205 |
| 83 | L05123: | 1..1.1.11 | -> L5212 |
| 84 | L05124: | .......... | |
| 85 | L05125: | .11..1..1. | |
| 86 | L05126: | 1...1.111. | |
| 87 | L05127: | 1111.11.11 | -> L5366 |
| 88 | L05130: | .1...11... | |
| 89 | L05131: | ..1.1..... | |
| 90 | L05132: | ..1111.1.. | |
| 91 | L05133: | ..111..111 | -> L5071 |
| 92 | L05134: | .1..1..... | -> L2135 |
| 93 | L05135: | ...1..11.. | |
| 94 | L05136: | 1...1.1.. | |
| 95 | L05137: | 111.1.1.11 | -> L5352 |
| 96 | L05140: | 1.1.1.1... | |
| 97 | L05141: | .1.1.1.111 | -> L5125 |
| 98 | L05142: | .1...1..1. | |
| 99 | L05143: | ......11.. | |
| 100 | L05144: | .1...11111 | -> L5107 |
| 101 | L05145: | 1..1.1.1.. | |
| 102 | L05146: | 11...1..11 | -> L5304 |
| 103 | L05147: | .111...1.. | |
| 104 | L05150: | 1..11..1.. | |
| 105 | L05151: | 1.1.1...1. | |

```
                    0 -> S1
                    0 -> S2
$$$$$ DIV3    : DELAYED SELECT ROM 6
                GO TO @246
      HPI1    : C + C -> C[W]
                IF NO CARRY GO TO SUBOUT
      DIV1    : JSB SETUP
                IF S2 # 1
                    THEN GO TO DIV9
                IF C[XS] >= 1
                    THEN GO TO DIV9
                LOAD CONSTANT 7
                GO TO ADD11
      SIGP    : JSB RR
                JSB TST9
                0 -> S7
                IF S2 # 1
                    THEN GO TO SIGP1
                1 -> S7
                GO TO SIGP1
      MPY1    : JSB SETUP
                IF S2 # 1
                    THEN GO TO MPY9
                IF C[XS] >= 1
                    THEN GO TO MPY9
                LOAD CONSTANT 6
                GO TO ADD11
      SET9    : 1 -> S9
LDIS    : DELAYED SELECT GROUP 1
*****           SELECT ROM 1
      MPY9    : C EXCHANGE M
                JSB TST9
                JSB TST6
                JSB STOX
                STACK -> A
                JSB MPY
                GO TO EOF
                NO OPERATION
      ADD1    : JSB SETUP
                GO TO ADD8
      CHK0    : C -> A[P]
                GO TO CHK
      SIGP1   : 0 -> S4
                JSB STOX
                M -> C
                JSB SIGP2
$$$$$ SIGP2   : DELAYED SELECT ROM 4
                GO TO @251
      MPY     : 0 - C -> C[X]
                3 -> P
                GO TO DIV2
      SUB1    : JSB SETUP
                GO TO SUB8
                NO OPERATION
      ENT2    : C -> A[WP]
                B EXCHANGE C[W]
                GO TO ENT15
      ADD10   : LOAD CONSTANT 4
      ADD11   : C EXCHANGE M
$$$$$ EOP     : DELAYED SELECT ROM 1
                GO TO @071
***** STOX    : SELECT ROM 2
      DIGENT  : 1 -> P
                IF S9 # 1
                    THEN GO TO ENT1
                IF S10 # 1
                    THEN GO TO ENT2
                SHIFT LEFT A[WP]
                0 -> P
                GO TO CHK0
      TST9    : IF S9 # 1
                    THEN GO TO TST9A
      UNW     : 1 -> S7
                0 -> S9
                0 -> S10
```

```
106  L05152:  111.1.111.
107  L05153:  .11.1..11.
108  L05154:  ...1....11   -> L5020
109  L05155:  .11...111.
110  L05156:  .11.111.1.
111  L05157:  .111...111   -> L5161
112  L05160:  11...1....   -> LG161    *****
113  L05161:  ....1.1.1.
114  L05162:  11..1.1.1.
115  L05163:  11.1..11..
116  L05164:  .........1.
117  L05165:  1.11111111   -> L5277
118  L05166:  11.11.1.1.
119  L05167:  .....111..
120  L05170:  ..1.1.11..
121  L05171:  1.1.111111   -> L5257
122  L05172:  11..1.1111   -> L5313
123  L05173:  ..1.1.1...
124  L05174.  .11..1.1.1   -> L5145
125  L05175:  .1.111...1   -> L5134
126  L05176:  .11.1.111.
127  L05177:  1...1...11   -> L5210
128  L05200:  .11.1.1...
129  L05201:  ...111.1.1   -> L5035
130  L05202:  1....1....   -> L4203
131  L05203:  .11111.1..
132  L05204:  111.111.11   -> L5356
133  L05205:  ..1.1.11..
134  L05206:  ..1.1.1...
135  L05207:  ....11....
136  L05210:  .11111.1..
137  L05211:  11....1.11   -> L5302
138  L05212:  ..1..1.1..
139  L05213:  1...111.11   -> L5216
140  L05214:  .11.111.1.
141  L05215:  1..1.1.111   -> L5225
142  L05216:  ..1.1.1...
143  L05217:  .11..1.1.1   -> L5145
144  L05220:  1.....11.1   -> L5203
145  L05221:  .1.111...1   -> L5134
146  L05222:  .11.1.1...
147  L05223:  1..1.111.1   -> L5227
148  L05224:  1.....1.11   -> L5202
149  L05225:  .1.1.11...
150  L05226:  .1.11..111   -> L5131
151  L05227:  ..1111111.
152  L05230:  ....11...1.
153  L05231:  ..1..1.1..
154  L05232:  11....11..
155  L05233:  .....1.111.
156  L05234:  1111111.1.
157  L05235:  1111111.1.
158  L05236:  .111111.1.
159  L05237:  .111111.1.
160  L05240:  ....1..1.1.
161  L05241:  1.1...1111   -> L5243
162  L05242:  111.1.111.
163  L05243:  111.1..11.
164  L05244:  .11.1..11.
165  L05245:  1.1..1111.   -> L5247
166  L05246:  111.1.111.
167  L05247:  1...1..11.
168  L05250:  ...1..1.1.
169  L05251:  1.11111.11   -> L5276
170  L05252:  1.1...111.
171  L05253:  11111.1.1.
172  L05254:  ......111.
173  L05255:  1.11111.11   -> L5276
174  L05256:  1.1.1...11   -> L5250
175  L05257:  ..11..1...
176  L05260:  11..1.1111   -> L5313
177  L05261:  .1.....11.
178  L05262:  .111.11.11   -> L5166
179  L05263:  ..1.1.1...
180  L05264:  1.11.11111   -> L5267
```

```
CHK   : A EXCHANGE C[W]
        IF C[M] = 0
            THEN GO TO OFL2
        C -> A[W]
        IF C[XS] = 0
            THEN GO TO UNW7
        SELECT ROM 6
UNW7  : 0 -> B[X]
        A EXCHANGE B[X]
        13 -> P
UNW8  : IF B[P] = 0
            THEN GO TO UNW1
UNW5  : A - 1 -> A[X]
        P - 1 -> P
        IF P # 2
            THEN GO TO UNW3
        GO TO UNW9
DIV9  : C EXCHANGE M
        JSB TST9
        JSB STOX
        IF C[W] = 0
            THEN GO TO ERR0
        STACK -> A
DIV10 : JSB DIV
EOF   : SELECT ROM 4
TST6  : DELAYED SELECT ROM 3
        GO TO @356
SETUP : 2 -> P
        C EXCHANGE M
        RETURN
ERR0  : DELAYED SELECT ROM 3
        GO TO @302
SUB8  : IF S2 # 1
            THEN GO TO SUB9
        IF C[XS] = 0
            THEN GO TO SUB10
SUB9  : C EXCHANGE M
        JSB TST9
        JSB TST6
        JSB STOX
        STACK -> A
        JSB SUB
        GO TO EOF
SUB10 : LOAD CONSTANT 5
        GO TO ADD11
SUB   : 0 - C - 1 -> C[S]
ADD   : 0 -> S1
        0 -> S2
        12 -> P
ADD3  : 0 -> B[W]
        A + 1 -> A[XS]
        A + 1 -> A[XS]
        C + 1 -> C[XS]
        C + 1 -> C[XS]
        IF A >= C[X]
            THEN GO TO ADD4
        A EXCHANGE C[W]
ADD4  : A EXCHANGE C[M]
        IF C[M] = 0
            THEN GO TO ADD5
        A EXCHANGE C[W]
ADD5  : B EXCHANGE C[M]
ADD6  : IF A >= C[X]
            THEN GO TO ADD7
        SHIFT RIGHT B[W]
        A + 1 -> A[X]
        IF B[W] = 0
            THEN GO TO ADD7
        GO TO ADD6
UNW3  : IF C[P] >= 1
            THEN GO TO UNW9
        SHIFT LEFT A[M]
        GO TO UNW5
ADD8  : IF S2 # 1
            THEN GO TO ADD9
```

```
181   L05265;  .11.111.1.
182   L05266;  .1.11...11    -> L5130
183   L05267;  ..11.1.1.
184   L05270;  .11.1.1.1     -> L5145
185   L05271;  1......11.1   -> L5003
186   L05272;  .1.111..1.    -> L5134
187   L05273;  .11.1.1...
188   L05274;  1..11....1    -> L5230
189   L05275;  1.....1.11    -> L5202
190   L05276;  11...1....    -> L6277
191   L05277;  .....111..
192   L05300;  ...11..1..
193   L05301;  .11.1..111    -> L5311
194   L05302;  .1.....11.
195   L05303;  .111.1..11    -> L5164
196   L05304;  1...1.111.
197   L05305;  ...11..11.
198   L05306;  11..1...11    -> L5310
199   L05307;  ..11.111..
200   L05310;  ..1..1..1.    -> L1311
201   L05311;  ..1..1...1.
202   L05312;  11.11.1111    -> L5333
203   L05313;  1111...1.1
204   L05314;  111.1.111.
205   L05315;  11.1111.11    -> L5336
206   L05316;  ..11....1.
207   L05317;  1.11..1...
208   L05320;  1..1..1...
209   L05321;  ....11....
210   L05322;  ..1.1.1...
211   L05323;  ..11.....1.
212   L05324;  ..1.1.1...
213   L05325;  ...1...111    -> L5021
214   L05326;  ..1..1111     -> L5043
215   L05327;  ..1..1111     -> L5043
216   L05330;  11...1....    -> L6331
217   L05331;  11.....11.
218   L05332;  11.1.11.11    -> L5326
219   L05333;  11111.1.1.
220   L05334;  1....111..
221   L05335;  11..1..111    -> L5311
222   L05336;  11..1.1.1.
223   L05337;  .....1.1.1
224   L05340;  1..1.1....
225   L05341;  ...1....111   -> L5021
226   L05342;  .11.111.1.
227   L05343;  .1.11.1.11    -> L5132
228   L05344;  ..1.1.1...
229   L05345;  .11.111.1.
230   L05346;  .1.11.1.11    -> L5132
231   L05347;  11..111..1    -> L5316
232   L05350;  .11..11.1.    -> L5147
233   L05351;  1.....1.11    -> L5202
234   L05352;  1...1.111.
235   L05353;  1.....1...
236   L05354;  .111.1.1..
237   L05355;  1111...11     -> L5360
238   L05356;  .1111..1..
239   L05357;  .1..1.1...
240   L05360;  11..11...1.
241   L05361;  1.1111111.
242   L05362;  ..1.11.111
243   L05363;  ..1.11.111
244   L05364;  ..1.11111.
245   L05365;  .11111111.
246   L05366;  .1111.111.
247   L05367;  ...11...1.
248   L05370;  ........11    -> L5000
249   L05371;  .1...1..1.
250   L05372;  ....1111..
251   L05373;  1111.1111.    -> L5367
252   L05374;  11..111...1   -> L5316
253   L05375;  .11..1.1..    -> L5145
254   L05376;  1...1.111.
255   L05377;  .111.1.11     -> L5072
```

```
              IF C[XS] = 0
                  THEN GO TO ADD10
    ADD9  : C EXCHANGE M
            JSB TST9
            JSB TST0
            JSB ST0X
            STACK -> A
            JSB ADD
            GO TO EOF
*****  ADD7 : SELECT ROM 6
       UNW1 : P - 1 -> P
              IF C[P] >= 1
                  THEN GO TO UNW2
              SHIFT LEFT A[M]
              GO TO UNW0
       TST9A: B EXCHANGE C[W]
              IF C[M] >= 1
                  THEN GO TO SUBOUT
              0 -> C[W]
***** SUBOUT: SELECT ROM 1
       UNW2 : IF B[P] = 0
                  THEN GO TO UNW4
       UNW9 : A + C -> A[X]
              A EXCHANGE C[W]
              GO TO ISIT
       RR   : 1 -> S3
              1 -> S11
              0 -> S8
              RETURN
       HALT : C EXCHANGE M
       HALT1: 0 -> C[P]
              C EXCHANGE M
              GO TO OFL
       QPI1 : IF S1 # 1
                  THEN GO TO HPI1
*****         SELECT ROM 6
              12 -> P
              GO TO QPI1
       UNW4 : A + 1 -> A[X]
              P - 1 -> P
              GO TO UNW2
       ISIT : A EXCHANGE B[X]
       ISIT1: 0 -> B[X]
              IF S9 # 1
                  THEN GO TO OFL
              IF C[XS] = 0
                  THEN GO TO EOP
              0 - C -> C[X]
              IF C[XS] = 0
                  THEN GO TO EOP
       NFG  : JSB RR
              JSB UNW
              GO TO EOF
       ENT1 : B EXCHANGE C[W]
              1 -> S9
              IF S7 # 1
                  THEN GO TO ENT5
              0 -> S7
              C -> STACK
       ENT5 : A EXCHANGE B[WP]
              0 -> A[S]
              0 -> C[W]
              C - 1 -> C[W]
              0 - C -> C[S]
              C + 1 -> C[W]
       ENT15: C + 1 -> C[W]
       ENT11: IF C[P] >= 1
                  THEN GO TO ENT10
              SHIFT LEFT A[WP]
              P + 1 -> P
              GO TO ENT11
       SLRN3: JSB RR
              JSB TST9
              B EXCHANGE C[W]
              GO TO SET0
```

```
0   L06000:  1111..1111   -> L6363
1   L06001:  11..1.111.
2   L06002:  ..1.1....1   -> L6050
3   L06003:  .11.1.1..
4   L06004:  ..1.1....1   -> L6050
5   L06005:  .11.1.1...
6   L06006:  1..1.1.1.
7   L06007:  ....1..111   -> L6011
8   L06010:  111.1.111.
9   L06011:  .1.1.1..
10  L06012:  ...1.1.11    -> L6022
11  L06013:  ..11.1111.
12  L06014:  1.1..11..1   -> L6246
13  L06015:  .1..1.1..
14  L06016:  1.1.1.1.1    -> L6245
15  L06017:  1..11....1   -> L6230
16  L06020:  ..1.1.1.1    -> L6045
17  L06021:  .11.1.1...
18  L06022:  1.1..11..1   -> L6246
19  L06023:  .1..1.1..
20  L06024:  .111.1.11    -> L6164
21  L06025:  1.111.111.
22  L06026:  11111...1.
23  L06027:  .1..1..11.
24  L06030:  111.1..11.
25  L06031:  .1.11.1.1.
26  L06032:  1.1..1.1.
27  L06033:  .11.111.1.
28  L06034:  ...11..111   -> L6031
29  L06035:  1.11.1..1.
30  L06036:  .1111.1.1.
31  L06037:  ...111.111   -> L6035
32  L06040:  1..11..111.
33  L06041:  1.1...111.
34  L06042:  .1..1.1..
35  L06043:  1...1.111.
36  L06044:  .1....111    -> L6101
37  L06045:  1...1.111.
38  L06046:  .1....11..
39  L06047:  11.1111.11   -> L6336
40  L06050:  .1..1.1...
41  L06051:  111.1.111.
42  L06052:  .11.1...1.
43  L06053:  ..1.11.111   -> L6055
44  L06054:  ..1.1.111.
45  L06055:  .11...111.
46  L06056:  ..1...1.1.
47  L06057:  11..1.1111   -> L6313
48  L06060:  .11..1111.
49  L06061:  ...1.1.1.
50  L06062:  ..1..1.111   -> L6045
51  L06063:  .1...1.1..
52  L06064:  .111.11.11   -> L6166
53  L06065:  .1.1.1.1.
54  L06066:  ...1.1.111   -> L6025
55  L06067:  ..1111111.
56  L06070:  111.11111.
57  L06071:  ....11.111   -> L6015
58  L06072:  1.1..1.1.
59  L06073:  11.111111.
60  L06074:  ..111.1.11   -> L6072
61  L06075:  .11111.111.
62  L06076:  11..11..1.
63  L06077:  .111.1.1..
64  L06100:  11..1.111.
65  L06101:  .1..1.111.
66  L06102:  11.1....1.
67  L06103:  ..111.1111   -> L6073
68  L06104:  .11.1.1..
69  L06105:  1..11..111.
70  L06106:  111.11..1.
71  L06107:  11..1.111.
72  L06110:  .1....1.1.
73  L06111:  .1..1.1..
74  L06112:  111111111.
75  L06113:  111111111.
```

```
                GO TO TAN13
TAN15 :  A EXCHANGE B[W]
         JSB TNM11
         STACK -> A
         JSB TNM11
         STACK -> A
         IF S9 # 1
              THEN GO TO TAN16
         A EXCHANGE C[W]
TAN16 :  IF S5 # 1
              THEN GO TO ASN12
         0 -> C[S]
         JSB DIV11
ASN11 :  C -> STACK
         JSB MPY11
         JSB ADD10
         JSB SQT11
         STACK -> A
ASN12 :  JSB DIV11
         IF S4 # 1
              THEN GO TO TOUT
ATN11 :  0 -> A[W]
         A + 1 -> A[P]
         A -> B[M]
         A EXCHANGE C[M]
ATN12 :  C - 1 -> C[X]
         SHIFT RIGHT B[WP]
         IF C[XS] = 0
              THEN GO TO ATN12
ATN13 :  SHIFT RIGHT A[WP]
         C + 1 -> C[X]
         IF NO CARRY GO TO ATN13
         SHIFT RIGHT A[W]
         SHIFT RIGHT B[W]
         C -> STACK
ATN14 :  B EXCHANGE C[W]
         GO TO ATN18
SQT11 :  B EXCHANGE C[W]
         4 -> P
         GO TO SQT14
TNM11 :  C -> STACK
         A EXCHANGE C[W]
         IF C[P] = 0
              THEN GO TO TNM12
         0 - C -> C[W]
TNM12 :  C -> A[W]
         B -> C[X]
         GO TO ADD15
SIN11 :  C -> A[W]
         IF S1 # 1
              THEN GO TO SQT11
         IF S4 # 1
              THEN GO TO LTJ11
         IF S5 # 1
              THEN GO TO ATN11
         0 - C - 1 -> C[S]
         A EXCHANGE C[S]
         GO TO TR11
ATN15 :  SHIFT RIGHT B[WP]
ATN16 :  A - 1 -> A[S]
         IF NO CARRY GO TO ATN15
         C + 1 -> C[S]
         A EXCHANGE B[WP]
         A + C -> C[WP]
         A EXCHANGE B[W]
ATN18 :  A -> B[W]
         A - C -> A[WP]
         IF NO CARRY GO TO ATN16
         STACK -> A
         SHIFT RIGHT A[W]
         A EXCHANGE C[WP]
         A EXCHANGE B[W]
         SHIFT LEFT A[WP]
         C -> STACK
         A + 1 -> A[S]
         A + 1 -> A[S]
```

| # | Label | Bits | Target | | Label | Instruction |
|---|---|---|---|---|---|---|
| 76 | L06114: | ..1...1111 | -> L6043 | | | IF NO CARRY GO TO ATN14 |
| 77 | L06115: | ..11..111. | | | | 0 -> C[W] |
| 78 | L06116: | ....1.1.1. | | | | 0 -> B[X] |
| 79 | L06117: | 1.11.1.11. | | | | SHIFT RIGHT A[MS] |
| 80 | L06120: | 1.11..1..1 | -> L6262 | | | JSB DIV14 |
| 81 | L06121: | .1.11...1. | | | | C - 1 -> C[P] |
| 82 | L06122: | .11.1.1... | | | | STACK -> A |
| 83 | L06123: | 111.1.111. | | | | A EXCHANGE C[W] |
| 84 | L06124: | .1..1.11.. | | | | 4 -> P |
| 85 | L06125: | 1.1..1..1. | -> L6244 | ATN17 : | JSB PQ013 |
| 86 | L06126: | .11...11.. | | | | 6 -> P |
| 87 | L06127: | 1..11.11.1 | -> L6233 | | | JSB PMU11 |
| 88 | L06130: | ·1.....11.. | | | | 8 -> P |
| 89 | L06131: | 1..11.11.1 | -> L6233 | | | JSB PMU11 |
| 90 | L06132: | ..1..11... | | | | 2 -> P |
| 91 | L06133: | 1...11..... | | | | LOAD CONSTANT 8 |
| 92 | L06134: | 1.1..11... | | | | 10 -> P |
| 93 | L06135: | 1..11.11.1 | -> L6233 | | | JSB PMU11 |
| 94 | L06136: | 1...111..1 | -> L6216 | | | JSB ATCD1 |
| 95 | L06137: | 1..11.11.1 | -> L6233 | | | JSB PMU11 |
| 96 | L06140: | 11..11...1 | -> L6314 | | | JSB ATC1 |
| 97 | L06141: | .1..11.111 | | | | SHIFT LEFT A[W] |
| 98 | L06142: | 1..11.11.1 | -> L6233 | | | JSB PMU11 |
| 99 | L06143: | ..1...111. | | | | B -> C[W] |
| 100 | L06144: | 11..1.11.1 | -> L6313 | | | JSB ADD15 |
| 101 | L06145: | 11..11...1 | -> L6314 | | | JSB ATC1 |
| 102 | L06146: | 1.1..1.111. | | | | C + C -> C[W] |
| 103 | L06147: | 1.1..11..1 | -> L6246 | | | JSB DIV11 |
| 104 | L06150: | 1..1.1.1.. | | | | IF S9 # 1 |
| 105 | L06151: | .11.11..11 | -> L6154 | | | THEN GO TO ATN19 |
| 106 | L06152: | ..1111111. | | | | 0 - C - 1 -> C[S] |
| 107 | L06153: | 1..11....1 | -> L6230 | | | JSB ADD10 |
| 108 | L06154: | 11..11...1 | -> L6314 | ATN19 : | JSB ATC1 |
| 109 | L06155: | 1.1.1.111. | | | | C + C -> C[W] |
| 110 | L06156: | 1.1..1.1.1 | -> L6245 | | | JSB MPY11 |
| 111 | L06157: | .11111.1.. | | $$$$$ ITOUT : | DELAYED SELECT ROM 3 |
| 112 | L06160: | 1...11.111 | -> L6215 | | | GO TO @215 |
| 113 | L06161: | ..1.1.1.1. | | | | 0 - C -> C[X] |
| 114 | L06162: | 111111.1.. | | $$$$$ | DELAYED SELECT ROM 7 |
| 115 | L06163: | ....111.11 | -> L6016 | | | GO TO @016 |
| 116 | L06164: | ...111.1.. | | $$$$$ TOUT : | DELAYED SELECT ROM 0 |
| 117 | L06165: | 11..11..11 | -> L6314 | | | GO TO @314 |
| 118 | L06166: | 11..11...1 | -> L6314 | LPI11 : | JSB ATC1 |
| 119 | L06167: | 1.1.1.111. | | | | C + C -> C[W] |
| 120 | L06170: | 1.1.1.111. | | | | C + C -> C[W] |
| 121 | L06171: | 1..1.1.1.1 | -> L6225 | | | JSB RTN11 |
| 122 | L06172: | 1.1.1.111. | | | | C + C -> C[W] |
| 123 | L06173: | 111.1.11.1 | -> L6353 | | | JSB PRE11 |
| 124 | L06174: | 11..11...1 | -> L6314 | | | JSB ATC1 |
| 125 | L06175: | 1.1...11.. | | | | 10 -> P |
| 126 | L06176: | 1..111..11 | -> L6234 | | | JSB PQ011 |
| 127 | L06177: | 1...111..1 | -> L6216 | | | JSB ATCD1 |
| 128 | L06200: | 1.....11.. | | | | 8 -> P |
| 129 | L06201: | 1..111.1.1 | -> L6235 | | | JSB PQ012 |
| 130 | L06202: | ..1....11. | | | | 2 -> P |
| 131 | L06203: | 1.....11... | | | | LOAD CONSTANT 8 |
| 132 | L06204: | .11...11.. | | | | 6 -> P |
| 133 | L06205: | 1..111..11 | -> L6234 | | | JSB PQ011 |
| 134 | L06206: | .1....11.. | | | | 4 -> P |
| 135 | L06207: | 1..111..11 | -> L6234 | | | JSB PQ011 |
| 136 | L06210: | 1..111..11 | -> L6234 | | | JSB PQ011 |
| 137 | L06211: | 11..1.111. | | | | A EXCHANGE B[W] |
| 138 | L06212: | 1..1..111. | | | | SHIFT RIGHT C[W] |
| 139 | L06213: | 11.1.11... | | | | 13 -> P |
| 140 | L06214: | .1.1.11... | | | | LOAD CONSTANT 5 |
| 141 | L06215: | -11111.1111 | -> L6373 | | | GO TO TAN14 |
| 142 | L06216: | .11...11... | | ATCD1 : | 6 -> P |
| 143 | L06217: | 1.....11.. | | | | LOAD CONSTANT 8 |
| 144 | L06220: | .11...11.. | | | | LOAD CONSTANT 6 |
| 145 | L06221: | .1.1.11... | | | | LOAD CONSTANT 5 |
| 146 | L06222: | ...1.11... | | | | LOAD CONSTANT 2 |
| 147 | L06223: | .1...11... | | | | LOAD CONSTANT 4 |
| 148 | L06224: | 1..1.11... | | | | LOAD CONSTANT 9 |
| 149 | L06225: | ...1.1.1.. | | RTN11 : | IF S1 # 1 |
| 150 | L06226: | 11.11.1.11 | -> L6332 | | | THEN GO TO RTN12 |

```
151  L06227:  .....11....
152  L06230:  1.111.111.
153  L06231:  11111...1.
154  L06232:  1.1..1..1.   -> L5233   *****
155  L06233:  111..1....   -> L7234   *****
156  L06234:  .1.....111
157  L06235:  1.1..1.11.
158  L06236:  1....1.111
159  L06237:  1.1....111   -> L6241
160  L06240:  .11111111.
161  L06241:  11.....111
162  L06242:  1.1.....11   -> L6240
163  L06243:  111...111.
164  L06244:  111..1....   -> L7245   *****
165  L06245:  111..1....   -> L7246   *****
166  L06246:  .1.1..1.1.
167  L06247:  111..1....   -> L7250   *****
168  L06250:  .1111...1.
169  L06251:  11.1..111.
170  L06252:  1.1.1...11   -> L6250
171  L06253:  1111..111.
172  L06254:  .1.....111
173  L06255:  .....111..
174  L06256:  1..1.1..1.
175  L06257:  ....1.11..
176  L06260:  1.1.1..111   -> L6251
177  L06261:  ..1.11.111   -> L6055
178  L06262:  .1111...1.
179  L06263:  11....1.11
180  L06264:  1.11..1.11   -> L6262
181  L06265:  111..1.11.
182  L06266:  .1...1.11.
183  L06267:  .....111..
184  L06270:  ....1.11..
185  L06271:  1.11..1111   -> L6263
186  L06272:  ..1.11.111   -> L6055
187  L06273:  .....111..
188  L06274:  111..1.11.
189  L06275:  11.11.1111   -> L6333
190  L06276:  .11..1....   -> L3277   *****
191  L06277:  .1.1111.1.
192  L06300:  .1.1111.1.
193  L06301:  1.111.1.1.
194  L06302:  11.1.1111.
195  L06303:  1..111111.
196  L06304:  11...11.11   -> L6306
197  L06305:  111..1....   -> L7306   *****
198  L06306:  1....1..11
199  L06307:  11..1.1.11   -> L6312
200  L06310:  ..1111111.
201  L06311:  11..1.111.
202  L06312:  11.....111
203  L06313:  111..1....   -> L7314   *****
204  L06314:  ...11..111
205  L06315:  1.11..11..
206  L06316:  .111.11...
207  L06317:  1.....11..
208  L06320:  .1.1.11...
209  L06321:  ..11.11...
210  L06322:  1...1.11..
211  L06323:  1.....11..
212  L06324:  .....1.11.
213  L06325:  .11..11...
214  L06326:  ..11.11...
215  L06327:  .1.1.11...
216  L06330:  1.1..1....   -> L5331   *****
217  L06331:  ....11....
218  L06332:  .11..1....   -> L3333   *****
219  L06333:  111...1.1.
220  L06334:  11.1111.11   -> L6336
221  L06335:  .1.11...1.
222  L06336:  .11111111.
223  L06337:  .....1.11.
224  L06340:  1.111.1111   -> L6273
225  L06341:  111.1.1.1.
```

```
              RETURN
ADD10  :  0 -> A[W]
          A + 1 -> A[P]
ADD11  :  SELECT ROM 5
PMU11  :  SELECT ROM 7
PQ011  :  SHIFT LEFT A[W]
PQ012  :  SHIFT RIGHT B[MS]
          B EXCHANGE C[W]
          GO TO PQ016
PQ015  :  C + 1 -> C[S]
PQ016  :  A - B -> A[W]
          IF NO CARRY GO TO PQ015
          A + B -> A[W]
PQ013  :  SELECT ROM 7
MPY11  :  SELECT ROM 7
DIV11  :  A - C -> C[X]
          SELECT ROM 7
SQT15  :  C + 1 -> C[P]
SQT16  :  A - C -> A[W]
          IF NO CARRY GO TO SQT15
          A + C -> A[W]
          SHIFT LEFT A[W]
          P - 1 -> P
SQT17  :  SHIFT RIGHT C[WP]
          IF P # 0
              THEN GO TO SQT16
          GO TO TNM12
DIV14  :  C + 1 -> C[P]
DIV15  :  A - B -> A[MS]
          IF NO CARRY GO TO DIV14
          A + B -> A[MS]
          SHIFT LEFT A[MS]
DIV16  :  P - 1 -> P
          IF P # 0
              THEN GO TO DIV15
          GO TO TNM12
SQT12  :  P - 1 -> P
          A + B -> A[MS]
          IF NO CARRY GO TO SQT18
          SELECT ROM 3
ADD12  :  C - 1 -> C[XS]
          C - 1 -> C[XS]
          0 -> A[X]
          A - C -> A[S]
          IF A[S] >= 1
              THEN GO TO ADD13
          SELECT ROM 7
ADD13  :  IF A >= B[M]
              THEN GO TO ADD14
          0 - C - 1 -> C[S]
          A EXCHANGE B[W]
ADD14  :  A - B -> A[W]
ADD15  :  SELECT ROM 7
ATC1   :  0 -> C[W]
          11 -> P
          LOAD CONSTANT 7
          LOAD CONSTANT 8
          LOAD CONSTANT 5
          LOAD CONSTANT 3
          LOAD CONSTANT 9
          LOAD CONSTANT 8
          LOAD CONSTANT 1
          LOAD CONSTANT 6
          LOAD CONSTANT 3
          LOAD CONSTANT 5
          SELECT ROM 5
          RETURN
RTN12  :  SELECT ROM 3
SQT18  :  A + B -> A[X]
          IF NO CARRY GO TO SQT14
          C - 1 -> C[P]
SQT14  :  C + 1 -> C[S]
          IF P # 0
              THEN GO TO SQT12
          A EXCHANGE C[X]
```

```
226  L06342:  1.111.1.1.
227  L06343:  ...11...1.
228  L06344:  111..11.11  -> L6346
229  L06345:  1.11..111.
230  L06346:  1..1..111.
231  L06347:  1...1.1.1.
232  L06350:  ..11..1.1.
233  L06351:  11....11..
234  L06352:  1.1.111.11  -> L6256
235  L06353:  111..1....  -> L7354
236  L06354:  1.1..1.1..
237  L06355:  1.1..1.1..
238  L06356:  .1.111111.
239  L06357:  111.11..11  -> L6354
240  L06360:  .111.1..1.
241  L06361:  11...1..1.
242  L06362:  1...11..1.
243  L06363:  ..1...111.
244  L06364:  11.111111.
245  L06365:  111.111.11  -> L6356
246  L06366:  111.11..1.
247  L06367:  .11.1.1...
248  L06370:  ....1111..
249  L06371:  .......111  -> L6001
250  L06372:  .1....111.
251  L06373:  111.11..1.
252  L06374:  .1...1.1..
253  L06375:  1.1..1.1.
254  L06376:  .1.111111.
255  L06377:  1...11111.
```

MERL0 OBJECT PROGRAM

```
 0  L07000:  ..........
 1  L07001:  11..11111.
 2  L07002:  111111111.
 3  L07003:  1..1.1.11.
 4  L07004:  .1...1.1..
 5  L07005:  ...1..1.11  -> L7022
 6  L07006:  .11.1.1...
 7  L07007:  1.1..11..1  -> L7246
 8  L07010:  .1...1....  -> L2011
 9  L07011:  1111.11..1  -> L7366
10  L07012:  ....1.111.
11  L07013:  1.1..11..1  -> L7246
12  L07014:  .11...111.
13  L07015:  .1....1.11  -> L7102
14  L07016:  .1.1111.1.
15  L07017:  1.1111.1..
16  L07020:  .111...111  -> L7161
17  L07021:  .111111111
18  L07022:  .1..1.111.
19  L07023:  1..1.11..1  -> L7226
20  L07024:  11.11...1.
21  L07025:  ...1...111  -> L7021
22  L07026:  11..11..1.
23  L07027:  111..1111.
24  L07030:  ........111  -> L7001
25  L07031:  .111...111
26  L07032:  .11.11.1.1  -> L7155
27  L07033:  1.....11..
28  L07034:  1..111.1.1  -> L7235
29  L07035:  1..1..11..
30  L07036:  1..111...1  -> L7234
31  L07037:  1111111..1  -> L7376
32  L07040:  1..1..11..
33  L07041:  1..111...1  -> L7234
34  L07042:  .11111.1.1  -> L7175
35  L07043:  1.11..11..
36  L07044:  1..111...1  -> L7234
37  L07045:  11.11111.1  -> L7337
38  L07046:  1..111...1  -> L7234
39  L07047:  1.111..1.1  -> L7271
40  L07050:  1..111...1  -> L7234
```

```
                    0 -> A[X]
                    IF C[P] >= 1
                       THEN GO TO SQT13
                    SHIFT RIGHT A[W]
         SQT13 :    SHIFT RIGHT C[W]
                    B EXCHANGE C[X]
                    0 -> C[X]
                    12 -> P
                    GO TO SQT17
*****    PRE11 :    SELECT ROM 7
         TAN18 :    SHIFT RIGHT B[WP]
                    SHIFT RIGHT B[WP]
         TAN19 :    C - 1 -> C[S]
                    IF NO CARRY GO TO TAN18
                    A + C -> C[WP]
                    A - B -> A[WP]
                    B EXCHANGE C[WP]
         TAN13 :    B -> C[W]
                    A - 1 -> A[S]
                    IF NO CARRY GO TO TAN19
                    A EXCHANGE C[WP]
                    STACK -> A
                    IF B[S] = 0
                       THEN GO TO TAN15
                    SHIFT LEFT A[W]
         TAN14 :    A EXCHANGE C[WP]
                    C -> STACK
                    SHIFT RIGHT B[WP]
                    C - 1 -> C[S]
                    B EXCHANGE C[S]

NO OPERATION
         LN24  :    A EXCHANGE B[S]
                    A + 1 -> A[S]
                    SHIFT RIGHT C[MS]
                    SHIFT LEFT A[WP]
                    GO TO LN26
         XTY22 :    STACK -> A
                    JSB MPY21
*****    XTY21 :    SELECT ROM 2
                    JSB LNC10
                    0 -> B[W]
                    JSB MPY21
                    C -> A[W]
                    GO TO EXP21
                    C - 1 -> C[XS]
$$$$$               DELAYED SELECT ROM 5
                    GO TO @161
         LN25  :    C + 1 -> C[S]
         LN26  :    A -> B[W]
                    JSB ECA22
                    A - 1 -> A[P]
                    IF NO CARRY GO TO LN25
                    A EXCHANGE B[WP]
                    A + B -> A[S]
                    IF NO CARRY GO TO LN24
                    7 -> P
                    JSB PQ023
                    8 -> P
                    JSB PMU22
                    9 -> P
                    JSB LNCD3
                    10 -> P
                    JSB PMU21
                    JSB LNCD2
                    11 -> P
                    JSB PMU21
                    JSB LNCD1
                    JSB PMU21
                    JSB LNC2
                    JSB PMU21
```

```
41   L07051:  1111.11..1    -> L7366
42   L07052:  111.1.111.
43   L07053:  .1.1..111.
44   L07054:  .....11.1.
45   L07055:  ...1.111111   -> L7057
46   L07056:  .1.1..111.
47   L07057:  11..1.111.
48   L07060:  .....111..
49   L07061:  .1...111..
50   L07062:  ...11.11..
51   L07063:  ..11....11    -> L7060
52   L07064:  111.1.111.
53   L07065:  .11.11111.
54   L07066:  ..111...11    -> L7070
55   L07067:  ..111..11.
56   L07070:  .1111.1.1.
57   L07071:  1.11..11..
58   L07072:  11...1.1.1    -> L7305
59   L07073:  1..1.1.1..
60   L07074:  .....11.11    -> L7006
61   L07075:  .1.1.1.1..
62   L07076:  1..1.1..11    -> L7224
63   L07077:  1111.11..1    -> L7366
64   L07100:  1..1.111.1    -> L7247
65   L07101:  1...1.1..11   -> L7224
66   L07102:  1111.11..1    -> L7366
67   L07103:  111.11..1.    -> L7354
68   L07104:  1.111..1.1    -> L7271
69   L07105:  1.11...11..
70   L07106:  1..11.11.1    -> L7233
71   L07107:  11.11111.1    -> L7337
72   L07110:  1.1...11..
73   L07111:  1..11.11.1    -> L7233
74   L07112:  .11111.1.1    -> L7175
75   L07113:  1..1..11..
76   L07114:  1..11.11.1    -> L7233
77   L07115:  1111111..1    -> L7376
78   L07116:  1.....11..
79   L07117:  1..11.11.1    -> L7233
80   L07120:  1..11.11.1    -> L7233
81   L07121:  1..11.11.1    -> L7233
82   L07122:  .11....11.
83   L07123:  1.1111..1.
84   L07124:  11.1..11..
85   L07125:  1...1.111.
86   L07126:  111.1.111.
87   L07127:  .11..11...
88   L07130:  1...111.11    -> L7216
89   L07131:  ...1..1.1.
90   L07132:  .1.1111.11    -> L7136
91   L07133:  11111.1.1.
92   L07134:  1...1111..
93   L07135:  11....1.11    -> L7302
94   L07136:  11...11...
95   L07137:  .1.11..111    -> L7131
96   L07140:  111...11..
97   L07141:  .1.....111
98   L07142:  .1.11..1.1
99   L07143:  .1.111..11    -> L7134
100  L07144:  1.11..111.
101  L07145:  ..11.1..1.
102  L07146:  111.1.1.1.
103  L07147:  .11.11111.
104  L07150:  .11.11..11    -> L7154
105  L07151:  11..1.111.
106  L07152:  11...111..
107  L07153:  ..111.111.
108  L07154:  1.11..111.
109  L07155:  1...1.111.
110  L07156:  ..11..111.
111  L07157:  .1.11.111.
112  L07160:  ...1..1.1.
113  L07161:  .111.11.11    -> L7166
114  L07162:  .1...11...
115  L07163:  .1111..11.
```

```
              JSB LNC10
              A EXCHANGE C[W]
              A - C -> C[W]
              IF B[XS] = 0
                 THEN GO TO LN27
              A - C -> C[W]
LN27 :        A EXCHANGE B[W]
LN28 :        P - 1 -> P
              SHIFT LEFT A[W]
              IF P # 1
                 THEN GO TO LN28
              A EXCHANGE C[W]
              IF C[S] = 0
                 THEN GO TO LN29
              0 - C - 1 -> C[M]
LN29 :        C + 1 -> C[X]
              11 -> P
              JSB MPY27
              IF S9 # 1
                 THEN GO TO XTY22
              IF S5 # 1
                 THEN GO TO RTN21
              JSB LNC10
              JSB MPY22
              GO TO RTN21
EXP21 :       JSB LNC10
              JSB PRE21
              JSB LNC2
              11 -> P
              JSB PQ021
              JSB LNCD1
              10 -> P
              JSB PQ021
              JSB LNCD2
              9 -> P
              JSB PQ021
              JSB LNCD3
              8 -> P
              JSB PQ021
              JSB PQ021
              JSB PQ021
              6 -> P
              0 -> A[WP]
              13 -> P
              B EXCHANGE C[W]
              A EXCHANGE C[W]
              LOAD CONSTANT 6
              GO TO EXP23
PRE23 :       IF S2 # 1
                 THEN GO TO PRE24
              A + 1 -> A[X]
PRE29 :       IF A[XS] >= 1
                 THEN GO TO PRE27
PRE24 :       A - B -> A[MS]
              IF NO CARRY GO TO PRE23
              A + B -> A[MS]
              SHIFT LEFT A[W]
              C - 1 -> C[X]
              IF NO CARRY GO TO PRE29
PRE25 :       SHIFT RIGHT A[W]
              0 -> C[WP]
              A EXCHANGE C[X]
PRE26 :       IF C[S] = 0
                 THEN GO TO PRE28
              A EXCHANGE B[W]
              A - B -> A[W]
              0 - C - 1 -> C[W]
PRE28 :       SHIFT RIGHT A[W]
PQ023 :       B EXCHANGE C[W]
              0 -> C[W]
              C - 1 -> C[M]
              IF S2 # 1
                 THEN GO TO PQ023
              LOAD CONSTANT 4
              C + 1 -> C[M]
```

```
116    L07164:   .1111..111   -> L7171
117    L07165:   .11..1!.
118    L07166:   ...11.11..
119    L07167:   .111.1.111   -> L7165
120    L07170:   1..1..111.
121    L07171:   1..1..111.
122    L07172:   ..1...1.1.
123    L07173:   1..1.1..11   -> L7224
124    L07174:   ...11.....
125    L07175:   .111..11..
126    L07176:   ...11.11..
127    L07177:   ..11.11...
128    L07200:   .....11...
129    L07201:   1....11...
130    L07202:   .1.1.11...
131    L07203:   ..1...11..
132    L07204:   1..1.11...
133    L07205:   111.1.1.11   -> L7352
134    L07206:   1..1.11..1   -> L7226
135    L07207:   11111...1.
136    L07210:   .1...1.111
137    L07211:   .1.111111.
138    L07212:   1....11.11   -> L7206
139    L07213:   1.11.11..1
140    L07214:   111.1.111.
141    L07215:   .1...1.11.
142    L07216:   111.1.111.
143    L07217:   11.111111.
144    L07220:   1...1...11   -> L7210
145    L07221:   11..1.111.
146    L07222:   11111...1.
147    L07223:   11..11...1   -> L7314
148    L07224:   11....1....   -> L6225   *****
149    L07225:   1.11.1..1.
150    L07226:   11.111111.
151    L07227:   1...1.1111   -> L7225
152    L07230:   1.1111111.
153    L07231:   111...111.
154    L07232:   .....11...
155    L07233:   11...1....   -> L6234   *****
156    L07234:   1.11..111.
157    L07235:   1...1.111.
158    L07236:   1.1.....11   -> L7240
159    L07237:   111...111.
160    L07240:   .1.111111.
161    L07241:   1..1111111   -> L7237
162    L07242:   111.1.111.
163    L07243:   .1...1.11.
164    L07244:   111.1.111.
165    L07245:   .11.11.111   -> L7155
166    L07246:   ..11..11..
167    L07247:   .111..1.1.
168    L07250:   .1.1.1111.
169    L07251:   1.1.1.1111   -> L7253
170    L07252:   ..1.11111.
171    L07253:   11..1...11
172    L07254:   1.111.111.
173    L07255:   11..1...1.
174    L07256:   11...1.111   -> L7305
175    L07257:   ...11..11.
176    L07260:   1.11.11.11   -> L7266
177    L07261:   ..11.1..1.
178    L07262:   .1.111..1.
179    L07263:   ..11.1..1.
180    L07264:   11.11.1111   -> L7333
181    L07265:   ..........
182    L07266:   1...11..1.
183    L07267:   111.1..11.
184    L07270:   11...1....   -> L6271   *****
185    L07271:   1.1.1..1..
186    L07272:   .11..11...
187    L07273:   .1..1.11..
188    L07274:   ..11..11..
189    L07275:   ...1..11..
190    L07276:   .1...11...
```

```
              IF NO CARRY GO TO PQ024
P0027 :    LOAD CONSTANT 6
P0028 :    IF P # 1
               THEN GO TO PQ0?
           SHIFT RIGHT C[W]
PQ024 :    SHIFT RIGHT C[W]
NRM26 :    IF S2 # 1
               THEN GO TO RTN21
           RETURN
LNCD2 :    7 -> P
LNC6 :     LOAD CONSTANT 3
           LOAD CONSTANT 3
           LOAD CONSTANT 0
LNC7 :     LOAD CONSTANT 8
           LOAD CONSTANT 5
           LOAD CONSTANT 0
           LOAD CONSTANT 9
           GO TO LNC9
EXP29 :    JSB ECA22
           A + 1 -> A[P]
EXP22 :    A -> B[W]
           C - 1 -> C[S]
           IF NO CARRY GO TO EXP29
           SHIFT RIGHT A[WP]
           A EXCHANGE C[W]
           SHIFT LEFT A[MS]
EXP23 :    A EXCHANGE C[W]
           A - 1 -> A[S]
           IF NO CARRY GO TO EXP22
           A EXCHANGE B[W]
           A + 1 -> A[P]
           JSB NRM21
RTN21 :    SELECT ROM 6
ECA21 :    SHIFT RIGHT A[WP]
ECA22 :    A - 1 -> A[S]
           IF NO CARRY GO TO ECA21
           0 -> A[S]
           A + B -> A[W]
           RETURN
PQ021 :    SELECT ROM 6
PMU21 :    SHIFT RIGHT A[W]
PMU22 :    B EXCHANGE C[W]
           GO TO PMU24
PMU23 :    A + B -> A[W]
PMU24 :    C - 1 -> C[S]
           IF NO CARRY GO TO PMU23
           A EXCHANGE C[W]
           SHIFT LEFT A[MS]
           A EXCHANGE C[W]
           GO TO PQ023
MPY21 :    3 -> P
MPY22 :    A + C -> C[X]
DIV21 :    A - C -> C[S]
           IF NO CARRY GO TO DIV22
           0 - C -> C[S]
DIV22 :    A EXCHANGE B[M]
           0 -> A[W]
           IF P # 12
               THEN GO TO MPY27
           IF C[M] >= 1
               THEN GO TO DIV23
           0 -> C[WP]
           C - 1 -> C[WP]
           0 -> C[XS]
           IF NO CARRY GO TO NRM25
           NO OPERATION
DIV23 :    B EXCHANGE C[WP]
           A EXCHANGE C[M]
           SELECT ROM 6
LNC2 :     0 -> S10
           LOAD CONSTANT 6
           LOAD CONSTANT 9
           LOAD CONSTANT 3
           LOAD CONSTANT 1
           LOAD CONSTANT 4
```

```
191  L07277:  .111.11...
192  L07300:  ...1.11...
193  L07301:  111..11.11  -> L7346
194  L07302:  11111..11.
195  L07303:  .11..1..11  -> L7144
196  L07304:  111...111.
197  L07305:  .1.11...1.
198  L07306:  11...1..11  -> L7304
199  L07307:  1.11..111.
200  L07310:  ....1111..
201  L07311:  11.11.11..
202  L07312:  11...1.111  -> L7305
203  L07313:  .1111.1.1.
204  L07314:  1.1111111.
205  L07315:  11....11..
206  L07316:  ....1.111.
207  L07317:  1..11...1.
208  L07320:  11.1.11.11  -> L7326
209  L07321:  .1...111..
210  L07322:  .1.11.1.1.
211  L07323:  1..11.111.
212  L07324:  11..111111  -> L7317
213  L07325:  ..11..111.
214  L07326:  .1..1.1.1.
215  L07327:  111...111.
216  L07330:  1..111111.
217  L07331:  11...11111  -> L7307
218  L07332:  111.1..11.
219  L07333:  .11...111.
220  L07334:  ....1.111.
221  L07335:  11....11..
222  L07336:  .1111.1.11  -> L7172
223  L07337:  1..1..11..
224  L07340:  ..11.11...
225  L07341:  ...1.11...
226  L07342:  .....11...
227  L07343:  ...1.11...
228  L07344:  .111.11...
229  L07345:  1..1.11...
230  L07346:  1....11...
231  L07347:  .....11...
232  L07350:  .1.1.11...
233  L07351:  .1.1.11...
234  L07352:  ..11.11...
235  L07353:  11.111.111  -> L7335
236  L07354:  111.1.111.
237  L07355:  .1..1.111.
238  L07356:  .11...11..
239  L07357:  1.1.111.1.
240  L07360:  .1.1111.11  -> L7136
241  L07361:  .111111.1.
242  L07362:  1.11..111.
243  L07363:  .1111.1.1.
244  L07364:  1111.1.111  -> L7362
245  L07365:  .11..11111  -> L7147
246  L07366:  ..11..111.
247  L07367:  11....11..
248  L07370:  .1..11....
249  L07371:  ..11.11...
250  L07372:  ......11..
251  L07373:  ..1..11...
252  L07374:  .1.1.11...
253  L07375:  1......111  -> L7201
254  L07376:  .1.1.11...
255  L07377:  .111111.11  -> L7176

0    L10000:  ..1..1....  -> L1001
1    L10001:  .1111...1.
2    L10002:  .1111...1.
3    L10003:  .1111...1.
4    L10004:  .1111...1.
5    L10005:  ..........
6    L10006:  .1111...1.           -> L0102
7    L10007:  .1....1.11  -> L0102
```

```
              LOAD CONSTANT 7
              LOAD CONSTANT 1
              GO TO LNC8
PRE27 :  A + 1 -> A[M]
         IF NO CARRY GO TO PRE25
MPY26 :  A + B -> A[W]
MPY27 :  C - 1 -> C[P]
         IF NO CARRY GO TO MPY26
MPY28 :  SHIFT RIGHT A[W]
         P + 1 -> P
         IF P # 13
              THEN GO TO MPY27
         C + 1 -> C[X]
NRM21 :  0 -> A[S]
         12 -> P
         0 -> B[W]
NRM23 :  IF A[P] >= 1
              THEN GO TO NRM24
         SHIFT LEFT A[W]
         C - 1 -> C[X]
         IF A[W] >= 1
              THEN GO TO NRM23
         0 -> C[W]
NRM24 :  A -> B[X]
         A + B -> A[W]
         IF A[S] >= 1
              THEN GO TO MPY28
         A EXCHANGE C[M]
NRM25 :  C -> A[W]
         0 -> B[W]
NRM27 :  12 -> P
         GO TO NRM26
LNCD1 :  9 -> P
         LOAD CONSTANT 3
         LOAD CONSTANT 1
         LOAD CONSTANT 0
         LOAD CONSTANT 1
         LOAD CONSTANT 7
         LOAD CONSTANT 9
LNC8  :  LOAD CONSTANT 8
         LOAD CONSTANT 0
         LOAD CONSTANT 5
         LOAD CONSTANT 5
LNC9  :  LOAD CONSTANT 3
         GO TO NRM27
PRE21 :  A EXCHANGE C[W]
         A -> B[W]
         C -> A[M]
         C + C -> C[XS]
         IF NO CARRY GO TO PRE24
         C + 1 -> C[XS]
PRE22 :  SHIFT RIGHT A[W]
         C + 1 -> C[X]
         IF NO CARRY GO TO PRE22
         GO TO PRE26
LNC10 :  0 -> C[W]
         12 -> P
         LOAD CONSTANT 2
         LOAD CONSTANT 3
         LOAD CONSTANT 0
         LOAD CONSTANT 2
         LOAD CONSTANT 5
         GO TO LNC7
LNCD3 :  5 -> P
         GO TO LNC6

***** BST  :  SELECT ROM 1
      RS1  :  C + 1 -> C[P]
      PCT  :  C + 1 -> C[P]
      INV  :  C + 1 -> C[P]
      YTX  :  C + 1 -> C[P]
              NO OPERATION
      SIG  :  C + 1 -> C[P]
              IF NO CARRY GO TO R1
```

```
 8   L10010:  ...1.1.1...
 9   L10011:  ...11...11    -> L0030
10   L10012:  .1111...1.
11   L10013:  .1111...1.
12   L10014:  .1111...1.
13   L10015:  ..........
14   L10016:  .1111...1.
15   L10017:  .1......11    -> L0100
16   L10020:  ...1111.1..
17   L10021:  111....1111   -> L0343
18   L10022:  .1111...1.
19   L10023:  .1111...1.
20   L10024:  .1111...1.
21   L10025:  ...11.1.11    -> L0032
22   L10026:  1....11...
23   L10027:  .1......11    -> L0100
24   L10030:  ...1111.1..
25   L10031:  .11....1111   -> L0143
26   L10032:  .1111...1.
27   L10033:  .1111...1.
28   L10034:  .1111...1.
29   L10035:  .1.....1111   -> L0103
30   L10036:  1....11...
31   L10037:  .1......111   -> L0101
32   L10040:  ..........
33   L10041:  .1111...1.
34   L10042:  .......111    -> L0001
35   L10043:  ...1....111   -> L0041
36   L10044:  .1.....1111   -> L0103
37   L10045:  ..........
38   L10046:  1....11...
39   L10047:  .1....1.11    -> L0102
40   L10050:  .1.1....1.
41   L10051:  .1.1....11    -> L0000
42   L10052:  .1111...1.
43   L10053:  .1111...1.
44   L10054:  .1111...1.
45   L10055:  ..........
46   L10056:  .1111...1.
47   L10057:  .1.....111    -> L0101
48   L10060:  1.11..11..
49   L10061:  1...11...1    -> L0214
50   L10062:  .1111...1.
51   L10063:  .1111...1.
52   L10064:  .1111...1.
53   L10065:  ...1..1.11    -> L0022
54   L10066:  1....11...
55   L10067:  ..11111111    -> L0077
56   L10070:  .1111...1.
57   L10071:  ..........
58   L10072:  .1111...1.
59   L10073:  ..1111...1.
60   L10074:  ..........
61   L10075:  ..........
62   L10076:  .1111...1.
63   L10077:  .111111.1.
64   L10100:  .111111.1.
65   L10101:  .111111.1.
66   L10102:  .111111.1.
67   L10103:  ...1..11..
68   L10104:  ..11.1.1..
69   L10105:  1.1.111.11    -> L0256
70   L10106:  .11..1.1..
71   L10107:  ..1.1.1...
72   L10110:  .11.11111.
73   L10111:  111.1...11    -> L0350
74   L10112:  .1.111111.
75   L10113:  .11.11111.
76   L10114:  ...1.....11   -> L0020
77   L10115:  ..1...1.1.
78   L10116:  ..11...1..
79   L10117:  .1.1.11...
80   L10120:  ...1..1.1.
81   L10121:  111..11111    -> L0347
82   L10122:  1111...1.1
```

```
         GTO    :  C EXCHANGE M
                   GO TO GTO1
         RCL    :  C + 1 -> C[P]
         STO    :  C + 1 -> C[P]
         G      :  C + 1 -> C[P]
                   NO OPERATION
         F      :  C + 1 -> C[P]
                   IF NO CARRY GO TO R3
$$$$$   PROG2  :  DELAYED SELECT ROM 1
                   GO TO @343
         SIX    :  C + 1 -> C[P]
         FIV    :  C + 1 -> C[P]
         FOU    :  C + 1 -> C[P]
                   IF NO CARRY GO TO THR
         ADD    :  LOAD CONSTANT 8
                   GO TO R3
$$$$$   GTO1   :  DELAYED SELECT ROM 1
                   GO TO @143
         THR    :  C + 1 -> C[P]
         TWO    :  C + 1 -> C[P]
         ONE    :  C + 1 -> C[P]
                   IF NO CARRY GO TO R0
         MPY    :  LOAD CONSTANT 8
                   GO TO R2
                   NO OPERATION
         DP1    :  C + 1 -> C[P]
                   IF NO CARRY GO TO RS1
         DP     :  GO TO DP1
         ZER    :  GO TO R0
                   NO OPERATION
         DIV    :  LOAD CONSTANT 8
                   GO TO R1
         SST    :  1 -> S5
                   GO TO BST
         FMT    :  C + 1 -> C[P]
         RDN    :  C + 1 -> C[P]
         XEY    :  C + 1 -> C[P]
                   NO OPERATION
         FIT    :  C + 1 -> C[P]
                   IF NO CARRY GO TO R2
         DIS30  :  SHIFT RIGHT A[M]
                   JSB DIS31
         NIN    :  C + 1 -> C[P]
         EIG    :  C + 1 -> C[P]
         SEV    :  C + 1 -> C[P]
                   IF NO CARRY GO TO SIX
         SUB    :  LOAD CONSTANT 8
                   GO TO R4
         CLX    :  C + 1 -> C[P]
                   NO OPERATION
         EEX    :  C + 1 -> C[P]
         CHS    :  C + 1 -> C[P]
                   NO OPERATION
                   NO OPERATION
         ENT    :  C + 1 -> C[P]
         R4     :  C + 1 -> C[XS]
         R3     :  C + 1 -> C[XS]
         R2     :  C + 1 -> C[XS]
         P1     :  C + 1 -> C[XS]
         R0     :  1 -> P
                   IF S3 # 1
                       THEN GO TO RUN
         PROG   :  C -> A[X]
                   C EXCHANGE M
                   IF C[S] = 0
                       THEN GO TO STFF
                   C - 1 -> C[S]
                   IF C[S] = 0
                       THEN GO TO PROG2
                   C EXCHANGE M
                   0 -> C[X]
                   LOAD CONSTANT 5
                   IF A >= C[X]
                       THEN GO TO STFF10
                   A + C -> A[X]
```

```
 83  L10123:  .1.1..1.1.
 84  L10124:  1.11.1.11.
 85  L10125:  .1.....1.1
 86  L10126:  .1....111.
 87  L10127:  .11...1.1.
 88  L10130:  ...11..111
 89  L10131:  .1.111.11.
 90  L10132:  .1.11...1.
 91  L10133:  ..........
 92  L10134:  11.1111.1.
 93  L10135:  .1.1..11..
 94  L10136:  .....11...
 95  L10137:  .1...11...
 96  L10140:  1.1111111.
 97  L10141:  1...1.111.
 98  L10142:  1.11..11..
 99  L10143:  ...1.1.1..
100  L10144:  ...11....1
101  L10145:  ....1..1..
102  L10146:  .....111..
103  L10147:  1.111.11..
104  L10150:  .11..11.11  -> L0146
105  L10151:  1....1.1...
106  L10152:  .11.1...1.
107  L10153:  .111.11111  -> L0167
108  L10154:  .1.1.1.1..
109  L10155:  .11.111111  -> L0157
110  L10156:  1...1...11  -> L0220
111  L10157:  ..1.1.1...
112  L10160:  1..1.1.1..
113  L10161:  .111.1.111  -> L0165
114  L10162:  ....1..11.
115  L10163:  ..11..1.1.
116  L10164:  ..11.1....
117  L10165:  1...1.111.
118  L10166:  .111.1..11  -> L0162
119  L10167:  ......1.1.
120  L10170:  .....1.1..
121  L10171:  .1111.1111  -> L0173
122  L10172:  .11..1.111  -> L0145
123  L10173:  ..11.....1
124  L10174:  .1111...1.
125  L10175:  ..111..1..
126  L10176:  1.111..1..
127  L10177:  1.........
128  L10200:  .1.1.1.1..
129  L10201:  111.1..111  -> L0351
130  L10202:  .....111..
131  L10203:  1.111.11..
132  L10204:  1......11  -> L0200
133  L10205:  .11111111.
134  L10206:  1......11  -> L0200
135  L10207:  .111.11111  -> L0167
136  L10210:  1111.1..1.
137  L10211:  11.1..1.1.
138  L10212:  111....111  -> L0341
139  L10213:  11.1...1..
140  L10214:  11111.1.1.
141  L10215:  ..11....11  -> L0060
142  L10216:  1.11.11.11  -> L0266
143  L10217:  ..........
144  L10220:  ...11.1111
145  L10221:  ..1.1.1...
146  L10222:  ....111...
147  L10223:  .111...1..
148  L10224:  1..1.1.1..
149  L10225:  1..11...11  -> L0230
150  L10226:  1...1.1...
151  L10227:  .11...1.11  -> L0142
152  L10230:  .11...111.
153  L10231:  1.1.1.1...
154  L10232:  .1..1.111.
155  L10233:  1.11.1....
156  L10234:  1....11...
157  L10235:  .....111..
```

```
                      A - C -> C[X]
                      SHIFT RIGHT A[MS]
                      SHIFT LEFT A[X]
                      SHIFT LEFT A[W]
                      C -> A[X]
                      0 -> C[W]
                      C - 1 -> C[MS]
                      C - 1 -> C[P]
                      NO OPERATION
         PROG3 :      A - 1 -> A[XS]
         PROG1 :      5 -> P
                      LOAD CONSTANT 0
                      LOAD CONSTANT 2
                      0 -> A[S]
                      B EXCHANGE C[W]
         WAT0  :      11 -> P
                      C EXCHANGE M
                      0 -> C[P]
         WAT1  :      0 -> S0
         WAT2  :      P - 1 -> P
                      IF P # 11
                          THEN GO TO WAT2
                      DISPLAY OFF
                      IF C[P] = 0
                          THEN GO TO WAT3
                      IF S5 # 1
                          THEN GO TO WAT13
                      GO TO SRUN
         WAT13 :      C EXCHANGE M
                      IF S9 # 1
                          THEN GO TO WAT14
         TKR   :      1 -> P
                      0 -> C[X]
                      KEYS -> ROM ADDRESS
         WAT14 :      B EXCHANGE C[W]
                      GO TO TKR
         WAT3  :      DISPLAY TOGGLE
         WAT7  :      IF S0 # 1
                          THEN GO TO WAT4
                      GO TO WAT1
         WAT4  :      0 -> C[P]
                      C + 1 -> C[P]
                      0 -> S3
                      0 -> S11
                      ROM ADDRESS -> BUFFER
         WAT6  :      IF S5 # 1
                          THEN GO TO WAT5
                      P - 1 -> P
                      IF P # 11
                          THEN GO TO WAT6
                      C + 1 -> C[S]
                      IF NO CARRY GO TO WAT6
                      GO TO WAT3
         DIS1  :      A + C -> A[WP]
                      A - C -> A[WP]
                      IF NO CARRY GO TO DIS17
                      13 -> P
         DIS31 :      A + 1 -> A[X]
                      IF NO CARRY GO TO DIS30
                      GO TO DIS76
                      NO OPERATION
         SRUN  :      0 -> C[S]
                      C EXCHANGE M
                      CLEAR STATUS
                      1 -> S7
         DISP  :      IF S9 # 1
                          THEN GO TO DIS99
         DIS70 :      0 -> S3
                      GO TO WAT0
         DIS99 :      C -> A[W]
                      M -> C
         DIS50 :      A -> B[W]
                      1 -> S9
                      8 -> P
         DIS0  :      P - 1 -> P
```

| | | | |
|---|---|---|---|
|158|L10236:|1..1..111.||
|159|L10237:|...11.11..||
|160|L10240:|1..111.111|-> L0235|
|161|L10241:|...11....1||
|162|L10242:|1.11..1111|-> L0263|
|163|L10243:|1..1111.1||
|164|L10244:|1...11..11|-> L0210|
|165|L10245:|1..11..11||
|166|L10246:|111....111|-> L0341|
|167|L10247:|11.1..11.||
|168|L10250:|.....111..||
|169|L10251:|11.11.1.1||
|170|L10252:|.1.1.1...11|-> L0250|
|171|L10253:|.1.11.11.11|-> L0266|
|172|L10254:|1..11..1..||
|173|L10255:|1..11.11.11|-> L0226|
|174|L10256:|1...1..1.1||
|175|L10257:|..1..1....|-> L1260 *****|
|176|L10260:|1....1.1.||
|177|L10261:|.1111...11|-> L0170|
|178|L10262:|1..1....11.|-> L0220|
|179|L10263:|1..11.1.||
|180|L10264:|..11....1||
|181|L10265:|11.....11||
|182|L10266:|..11.1.11||
|183|L10267:|.1111...1.||
|184|L10270:|.1111...1.||
|185|L10271:|.....111..||
|186|L10272:|..1.11...||
|187|L10273:|11...1.111|-> L0305|
|188|L10274:|..11...1.1||
|189|L10275:|111.1.111||
|190|L10276:|1..1.1.1.||
|191|L10277:|11.11...11|-> L0330|
|192|L10300:|11.11.1.1||
|193|L10301:|11.11....1|-> L0330|
|194|L10302:|.1111...1||
|195|L10303:|111111..11|-> L0374|
|196|L10304:|11..11..11|-> L0314|
|197|L10305:|.1.11.1.1||
|198|L10306:|1.111.111|-> L0271|
|199|L10307:|...11.1.1.||
|200|L10310:|.1.111..1.||
|201|L10311:|111.1.111||
|202|L10312:|1.1.1...1||
|203|L10313:|111111..11|-> L0374|
|204|L10314:|....1111..||
|205|L10315:|11.11.11...||
|206|L10316:|11....1.11|-> L0302|
|207|L10317:|.....111..||
|208|L10320:|..11...11||
|209|L10321:|.1111...1||
|210|L10322:|11.1.1.1.||
|211|L10323:|11.1.11.11|-> L0326|
|212|L10324:|1.11.1.11||
|213|L10325:|11.11.1.1||
|214|L10326:|.1111.1.1|
|215|L10327:|11111.1.1||
|216|L10330:|.111111.1||
|217|L10331:|11.1111.11|-> L0336|
|218|L10332:|..1..1.1.||
|219|L10333:|111.1.111||
|220|L10334:|1...1.111.||
|221|L10335:|1.1.11..11|-> L0254|
|222|L10336:|.1.1111.1||
|223|L10337:|.11.111.1||
|224|L10340:|11.11.1111|-> L0333|
|225|L10341:|11..1.111||
|226|L10342:|1.1.1.1.||
|227|L10343:|1.1.1..11.||
|228|L10344:|...1.11||
|229|L10345:|1..1.11...||
|230|L10346:|1..11.1.11|-> L0232|
|231|L10347:|..1.1.1...||

```
              SHIFT RIGHT C[W]
              IF P # 1
                  THEN GO TO DIS0
              IF C[P] >= 1
                  THEN GO TO DIS2
              IF A[XS] >= 1
                  THEN GO TO DIS1
              IF A[P] >= 1
                  THEN GO TO DIS17
              13 -> P
DIS10  :      P - 1 -> P
              A - 1 -> A[X]
              IF NO CARRY GO TO DIS10
              GO TO DIS76
DIS71  :      0 -> S9
              GO TO DIS70
RUN    :      SHIFT RIGHT C[X]
              SELECT ROM 1
INRUN  :      IF S8 # 1
                  THEN GO TO WAT7
              GO TO SRUN
DIS2   :      0 -> S9
              0 -> C[P]
              12 -> P
DIS76  :      0 -> C[MS]
              C + 1 -> C[P]
              C + 1 -> C[P]
DIS11  :      P - 1 -> P
              IF P # 2
                  THEN GO TO DIS12
              0 -> C[X]
              A EXCHANGE C[W]
              IF S9 # 1
                  THEN GO TO DIS62
              A - 1 -> A[X]
              JSB DIS62
DIS53  :      C + 1 -> C[P]
              IF NO CARRY GO TO DIS15
              GO TO DIS54
DIS12  :      C - 1 -> C[X]
              IF NO CARRY GO TO DIS11
              0 -> C[WP]
              C - 1 -> C[WP]
              A EXCHANGE C[W]
              C + C -> C[P]
              IF NO CARRY GO TO DIS15
DIS54  :      P + 1 -> P
              IF P # 13
                  THEN GO TO DIS53
              P - 1 -> P
              0 -> C[M]
              C + 1 -> C[P]
              IF S9 # 1
                  THEN GO TO DIS60
              SHIFT RIGHT A[MS]
DIS60  :      C + 1 -> C[X]
DIS65  :      A + 1 -> A[X]
DIS62  :      C + 1 -> C[XS]
              IF NO CARRY GO TO DIS63
              0 - C -> C[X]
DIS61  :      A EXCHANGE C[W]
              B EXCHANGE C[W]
              GO TO DIS71
DIS63  :      C - 1 -> C[XS]
              IF C[XS] = 0
                  THEN GO TO DIS61
DIS17  :      A EXCHANGE B[W]
              M -> C
              8 -> P
              LOAD CONSTANT 1
              LOAD CONSTANT 9
              GO TO DIS50
STFF10 :      C EXCHANGE M
```

| | | | | | | |
|---|---|---|---|---|---|---|
| 232 | L10350: | ...1..1.... | -> L1351 | ***** | STFF : | SELECT ROM 1 |
| 233 | L10351: | 1.11..1..1. | | | WAT5 : | IF S11 # 1 |
| 234 | L10352: | 111..11..111 | -> L0355 | | | THEN GO TO ROP |
| 235 | L10353: | 1111...1..1 | -> L0362 | | | JSB FUTZ |
| 236 | L10354: | .11..1.... | -> L3355 | ***** | INCLK : | SELECT ROM 3 |
| 237 | L10355: | ..11.1.1.. | | | ROP : | IF S3 # 1 |
| 238 | L10356: | 1..11....11 | -> L0260 | | | THEN GO TO INRUN |
| 239 | L10357: | 1....1.1.. | | | INLRN : | IF S8 # 1 |
| 240 | L10360: | 11111..111 | -> L0371 | | | THEN GO TO SLRN |
| 241 | L10361: | .1111...11 | -> L0170 | | | GO TO WAT7 |
| 242 | L10362: | ..11.1111. | | | FUTZ : | 0 -> C[S] |
| 243 | L10363: | ..1.1.1... | | | | C EXCHANGE M |
| 244 | L10364: | 1...1.1.1.. | | | | IF S9 # 1 |
| 245 | L10365: | 1111.11111 | -> L0367 | | | THEN GO TO FUTZ1 |
| 246 | L10366: | ....11.... | | | | RETURN |
| 247 | L10367: | 1...1.111. | | | FUTZ1 : | 0 EXCHANGE C[W] |
| 248 | L10370: | ....11.... | | | | RETURN |
| 249 | L10371: | 1111..1..1 | -> L0362 | | SLRN : | JSB FUTZ |
| 250 | L10372: | 1..1..1... | | ##### | SLRN2 : | DELAYED SELECT GROUP 0 |
| 251 | L10373: | 1.1..1.... | -> L5374 | ***** | | SELECT ROM 5 |
| 252 | L10374: | 1...1.1.. | | | DIS15 : | IF S9 # 1 |
| 253 | L10375: | 11.1.11111 | -> L0327 | | | THEN GO TO DIS65 |
| 254 | L10376: | ..11.11.1. | | | | 0 -> C[XS] |
| 255 | L10377: | 11.11....1 | -> L0330 | | | JSB DIS62 |
| | | | | | | |
| 0 | L11000: | .......... | | | | NO OPERATION |
| 1 | L11001: | ..1.1.1... | | | BST1 : | C EXCHANGE M |
| 2 | L11002: | ..11.1.1.. | | | | IF S3 # 1 |
| 3 | L11003: | ...1111111 | -> L1037 | | | THEN GO TO BSTR |
| 4 | L11004: | .11...111. | | | | C -> A[W] |
| 5 | L11005: | ..11...111. | | | | 0 -> C[W] |
| 6 | L11006: | .1111..11. | | | | C + 1 -> C[M] |
| 7 | L11007: | .1....11.. | | | | 4 -> P |
| 8 | L11010: | .1.1.1.1.. | | | | IF S5 # 1 |
| 9 | L11011: | ....111111 | -> L1017 | | | THEN GO TO BST2 |
| 10 | L11012: | .1.11..1.. | | | | 0 -> S5 |
| 11 | L11013: | 1111.1..1. | | | | A + C -> A[WP] |
| 12 | L11014: | 111.1.111. | | | SST2 : | A EXCHANGE C[W] |
| 13 | L11015: | ..1.1.1... | | | | C EXCHANGE M |
| 14 | L11016: | ..1111.111 | -> L1075 | | | GO TO LDIS |
| 15 | L11017: | 11.1.1.1. | | | BST2 : | A - C -> A[WP] |
| 16 | L11020: | ....11...1 | -> L1014 | | | JSB SST2 |
| 17 | L11021: | .....1..11 | | | LDIS4 : | 1 -> P |
| 18 | L11022: | 111.1.111. | | | | A EXCHANGE C[W] |
| 19 | L11023: | ..11.1...1. | | | | IF C[P] = 0 |
| 20 | L11024: | ....1.11111 | -> L1027 | | | THEN GO TO LDIS6 |
| 21 | L11025: | ..111.1.1. | | | | 0 - C - 1 -> C[X] |
| 22 | L11026: | ..11.11.1. | | | | 0 -> C[XS] |
| 23 | L11027: | .11..1.1. | | | LDIS6 : | C -> A[X] |
| 24 | L11030: | .1..111111 | -> L1117 | | | GO TO LDIS5 |
| 25 | L11031: | 1..1..111. | | | PKX1 : | SHIFT RIGHT C[W] |
| 26 | L11032: | .....111.. | | | | P - 1 -> P |
| 27 | L11033: | 1.1.11.111 | -> L1255 | | | GO TO PKX2 |
| 28 | L11034: | 1..1...111. | | | LDIS2 : | SHIFT RIGHT C[W] |
| 29 | L11035: | .....111.. | | | | P - 1 -> P |
| 30 | L11036: | ..11111111 | -> L1077 | | | GO TO LDIS1 |
| 31 | L11037: | .1.1.1.1.. | | | BSTR : | IF S5 # 1 |
| 32 | L11040: | 1.1....111 | -> L1241 | | | THEN GO TO BSTR1 |
| 33 | L11041: | .1.11..1.. | | | SSTR : | 0 -> S5 |
| 34 | L11042: | 1..111.111 | -> L1235 | | | GO TO SSTR1 |
| 35 | L11043: | 11.1.1..1. | | | SKC2 : | A - C -> A[WP] |
| 36 | L11044: | 11.111.111 | -> L1335 | | | IF NO CARRY GO TO SKC1 |
| 37 | L11045: | 11...11.1. | | | | 12 -> P |
| 38 | L11046: | ..11.1.1. | | | | 0 -> C[WP] |
| 39 | L11047: | .1.111..1. | | | | C - 1 -> C[WP] |
| 40 | L11050: | .1....11.. | | | | 4 -> P |
| 41 | L11051: | 1.11..1111 | -> L1263 | | | GO TO SKC50 |
| 42 | L11052: | .......... | | | | NO OPERATION |
| 43 | L11053: | ..11..1.1. | | | IKC12 : | 0 -> C[X] |
| 44 | L11054: | ..11..11.. | | | IKC3 : | IF P # 1 |
| 45 | L11055: | ..11...111 | -> L1063 | | | THEN GO TO IKC2 |
| 46 | L11056: | .11.1..1. | | | IKC5 : | IF C[X] = 0 |
| 47 | L11057: | ..11.11111 | -> L1067 | | | THEN GO TO IKC4 |
| 48 | L11060: | .1.11.1.1. | | | | C - 1 -> C[X] |

```
49  L11061:  ....1111..
50  L11062:  ...1.111.11  -> L1056
51  L11063:  .1111.1.1.
52  L11064:  .1...111.
53  L11065:  .....111..
54  L11066:  ...1.11..11  -> L1054
55  L11067:  1.11111...
56  L11070:  111.1....1.
57  L11071:  .....111..
58  L11072:  111.1....1.
59  L11073:  1.1111....
60  L11074:  11111111.1   -> L1377
61  L11075:  .1111..1..1  -> L1362
62  L11076:  1.11111...
63  L11077:  ...11.11..
64  L11100:  ...111..11   -> L1034
65  L11101:  .1111..111   -> L1171
66  L11102:  .11...1.1.
67  L11103:  ..11..1.1.
68  L11104:  ...1..11..
69  L11105:  .1.1.11...
70  L11106:  1.11111.1.
71  L11107:  11.1..1.1.
72  L11110:  .1..111.11   -> L1116
73  L11111:  1111..1.1.
74  L11112:  1.1..1.1.
75  L11113:  ....1...1.
76  L11114:  ...1...111   -> L1021
77  L11115:  .1..111111   -> L1117
78  L11116:  11.1111.1.
79  L11117:  1.1.1.1...
80  L11120:  .11.....11.
81  L11121:  .1....11..
82  L11122:  ..11..111.
83  L11123:  .1.111.11.
84  L11124:  .1111.1.1.
85  L11125:  1.11.1.1..
86  L11126:  .1.11...11   -> L1130
87  L11127:  ..11..1.1.
88  L11130:  .1.11..1.1.
89  L11131:  ..1.1.1...
90  L11132:  ..11.1111.
91  L11133:  ..1.1.1...
92  L11134:  .....1....   -> L0135  *****
93  L11135:  ..11.1111.
94  L11136:  .11.1..1..
95  L11137:  .1..1.1...
96  L11140:  ..1.1..1..
97  L11141:  ..11..1.1.
98  L11142:  ....11....
99  L11143:  ..11.1111.
100 L11144:  .11111111.
101 L11145:  .11111111.
102 L11146:  ..1.1.1...
103 L11147:  ..11..1.1.
104 L11150:  .11111..11   -> L1174
105 L11151:  1.1.1.1...
106 L11152:  .1111..11.
107 L11153:  .11....11.
108 L11154:  .1.....11.
109 L11155:  1.1.1.1...
110 L11156:  .111..1.11   -> L1162
111 L11157:  .....11...
112 L11160:  .....11...
113 L11161:  111.1.1.11   -> L1352
114 L11162:  .1.....11.
115 L11163:  ..11..111.
116 L11164:  .1.11.111.
117 L11165:  ..11.111.
118 L11166:  .1.11.11.1.
119 L11167:  11.1111.1.
120 L11170:  .1.111...1   -> L1134
121 L11171:  1.11.1.1..
122 L11172:  1111....11   -> L1360
123 L11173:  .1...1.11    -> L1102
```

```
              P + 1 -> P
              GO TO IKC5
IKC2    :     C + 1 -> C[X]
              SHIFT LEFT A[W]
              P - 1 -> P
              GO TO IKC3
IKC4    :     DATA -> C
              A EXCHANGE C[P]
              P - 1 -> P
              A EXCHANGE C[P]
              C -> DATA
              JSB FIX
LDIS    :     JSB SKC
              DATA -> C
LDIS1   :     IF P # 1
                  THEN GO TO LDIS2
              GO TO LDIS49
LDIS51  :     C -> A[X]
              0 -> C[X]
              1 -> P
              LOAD CONSTANT 5
              0 -> A[XS]
              A - C -> A[X]
              IF NO CARRY GO TO LDIS3
              A + C -> A[X]
              SHIFT RIGHT C[X]
              IF A >= C[P]
                  THEN GO TO LDIS4
              GO TO LDIS5
LDIS3   :     A - 1 -> A[XS]
LDIS5   :     M -> C
              C -> A[M]
              SHIFT LEFT A[M]
              0 -> C[W]
              C - 1 -> C[MS]
              C + 1 -> C[X]
              IF S11 # 1
                  THEN GO TO LDIS9
              0 -> C[X]
LDIS9   :     C - 1 -> C[X]
              C EXCHANGE M
              0 -> C[S]
              C EXCHANGE M
LDIS10  :     SELECT ROM 0
CLPX    :     0 -> C[S]
              0 -> S6
              0 -> S4
CLPX1   :     0 -> S2
              0 -> S1
              RETURN
GTO1    :     0 -> C[S]
              C + 1 -> C[S]
              C + 1 -> C[S]
              C EXCHANGE M
              IF S3 # 1
                  THEN GO TO GTORUN
              M -> C
              C + 1 -> C[M]
              C -> A[M]
              4 -> P
              C + C -> C[P]
              IF NO CARRY GO TO GTO3
              LOAD CONSTANT 0
              LOAD CONSTANT 0
              GO TO STFF2
GTO3    :     SHIFT LEFT A[M]
              0 -> C[W]
              C - 1 -> C[W]
              0 -> C[XS]
              0 -> A[XS]
              A - 1 -> A[XS]
              JSB LDIS10
LDIS49  :     IF S11 # 1
                  THEN GO TO LDIS50
              GO TO LDIS51
```

```
124  L11174:  .11......1   -> L1140
125  L11175:  1..1.1.1..
126  L11176:  1.......11   -> L1200
127  L11177:  1......111   -> L1201
128  L11200:  1....1.111.
129  L11201:  ..1.1.1...
130  L11202:  11....11..
131  L11203:  1.....1.1.
132  L11204:  1...11.111   -> L1215
133  L11205:  1.11..11..
134  L11206:  .....1..1.
135  L11207:  .....1.1..
136  L11210:  1..1.11111   -> L1227
137  L11211:  ..11...1.
138  L11212:  1..11...11   -> L1230
139  L11213:  11.....11.
140  L11214:  1..1..1111   -> L1223
141  L11215:  .11.1...1.
142  L11216:  1..1..1111   -> L1223
143  L11217:  .1111..11.
144  L11220:  .1111....
145  L11221:  .1.11...1.
146  L11222:  1....1.111   -> L1205
147  L11223:  ..11.....1.
148  L11224:  ..1.1.1...
149  L11225:  ...111.1..   -> L1224
150  L11226:  1..1.1..11   -> L1224
151  L11227:  ..11....1.
152  L11230:  .....1.1..
153  L11231:  ..1.1.1...
154  L11232:  1..1.1.1..
155  L11233:  1.1..11.11   -> L1246
156  L11234:  1.1..11111   -> L1247
157  L11235:  11....11..
158  L11236:  1..1.11...
159  L11237:  ..1.1.1...
160  L11240:  1.1..11111   -> L1247
161  L11241:  .1.111.1.1   -> L1135
162  L11242:  .1.....11.
163  L11243:  ..11.1..1.
164  L11244:  ..1.1.1...
165  L11245:  .11111.111   -> L1175
166  L11246:  1...1.111.
167  L11247:  1111..1..1   -> L1362
168  L11250:  1.11.1.1..
169  L11251:  1.1.11..11   -> L1254
170  L11252:  1...11.1..
171  L11253:  .....11111   -> L1007
172  L11254:  1.11111...
173  L11255:  ...11.11..
174  L11256:  ...11..111   -> L1031
175  L11257:  11111111.1   -> L1377
176  L11260:  ...1..11..
177  L11261:  1...11.1..
178  L11262:  ...1....11   -> L1020
179  L11263:  111.11..1.
180  L11264:  .11...1.1.
181  L11265:  1111..11..
182  L11266:  .....111..
183  L11267:  .....111..
184  L11270:  .111..11.
185  L11271:  1.11.11.11   -> L1266
186  L11272:  1..1..111.
187  L11273:  .11111111.
188  L11274:  .11111111.
189  L11275:  1...1.111.
190  L11276:  ..11...11.
191  L11277:  .1111.1.1.
192  L11300:  1..111....
193  L11301:  ..11..1.1.
194  L11302:  .1.11.1.1.
195  L11303:  .1.11.1.1.
196  L11304:  .1.11.1.1.
197  L11305:  111.1.111.
198  L11306:  .1.....1.1
```

```
GTORUN:  JSB CLPX1
EOP   :  IF S9 # 1
            THEN GO TO EOP1
         GO TO EOF
EOP1  :  B EXCHANGE C[W]
EOF   :  C EXCHANGE M
EOF7  :  12 -> P
         IF S8 # 1
            THEN GO TO EOF8
GO    :  11 -> P
         0 -> S0
         IF S0 # 1
            THEN GO TO EOF2
         IF C[P] >= 1
            THEN GO TO EOF3
         12 -> P
         GO TO STOP1
EOF8  :  IF C[P] = 0
            THEN GO TO STOP1
         C + 1 -> C[M]
         C + 1 -> C[P]
         C - 1 -> C[P]
         IF NO CARRY GO TO GO
STOP1 :  0 -> C[P]
         C EXCHANGE M
$$$$$    DELAYED SELECT ROM 0
         GO TO @224
EOF2  :  0 -> C[P]
EOF3  :  DISPLAY TOGGLE
         C EXCHANGE M
         IF S9 # 1
            THEN GO TO GO1
         GO TO GO2
SSTR1 :  12 -> P
         LOAD CONSTANT 9
         C EXCHANGE M
         GO TO GO2
BSTR1 :  JSB CLPX
         4 -> P
         0 -> C[WP]
         C EXCHANGE M
         GO TO EOP
GO1   :  B EXCHANGE C[W]
GO2   :  JSB SKC
         IF S11 # 1
            THEN GO TO GO4
*****    DELAYED SELECT GROUP 0
         GO TO @007
GO4   :  DATA -> C
PKX2  :  IF P # 1
            THEN GO TO PKX1
         JSB FIX
RUN   :  1 -> P
*****  DECODE: DELAYED SELECT GROUP 0
         GO TO @020
SKC50 :  A EXCHANGE C[WP]
         C -> A[WP]
         15 -> P
SKC3  :  P - 1 -> P
         P - 1 -> P
         C + 1 -> C[M]
         IF NO CARRY GO TO SKC3
         SHIFT RIGHT C[W]
         C + 1 -> C[S]
         C + 1 -> C[S]
         SHIFT RIGHT C[W]
         0 -> C[X]
         C + 1 -> C[X]
         C -> DATA ADDRESS
         0 -> C[X]
         C - 1 -> C[X]
         C - 1 -> C[X]
         A EXCHANGE C[W]
         SHIFT LEFT A[X]
```

| | | | |
|---|---|---|---|
| 199 | L11307: | 1.11111.1. | |
| 200 | L11310: | .1....111. | |
| 201 | L11311: | .1....111. | |
| 202 | L11312: | 111.1.111. | |
| 203 | L11313: | .1.111111. | |
| 204 | L11314: | .1.111111. | |
| 205 | L11315: | .1.111111. | |
| 206 | L11316: | 11.1.1..11 | -> L1324 |
| 207 | L11317: | 11111..11. | |
| 208 | L11320: | ..1.1.1... | |
| 209 | L11321: | 111.1.111. | |
| 210 | L11322: | ..1.1.1... | |
| 211 | L11323: | .....11.... | |
| 212 | L11324: | 1111...11.. | |
| 213 | L11325: | 11..11.111 | -> L1315 |
| 214 | L11326: | 111.11...1. | |
| 215 | L11327: | ..11..11... | |
| 216 | L11330: | .111..11... | |
| 217 | L11331: | .1.....11.. | |
| 218 | L11332: | 11.11..11. | |
| 219 | L11333: | .11111111. | |
| 220 | L11334: | .11111111. | |
| 221 | L11335: | .11111111. | |
| 222 | L11336: | ..1...1111 | -> L1043 |
| 223 | L11337: | 111.1.111. | |
| 224 | L11340: | ..11..1.1. | |
| 225 | L11341: | .11....11. | |
| 226 | L11342: | 1111.11.11 | -> L1366 |
| 227 | L11343: | ..1.1.1... | |
| 228 | L11344: | 1..1111.1. | |
| 229 | L11345: | 111.1...11 | -> L1350 |
| 230 | L11346: | .1.....1.1. | |
| 231 | L11347: | 1.11..111. | |
| 232 | L11350: | ..1.1.1... | |
| 233 | L11351: | .1111..11. | |
| 234 | L11352: | ..1.1.1... | |
| 235 | L11353: | 1..11.1.1. | |
| 236 | L11354: | 1111..1..1 | -> L1362 |
| 237 | L11355: | 1..11.1.1. | |
| 238 | L11356: | ..1.1.1111 | -> L1053 |
| 239 | L11357: | ..1111.111 | -> L1075 |
| 240 | L11360: | 11111111.1 | -> L1377 |
| 241 | L11361: | .1....1.11 | -> L1102 |
| 242 | L11362: | 1.111.1... | |
| 243 | L11363: | ..1.1.1... | |
| 244 | L11364: | 111.1.111. | |
| 245 | L11365: | ..1.1.1... | |
| 246 | L11366: | ..11..111. | |
| 247 | L11367: | .1....11.. | |
| 248 | L11370: | 111.11...1. | |
| 249 | L11371: | ....11..11. | |
| 250 | L11372: | 11.1.11.11 | -> L1326 |
| 251 | L11373: | 111.11...1. | |
| 252 | L11374: | 1..11...1. | |
| 253 | L11375: | 11.1...11 | -> L1320 |
| 254 | L11376: | .......... | |
| 255 | L11377: | .1...1.... | -> L2400 |
| 0 | L12000: | ..1.1.1... | |
| 1 | L12001: | .1.1..11.. | |
| 2 | L12002: | .1.11...1. | |
| 3 | L12003: | ..1111.1.. | |
| 4 | L12004: | 11..1...11 | -> L2322 |
| 5 | L12005: | .1111.1.1. | |
| 6 | L12006: | 1..11.111. | |
| 7 | L12007: | ....1.111. | |
| 8 | L12010: | .1..1.1.1. | |
| 9 | L12011: | 111...111. | |
| 10 | L12012: | 1..111111. | |
| 11 | L12013: | .....1.111 | -> L2005 |
| 12 | L12014: | 111..1..11 | -> L2344 |
| 13 | L12015: | .....11.1. | |
| 14 | L12016: | 11..11..11 | -> L2314 |
| 15 | L12017: | 11.1..1111 | -> L2323 |
| 16 | L12020: | 11.11.1.1. | |

```
                    0 -> A[XS]
                    SHIFT LEFT A[W]
                    SHIFT LEFT A[W]
                    A EXCHANGE C[W]
                    C - 1 -> C[S]
                    C - 1 -> C[S]
          SKC6  :   C - 1 -> C[S]
                    IF NO CARRY GO TO SKC5
          SKC8  :   A + 1 -> A[M]
          SKC9  :   C EXCHANGE M
                    A EXCHANGE C[W]
          FIXIN :   C EXCHANGE M
                    RETURN
          SKC5  :   A + C -> A[M]
                    IF NO CARRY GO TO SKC6
          SKC10 :   A EXCHANGE C[WP]
                    3 -> P
                    LOAD CONSTANT 7
                    4 -> P
                    A - 1 -> A[M]
                    C + 1 -> C[S]
                    C + 1 -> C[S]
          SKC1  :   C + 1 -> C[S]
                    IF NO CARRY GO TO SKC2
                    A EXCHANGE C[W]
                    0 -> C[WP]
                    C -> A[M]
                    GO TO SKC7
          PROG2 :   C EXCHANGE M
                    IF A[XS] >= 1
                         THEN GO TO STFF10
                    SHIFT LEFT A[X]
                    SHIFT RIGHT A[W]
          STFF10:   C EXCHANGE M
          STFF  :   C + 1 -> C[M]
          STFF2 :   C EXCHANGE M
                    SHIFT RIGHT A[X]
                    JSB SKC
                    IF S11 # 1
                         THEN GO TO IKC12
                    GO TO LDIS
          LDIS50:   JSB FIX
                    GO TO LDIS51
          SKC   :   0 -> S11
                    C EXCHANGE M
                    A EXCHANGE C[W]
                    C EXCHANGE M
          SKC7  :   0 -> C[W]
                    4 -> P
                    A EXCHANGE C[WP]
                    IF C[M] >= 1
                         THEN GO TO SKC10
          SKC4  :   A EXCHANGE C[WP]
                    1 -> S11
                    GO TO SKC9
                    NO OPERATION
*****     FIX   :   SELECT ROM 2
          FIX   :   C EXCHANGE M
                    5 -> P
                    C - 1 -> C[P]
$$$$$               DELAYED SELECT ROM 1
                    GO TO @322
          HMS7  :   C + 1 -> C[X]
                    SHIFT RIGHT A[W]
                    0 -> B[W]
                    A -> B[X]
                    A + B -> A[W]
                    IF A[S] >= 1
                         THEN GO TO HMS7
                    GO TO HMS6
          HMS9  :   IF B[XS] = 0
                         THEN GO TO HMS4
                    GO TO HMS2
          CON4  :   A - 1 -> A[X]
```

```
17  L12021:  .11..11111  -> L2147
18  L12022:  .1...11...
19  L12023:  .1.1.11...
20  L12024:  ..11.11...
21  L12025:  .1.1.11...
22  L12026:  1...1.11...
23  L12027:  ..1...11...
24  L12030:  ..11.11...
25  L12031:  .111.11...
26  L12032:  .111...11  -> L2070
27  L12033:  11.11.1.1.
28  L12034:  ...1....11  -> L2020
29  L12035:  ...1.11...
30  L12036:  .....11...
31  L12037:  .1.1.11...
32  L12040:  .1.1.11...
33  L12041:  .....11...
34  L12042:  .1.1.11...
35  L12043:  .1.1.11...
36  L12044:  1....11...
37  L12045:  .1.1.11...
38  L12046:  ..11.11...
39  L12047:  ......11..
40  L12050:  ..11.11...
41  L12051:  ..111..111  -> L2071
42  L12052:  11....11..
43  L12053:  11.11.1.1.
44  L12054:  ..11.1111  -> L2033
45  L12055:  ...1.11...
46  L12056:  .111.11...
47  L12057:  .1..1.11...
48  L12060:  .1.1.11...
49  L12061:  ..11.11...
50  L12062:  ..1..11...
51  L12063:  1..1.11...
52  L12064:  ..1..11...
53  L12065:  .1.1.11...
54  L12066:  .1..1.11...
55  L12067:  .1.11.1.1.
56  L12070:  .1.11.1.1.
57  L12071:  1....11.1.
58  L12072:  1111...111  -> L2361
59  L12073:  11.11.1.1.
60  L12074:  .1....1.11  -> L2102
61  L12075:  ..1..11...
62  L12076:  .1.1.11...
63  L12077:  .1...11...
64  L12100:  .1111.1.1.
65  L12101:  ..111..111  -> L2071
66  L12102:  11.11.1.1.
67  L12103:  1111.1.111  -> L2365
68  L12104:  ..11.11...
69  L12105:  .....11...
70  L12106:  .1...11...
71  L12107:  1....11...
72  L12110:  ..111...11  -> L2070
73  L12111:  11.11.1.1.
74  L12112:  ..111.1111  -> L2073
75  L12113:  .1.1....1..
76  L12114:  ..111..111  -> L2071
77  L12115:  .1.11...1.
78  L12116:  .11.1....1.
79  L12117:  .1.1.1..11  -> L2124
80  L12120:  1...1.11...
81  L12121:  .1.1.1..11  -> L2124
82  L12122:  1......1..
83  L12123:  ....1.11...
84  L12124:  ..1111.1..
85  L12125:  1.....1.11  -> L2202
86  L12126:  ..........
87  L12127:  ..........
88  L12130:  11....11..
89  L12131:  ...111111.
90  L12132:  .111111111  -> L2177
91  L12133:  ...1111.1.
```

```
                IF NO CARRY GO TO CON5
LBMKG  : LOAD CONSTANT 4
         LOAD CONSTANT 5
         LOAD CONSTANT 3
         LOAD CONSTANT 5
         LOAD CONSTANT 9
         LOAD CONSTANT 2
         LOAD CONSTANT 3
         LOAD CONSTANT 7
         GO TO OUT2
CON3   : A - 1 -> A[X]
         IF NO CARRY GO TO CON4
BTUJ   : LOAD CONSTANT 1
         LOAD CONSTANT 0
         LOAD CONSTANT 5
         LOAD CONSTANT 5
         LOAD CONSTANT 0
         LOAD CONSTANT 5
         LOAD CONSTANT 5
         LOAD CONSTANT 8
         LOAD CONSTANT 5
         LOAD CONSTANT 3
         0 -> P
         LOAD CONSTANT 3
         GO TO OUT
CON2   : 12 -> P
         A - 1 -> A[X]
         IF NO CARRY GO TO CON3
DR     : LOAD CONSTANT 1
         LOAD CONSTANT 7
         LOAD CONSTANT 4
         LOAD CONSTANT 5
         LOAD CONSTANT 3
         LOAD CONSTANT 2
         LOAD CONSTANT 9
         LOAD CONSTANT 2
         LOAD CONSTANT 5
         LOAD CONSTANT 2
OUT1   : C - 1 -> C[X]
OUT2   : C - 1 -> C[X]
OUT : DELAYED SELECT GROUP 0
         GO TO @361
CON7   : A - 1 -> A[X]
         IF NO CARRY GO TO CON0
INMM   : LOAD CONSTANT 2
         LOAD CONSTANT 5
         LOAD CONSTANT 4
         C + 1 -> C[X]
         IF NO CARRY GO TO OUT
CON8   : A - 1 -> A[X]
         IF NO CARRY GO TO GALL
FTM    : LOAD CONSTANT 3
         LOAD CONSTANT 0
         LOAD CONSTANT 4
         LOAD CONSTANT 8
         GO TO OUT2
CON6   : A - 1 -> A[X]
         IF NO CARRY GO TO CON7
FC     : 1 -> S5
         GO TO OUT
RS2    : C - 1 -> C[P]
         IF C[P] = 0
             THEN GO TO EOF7
         LOAD CONSTANT 9
         GO TO EOF7
RS1    : 1 -> S8
         LOAD CONSTANT 1
$$$$$ EOF7 : DELAYED SELECT ROM 1
         GO TO @202
         NO OPERATION
         NO OPERATION
XFT0   : 12 -> P
         IF C[S] >= 1
             THEN GO TO ERR1
         IF C[XS] >= 1
```

```
 92  L12134:  .111111111   -> L2177
 93  L12135:  .11...111.
 94  L12136:  .1..1.111.
 95  L12137:  .1...1.11.
 96  L12140:  1..111..1.
 97  L12141:  1...1...11  -> L2210
 98  L12142:  11111.1.1.
 99  L12143:  ...1..1.1.
100  L12144:  1...1.1111  -> L2213
101  L12145:  .111111.1.
102  L12146:  1.1..11.11  -> L2254
103  L12147:  11.11.1.1.
104  L12150:  .1..1.111.  -> L2111
105  L12151:  .1....11..
106  L12152:  .1...11...
107  L12153:  .1...11...
108  L12154:  1....11...
109  L12155:  ...1.11...
110  L12156:  ..1..11...
111  L12157:  ...1.11...
112  L12160:  .11..11...
113  L12161:  ...1.11...
114  L12162:  .1.1.11...
115  L12163:  ..111..111  -> L2071
116  L12164:  .11..11...
117  L12165:  ...111..1.
118  L12166:  1..1...111  -> L2221
119  L12167:  ..........
120  L12170:  ..........
121  L12171:  ..........
122  L12172:  ..........
123  L12173:  ..1.1.1...
124  L12174:  1....11...
125  L12175:  .....11...
126  L12176:  .111.1.11.  -> L2164
127  L12177:  1....11.1.
128  L12200:  .1.1....11  -> L2120
129  L12201:  ......111.
130  L12202:  11..111111  -> L2317
131  L12203:  11...11...
132  L12204:  ..1..1.1..
133  L12205:  11.1...11  -> L2310
134  L12206:  1...11.1..
135  L12207:  .....1....  -> L0210
136  L12210:  11.11.1.1.
137  L12211:  .1.1111.11  -> L2136
138  L12212:  .111111111  -> L2177
139  L12213:  ..11..111.
140  L12214:  .1111....1
141  L12215:  1..1..111.
142  L12216:  .11111111.
143  L12217:  1...1.111.
144  L12220:  .........1
145  L12221:  1..1.1..11  -> L2224
146  L12222:  1.1..1..1.
147  L12223:  .1111.1.1.
148  L12224:  1.111.111.
149  L12225:  11.1....1.
150  L12226:  1..11.1.11  -> L2232
151  L12227:  .1....111.
152  L12230:  111..111..
153  L12231:  1..11..111  -> L2230
154  L12232:  11.1.1111.
155  L12233:  1.1...111.  -> L2241
156  L12234:  1.11..1.1.
157  L12235:  11111.111.
158  L12236:  .1111.1.1.
159  L12237:  111...111.
160  L12240:  1.1111111.  -> L2237
161  L12241:  11.11..1..
162  L12242:  .1.11..1..
163  L12243:  1.1....11  -> L2220
164  L12244:  .1.111111.
165  L12245:  1..1....11  -> L2220
166  L12246:  .1....111.
```

```
                        THEN GO TO ERR1
                  C -> A[W]
      XFT2    :   A -> B[W]
                  SHIFT LEFT A[MS]
                  IF A[WP] >= 1
                      THEN GO TO XFT1
                  A + 1 -> A[X]
                  IF A >= C[X]
                      THEN GO TO XFT3
                  C + 1 -> C[XS]
                  IF NO CARRY GO TO EOF
      CON5    :   A - 1 -> A[X]
                  IF NO CARRY GO TO CON6
      LBFN    :   LOAD CONSTANT 4
                  LOAD CONSTANT 4
                  LOAD CONSTANT 4
                  LOAD CONSTANT 8
                  LOAD CONSTANT 2
                  LOAD CONSTANT 2
                  LOAD CONSTANT 1
                  LOAD CONSTANT 6
                  LOAD CONSTANT 1
                  LOAD CONSTANT 5
                  GO TO OUT
      CO1     :   LOAD CONSTANT 6
$$$$$             DELAYED SELECT ROM 0
                  GO TO @221
                  NO OPERATION
                  NO OPERATION
                  NO OPERATION
                  NO OPERATION
      CO      :   C EXCHANGE M
                  8 -> P
                  LOAD CONSTANT 0
                  GO TO CO1
ERR1    :   DELAYED SELECT GROUP 0
                  GO TO @120
      HHMS    :   IF B[W] = 0
                      THEN GO TO EHMS0
                  12 -> P
                  B -> C[X]
                  GO TO HMS1
EHMS    :   DELAYED SELECT GROUP 0
*****             SELECT ROM 0
      XFT1    :   A - 1 -> A[X]
                  IF NO CARRY GO TO XFT2
                  GO TO ERR1
      XFT3    :   0 -> C[W]
                  C + 1 -> C[P]
                  SHIFT RIGHT C[W]
                  C + 1 -> C[S]
                  B EXCHANGE C[W]
      XFT10   :   IF B[P] = 0
                      THEN GO TO XFT8
                  SHIFT RIGHT B[WP]
                  C + 1 -> C[X]
      XFT8    :   0 -> A[W]
                  A - C -> A[P]
                  IF NO CARRY GO TO XFT4
                  SHIFT LEFT A[W]
      XFT5    :   A + B -> A[W]
                  IF NO CARRY GO TO XFT5
      XFT4    :   A - C -> A[S]
                  IF NO CARRY GO TO XFT6
                  SHIFT RIGHT A[WP]
                  A + 1 -> A[W]
                  C + 1 -> C[X]
      XFT7    :   A + B -> A[W]
                  IF NO CARRY GO TO XFT7
      XFT6    :   A EXCHANGE B[WP]
                  C - 1 -> C[P]
                  IF NO CARRY GO TO XFT10
                  C - 1 -> C[S]
                  IF NO CARRY GO TO XFT10
                  SHIFT LEFT A[W]
```

| | | |
|---|---|---|
| 167 | L12247: | .1..1.1.1. |
| 168 | L12250: | 111..1..1. |
| 169 | L12251: | ..11.1.11. |
| 170 | L12252: | 1111..111. |
| 171 | L12253: | 111.11.11. |
| 172 | L12254: | 1...11.1.. |
| 173 | L12255: | 1....11111 -> L2207 |
| 174 | L12256: | 1..1..1.1. |
| 175 | L12257: | .111..1..1 |
| 176 | L12260: | .11..1..1. |
| 177 | L12261: | 1..1..1.1. |
| 178 | L12262: | 1.1.11..1. |
| 179 | L12263: | 1.1.11..1. |
| 180 | L12264: | .1.1.1..1. |
| 181 | L12265: | .1..1.1.1. |
| 182 | L12266: | 11....1111 -> L2303 |
| 183 | L12267: | .....11.... |
| 184 | L12270: | 11.11.1.1. |
| 185 | L12271: | ..1.1.1.11 -> L2052 |
| 186 | L12272: | .111...1.. |
| 187 | L12273: | 1......111 -> L2201 |
| 188 | L12274: | 11....11.. |
| 189 | L12275: | .11.1...1. |
| 190 | L12276: | .1.1..1.11 -> L2122 |
| 191 | L12277: | 1....1.1.. |
| 192 | L12300: | .1.11.111 -> L2115 |
| 193 | L12301: | 1...1..1.. |
| 194 | L12302: | .1.1.1..11 -> L2124 |
| 195 | L12303: | 1111.1..1. |
| 196 | L12304: | 1..1..1.1. |
| 197 | L12305: | ...111..1. |
| 198 | L12306: | 11....1111 -> L2303 |
| 199 | L12307: | .....11.... |
| 200 | L12310: | .1111.1.1. |
| 201 | L12311: | .1111.1.1. |
| 202 | L12312: | ...1111.1. |
| 203 | L12313: | ....11.111 -> L2015 |
| 204 | L12314: | .....111.. |
| 205 | L12315: | .....1.11.. |
| 206 | L12316: | 11.1...111 -> L2321 |
| 207 | L12317: | ..1....111. |
| 208 | L12320: | 1....11.11 -> L2206 |
| 209 | L12321: | .1.11.1.1. |
| 210 | L12322: | 11..11..11 -> L2314 |
| 211 | L12323: | ..11..111. |
| 212 | L12324: | ..1....11. |
| 213 | L12325: | .1....1.1. |
| 214 | L12326: | 111..11.11 -> L2346 |
| 215 | L12327: | .....1111.. |
| 216 | L12330: | .....1111.. |
| 217 | L12331: | 1.11.....1 -> L2260 |
| 218 | L12332: | ......111. |
| 219 | L12333: | .....111.. |
| 220 | L12334: | 1.11.....1 -> L2260 |
| 221 | L12335: | .11...111. |
| 222 | L12336: | ..1...111. |
| 223 | L12337: | 11....11.. |
| 224 | L12340: | ..11...1.. |
| 225 | L12341: | 111..1..11 -> L2344 |
| 226 | L12342: | .1.11.1.1. |
| 227 | L12343: | .1....111. |
| 228 | L12344: | 111.1..11. |
| 229 | L12345: | 1....11.11 -> L2206 |
| 230 | L12346: | 1.111.111. |
| 231 | L12347: | 1.1.111..1 -> L2256 |
| 232 | L12350: | .....1111.. |
| 233 | L12351: | .....1111.. |
| 234 | L12352: | 1.1.111..1 -> L2256 |
| 235 | L12353: | .1....111. |
| 236 | L12354: | .111..111. |
| 237 | L12355: | 1.111.111. |
| 238 | L12356: | 1..1..1.1. |
| 239 | L12357: | 1111..111.. |
| 240 | L12360: | ..1...111. |
| 241 | L12361: | 1..111111. |

```
                    A -> B[X]
                    A + B -> A[WP]
                    0 -> C[MS]
                    A + C -> A[W]
                    A EXCHANGE C[MS]
***** EOF       :   DELAYED SELECT GROUP 0
                    GO TO 0207
      HMSD      :   SHIFT RIGHT C[WP]
                    A + C -> C[WP]
      HMSM      :   C -> A[WP]
                    SHIFT RIGHT C[WP]
                    C + C -> C[WP]
                    C + C -> C[WP]
                    A - C -> C[WP]
                    IF S4 # 1
                        THEN GO TO HMS8
                    RETURN
      CON1      :   A - 1 -> A[X]
                    IF NO CARRY GO TO CON2
                    1 -> S7
                    GO TO HHMS
      RS10      :   12 -> P
                    IF C[P] = 0
                        THEN GO TO RS1
                    IF S8 # 1
                        THEN GO TO RS2
                    0 -> S8
                    GO TO EOF7
      HMS8      :   A + C -> A[WP]
                    SHIFT RIGHT C[WP]
                    IF C[WP] >= 1
                        THEN GO TO HMS8
                    RETURN
      HMS1      :   C + 1 -> C[X]
                    C + 1 -> C[X]
                    IF C[XS] >= 1
                        THEN GO TO HMS9
      HMS4      :   P - 1 -> P
                    IF P # 0
                        THEN GO TO HMS3
      EHMS0     :   B -> C[W]
                    GO TO EHMS
      HMS3      :   C - 1 -> C[X]
                    IF NO CARRY GO TO HMS4
      HMS2      :   0 -> C[W]
                    B -> C[M]
      HHMS1     :   IF S4 # 1
                        THEN GO TO HMS5
                    P + 1 -> P
                    P + 1 -> P
                    JSB HMSM
                    P - 1 -> P
                    P - 1 -> P
                    JSB HMSM
                    C -> A[W]
                    B -> C[W]
                    12 -> P
                    IF A[P] >= 1
                        THEN GO TO HMS6
                    C - 1 -> C[X]
                    SHIFT LEFT A[W]
      HMS6      :   A EXCHANGE C[M]
                    GO TO EHMS
      HMS5      :   0 -> A[W]
                    JSB HMSD
                    P + 1 -> P
                    P + 1 -> P
                    JSB HMSD
                    SHIFT LEFT A[W]
                    A + C -> C[W]
                    0 -> A[W]
                    C -> A[X]
                    A + C -> A[W]
                    B -> C[W]
                    IF A[S] >= 1
```

| | | | | |
|---|---|---|---|---|
| 242 | L12362; | .....1.111 | -> L2005 | THEN GO TO HMS7 |
| 243 | L12363; | 111..1..11 | -> L2344 | GO TO HM06 |
| 244 | L12364; | ......... | | NO OPERATION |
| 245 | L12365; | ..11.11... | | GALL : LOAD CONSTANT 3 |
| 246 | L12366; | .111.11... | | LOAD CONSTANT 7 |
| 247 | L12367; | 1....11... | | LOAD CONSTANT 6 |
| 248 | L12370; | .1.1.11... | | LOAD CONSTANT 5 |
| 249 | L12371; | .1....11... | | LOAD CONSTANT 4 |
| 250 | L12372; | ...1.11... | | LOAD CONSTANT 1 |
| 251 | L12373; | ...1.11... | | LOAD CONSTANT 1 |
| 252 | L12374; | .111.11... | | LOAD CONSTANT 7 |
| 253 | L12375; | 1....11... | | LOAD CONSTANT 8 |
| 254 | L12376; | ..1..11... | | LOAD CONSTANT 4 |
| 255 | L12377; | ..111..111 | -> L2071 | GO TO OUT |
| | | | | |
| 0 | L13000; | ..111..111 | -> L3071 | GO TO CLX2 |
| 1 | L13001; | 1..1....11 | -> L3220 | WAT6 : GO TO WAT5 |
| 2 | L13002; | ..111..111 | -> L3071 | GO TO CLX2 |
| 3 | L13003; | ..111..111 | -> L3071 | GO TO CLX2 |
| 4 | L13004; | ..111..111 | -> L3071 | GO TO CLX2 |
| 5 | L13005; | .....11111 | -> L3007 | DEL15 : GO TO DEL14 |
| 6 | L13006; | ..111..111 | -> L3071 | GO TO CLX2 |
| 7 | L13007; | ....1..111 | -> L3011 | DEL14 : GO TO DEL13 |
| 8 | L13010; | ..111..111 | -> L3071 | GO TO CLX2 |
| 9 | L13011; | ....11.111 | -> L3015 | DEL13 : GO TO DEL12 |
| 10 | L13012; | ..111..111 | -> L3071 | GO TO CLX2 |
| 11 | L13013; | ..111..111 | -> L3071 | GO TO CLX2 |
| 12 | L13014; | ..111..111 | -> L3071 | GO TO CLX2 |
| 13 | L13015; | ...1.1.111 | -> L3025 | DEL12 : GO TO DEL11 |
| 14 | L13016; | ..111..111 | -> L3071 | GO TO CLX2 |
| 15 | L13017; | .11..1.1.. | | CLX1 : IF S6 # 1 |
| 16 | L13020; | .......111 | -> L3001 | THEN GO TO WAT6 |
| 17 | L13021; | .11.....11 | -> L3140 | GO TO STOP |
| 18 | L13022; | ..1111..11 | -> L3074 | SIX : GO TO SIX1 |
| 19 | L13023; | .11111.111 | -> L3175 | FIV : GO TO FIV1 |
| 20 | L13024; | .111111111 | -> L3177 | FOU : GO TO FOU1 |
| 21 | L13025; | ....11..111 | -> L3031 | DEL11 : GO TO DEL10 |
| 22 | L13026; | ..111..111 | -> L3071 | GO TO CLX2 |
| 23 | L13027; | 1..1.11... | | NIN1 : LOAD CONSTANT 9 |
| 24 | L13030; | 11..1..111 | -> L3311 | GO TO PROC |
| 25 | L13031; | ...111..111 | -> L3035 | DEL10 : GO TO DEL9 |
| 26 | L13032; | 1....111 | -> L3201 | THR : GO TO THR1 |
| 27 | L13033; | 1111..1.11 | -> L3362 | TWO : GO TO TWO1 |
| 28 | L13034; | 1111.1..11 | -> L3364 | ONE : GO TO ONE1 |
| 29 | L13035; | ..1....111 | -> L3041 | DEL9 : GO TO DEL8 |
| 30 | L13036; | ..111..111 | -> L3071 | GO TO CLX2 |
| 31 | L13037; | 1.....11... | | EIG1 : LOAD CONSTANT 8 |
| 32 | L13040; | 11..1..111 | -> L3311 | GO TO PROC |
| 33 | L13041; | ..1.1..111 | -> L3045 | DEL8 : GO TO DEL7 |
| 34 | L13042; | 1...1..11 | -> L3210 | RS : GO TO RS1 |
| 35 | L13043; | ..111..111 | -> L3071 | GO TO CLX2 |
| 36 | L13044; | 1111.11.11 | -> L3366 | ZER : GO TO ZER1 |
| 37 | L13045; | ..1..11111 | -> L3047 | DEL7 : GO TO DEL6 |
| 38 | L13046; | ..111..111 | -> L3071 | GO TO CLX2 |
| 39 | L13047; | ..1.1..111 | -> L3051 | DEL6 : GO TO DEL5 |
| 40 | L13050; | ..111..111 | -> L3071 | GO TO CLX2 |
| 41 | L13051; | ..1.11.111 | -> L3055 | DEL5 : GO TO DEL4 |
| 42 | L13052; | ..111..111 | -> L3071 | GO TO CLX2 |
| 43 | L13053; | ..111..111 | -> L3071 | GO TO CLX2 |
| 44 | L13054; | ..111..111 | -> L3071 | GO TO CLX2 |
| 45 | L13055; | ..11...111 | -> L3061 | DEL4 : GO TO DEL3 |
| 46 | L13056; | ..111..111 | -> L3071 | GO TO CLX2 |
| 47 | L13057; | .111.11... | | SEV1 : LOAD CONSTANT 7 |
| 48 | L13060; | 11..1..111 | -> L3311 | GO TO PROC |
| 49 | L13061; | ..11.1.111 | -> L3065 | DEL3 : GO TO DEL2 |
| 50 | L13062; | ...1.11111 | -> L3027 | NIN : GO TO NIN1 |
| 51 | L13063; | ...1111111 | -> L3037 | EIG : GO TO EIG1 |
| 52 | L13064; | ..1.111111 | -> L3057 | SEV : GO TO SEV1 |
| 53 | L13065; | 1.1..11.11 | -> L3246 | DEL2 : GO TO DEL1 |
| 54 | L13066; | ..111..111 | -> L3071 | GO TO CLX2 |
| 55 | L13067; | ..11.....1.. | | CLX3 : 1 -> S6 |
| 56 | L13070; | 1.111.111. | | CLX : 0 -> ACW1 |
| 57 | L13071; | ....1111.1 | -> L3017 | CLX2 : JSB CLX1 |
| 58 | L13072; | 1...11..11 | -> L3214 | EEX : GO TO EEX1 |

| | | | |
|---|---|---|---|
| 59 | L13073: | ...111..111 | -> L3071 |
| 60 | L13074: | .11..11... | |
| 61 | L13075: | 11...11..111 | -> L3311 |
| 62 | L13076: | ..111..111 | -> L3071 |
| 63 | L13077: | ...1.111. | |
| 64 | L13100: | .11...111 | |
| 65 | L13101: | ...11..111 | |
| 66 | L13102: | .1.11..11. | |
| 67 | L13103: | 1.....11.. | |
| 68 | L13104: | .11..11... | |
| 69 | L13105: | ...11..... | |
| 70 | L13106: | .1..1.11.. | |
| 71 | L13107: | .1...1..11 | -> L3104 |
| 72 | L13110: | .....11... | |
| 73 | L13111: | 1...11.11. | |
| 74 | L13112: | ..1..1.11 | |
| 75 | L13113: | .11111111 | |
| 76 | L13114: | 1..1.1..11 | |
| 77 | L13115: | .1111.1.1 | |
| 78 | L13116: | 1..111111 | |
| 79 | L13117: | ..11.11111 | -> L3067 |
| 80 | L13120: | 1..1111.1 | -> L3351 |
| 81 | L13121: | 111.1..111 | -> L3351 |
| 82 | L13122: | 111.1.1.1. | |
| 83 | L13123: | 111...1.11 | -> L3342 |
| 84 | L13124: | 1..11..111 | |
| 85 | L13125: | 1..11..111 | |
| 86 | L13126: | 1..11..111 | |
| 87 | L13127: | 1..11..111 | |
| 88 | L13130: | 1..11.1..1 | |
| 89 | L13131: | 1..11.1..1 | |
| 90 | L13132: | .111..11.. | |
| 91 | L13133: | ...1....1. | |
| 92 | L13134: | ..11.11111 | -> L3067 |
| 93 | L13135: | .1.1..11.. | |
| 94 | L13136: | ...1.....1. | |
| 95 | L13137: | ..11.11111 | -> L3067 |
| 96 | L13140: | .11.....1. | |
| 97 | L13141: | 11111....1 | -> L3370 |
| 98 | L13142: | 1...1..1. | |
| 99 | L13143: | ....1..1. | |
| 100 | L13144: | .....111.. | |
| 101 | L13145: | 1.111.11.. | |
| 102 | L13146: | .11..1..11 | -> L3144 |
| 103 | L13147: | .....1.1. | |
| 104 | L13150: | 1.....1111 | -> L3203 |
| 105 | L13151: | 1....1.1. | |
| 106 | L13152: | .11...1111 | -> L3143 |
| 107 | L13153: | ..11.1.... | |
| 108 | L13154: | 1..1.1..1 | -> L3222 |
| 109 | L13155: | .1..1.111. | |
| 110 | L13156: | ..11.....1. | |
| 111 | L13157: | 1..111.... | |
| 112 | L13160: | 111.1.111. | |
| 113 | L13161: | 1.11111... | |
| 114 | L13162: | 111.1.111. | |
| 115 | L13163: | 1..1.1..1 | -> L3220 |
| 116 | L13164: | 111.1.111. | |
| 117 | L13165: | 1.1111.... | |
| 118 | L13166: | 111.1.111. | |
| 119 | L13167: | .1111..1. | |
| 120 | L13170: | .11.111111 | -> L3157 |
| 121 | L13171: | ..1...111. | |
| 122 | L13172: | .1....1... | -> L3173 |
| 123 | L13173: | 111111.1.1 | -> L3375 |
| 124 | L13174: | 1.1.1..111 | -> L3251 |
| 125 | L13175: | .1..1.11.. | |
| 126 | L13176: | 11..1..111 | -> L3311 |
| 127 | L13177: | .1...11... | |
| 128 | L13200: | 11..1..111 | -> L3311 |
| 129 | L13201: | .11.11.... | |
| 130 | L13202: | 11..1..111 | -> L3311 |
| 131 | L13203: | 1......1. | |
| 132 | L13204: | 1.111..1. | |
| 133 | L13205: | 1.11.1..1. | |

```
              GO TO CLX2
SIX1  :  LOAD CONSTANT 6
         GO TO PROC
         GO TO CLX2
INIT  :  0 -> B[W]
INIT9 :  C -> A[W]
         0 -> C[W]
         C - 1 -> C[M]
         8 -> P
INIT4 :  LOAD CONSTANT 6
         LOAD CONSTANT 0
         IF P # 4
             THEN GO TO INIT4
         LOAD CONSTANT 0
         B EXCHANGE C[MS]
         B -> C[MS]
         C + 1 -> C[S]
         SHIFT RIGHT C[MS]
         C + 1 -> C[X]
         IF A[S] >= 1
             THEN GO TO CLX3
         IF A[XS] >= 1
             THEN GO TO INIT1
         A - 1 -> A[X]
         IF NO CARRY GO TO INIT2
OKDP  :  SHIFT RIGHT A[W]
         SHIFT RIGHT A[W]
         SHIFT RIGHT A[W]
         SHIFT RIGHT A[W]
         SHIFT RIGHT A[WP]
         SHIFT RIGHT A[WP]
         7 -> P
         IF A >= C[P]
             THEN GO TO CLX3
         5 -> P
         IF A >= C[P]
             THEN GO TO CLX3
STOP  :  1 -> S6
         JSB TSTBLK
WATS  :  0 -> S8
WAT1  :  0 -> S0
WAT2  :  P - 1 -> P
         IF P # 11
             THEN GO TO WAT2
WAT4  :  IF S0 # 1
             THEN GO TO WAT3
         IF S8 # 1
             THEN GO TO WAT1
         KEYS -> ROM ADDRESS
EXIT  :  JSB OUT
         A -> B[W]
         0 -> C[P]
EXIT1 :  C -> DATA ADDRESS
         A EXCHANGE C[W]
         DATA -> C
         A EXCHANGE C[W]
         JSB OUT
         A EXCHANGE C[W]
         C -> DATA
         A EXCHANGE C[W]
         C + 1 -> C[P]
         IF NO CARRY GO TO EXIT1
         B -> C[W]
*****  DONE :  SELECT ROM 2
       EEX2 :  JSB SEE1
               GO TO STAR
       FIV1 :  LOAD CONSTANT 5
               GO TO PROC
       FOU1 :  LOAD CONSTANT 4
               GO TO PROC
       THR1 :  LOAD CONSTANT 3
               GO TO PROC
       WAT3 :  1 -> S8
               0 -> S11
               IF S11 # 1
```

```
134  L13206:  .11.11..11  -> L3154
135  L13207:  .11...1111  -> L3143
136  L13210:  .11...1.1.
137  L13211:  .11....11   -> L3140
138  L13212:  .....11.1.
139  L13213:  .....1.111  -> L3005
140  L13214:  1....1.111.
141  L13215:  ..111.1.1.
142  L13216:  1....1.111.
143  L13217:  .11..1.1.
144  L13220:  .1111.1111  -> L3173
145  L13221:  .11....11   -> L3140
146  L13222:  .11.....11..
147  L13223:  1...11.111.
148  L13224:  1..1.11111  -> L3227
149  L13225:  1.11...11..
150  L13226:  .....11....
151  L13227:  1..11...1.
152  L13230:  1..1.1.111  -> L3225
153  L13231:  ..11..11..
154  L13232:  ..1....1.1.
155  L13233:  .1....1.1.
156  L13234:  .1.....111.
157  L13235:  .1....111.
158  L13236:  11111.1.1.
159  L13237:  11...11..
160  L13240:  .1.....11.
161  L13241:  1..11...1.
162  L13242:  1..1.1.111  -> L3225
163  L13243:  11.11.1.1.
164  L13244:  1....1.1..
165  L13245:  1.1.....11  -> L3240
166  L13246:  11......11  -> L3304
167  L13247:  1.1111....
168  L13250:  111.1.111.
169  L13251:  ....1..11..
170  L13252:  111111..1.
171  L13253:  1111....11  -> L3360
172  L13254:  .1....11..
173  L13255:  11111....1.
174  L13256:  .....1.111  -> L3005
175  L13257:  .1.1..11..
176  L13260:  11111...1.
177  L13261:  ...1.....1.
178  L13262:  1.11.1.11   -> L3264
179  L13263:  ...11..111  -> L3031
180  L13264:  1..11...1.
181  L13265:  .11...11..
182  L13266:  11111....1.
183  L13267:  .1..1.111   -> L3045
184  L13270:  .111..11..
185  L13271:  11111....1.
186  L13272:  ...1.....1.
187  L13273:  1.1111.111  -> L3275
188  L13274:  ..11.1.111  -> L3065
189  L13275:  1.111..1..
190  L13276:  1......11..
191  L13277:  11111....1.
192  L13300:  11.111..11  -> L3334
193  L13301:  1...1..11..
194  L13302:  11111....1.
195  L13303:  11.11111.1  -> L3337
196  L13304:  .111..1.1.
197  L13305:  11.1.1111   -> L3323
198  L13306:  1.11..11..
199  L13307:  ....11.1..
200  L13310:  ..11.1....
201  L13311:  1..111....
202  L13312:  111.1.111.
203  L13313:  .11..1.1.
204  L13314:  1.1..11111  -> L3247
205  L13315:  1.11111...
206  L13316:  11....11..
207  L13317:  ...11...1.
208  L13320:  .1......11  -> L3100
```

```
                    THEN GO TO EXIT
                    GO TO WAT1
    RS1    : IF S6 # 1
                    THEN GO TO STOP
    START  : CLEAR STATUS
             GO TO DEL15
    EEX1   : B EXCHANGE C[W]
             0 - C - 1 -> C[X]
             B EXCHANGE C[W]
             IF S6 # 1
    WAT5   :        THEN GO TO EEX2
             GO TO STOP
    OUT    : 12 -> P
             IF A[W] >= 1
                    THEN GO TO OUT5
    OUT2   : 11 -> P
             RETURN
    OUT5   : IF A[P] >= 1
                    THEN GO TO OUT2
             3 -> P
             SHIFT LEFT A[WP]
             SHIFT LEFT A[WP]
             SHIFT LEFT A[W]
             SHIFT LEFT A[W]
             A + 1 -> A[X]
             12 -> P
    OUT1   : SHIFT LEFT A[M]
             IF A[P] >= 1
                    THEN GO TO OUT2
             A - 1 -> A[X]
             DISPLAY OFF
             GO TO OUT1
    DEL1   : GO TO TEST
    PROC1  : C -> DATA
    OHNO   : A EXCHANGE C[W]
    STAR   : 1 -> P
             A + 1 -> A[WP]
             IF NO CARRY GO TO NOCARY
             4 -> P
             A + 1 -> A[P]
             IF NO CARRY GO TO DEL15
             5 -> P
             A + 1 -> A[P]
             IF A >= C[P]
                    THEN GO TO CARRY1
             GO TO DEL19
    CARRY1 : 0 -> A[P]
             6 -> P
             A + 1 -> A[P]
             IF NO CARRY GO TO DEL7
             7 -> P
             A + 1 -> A[P]
             IF A >= C[P]
                    THEN GO TO CARRY2
             GO TO DEL2
    CARRY2 : 0 -> A[P]
             8 -> P
             A + 1 -> A[P]
             IF NO CARRY GO TO LOOP
             9 -> P
             A + 1 -> A[P]
             JSB OOPS
    TEST   : IF S7 # 1
                    THEN GO TO WATR
             11 -> P
             CLEAR STATUS
             KEYS -> ROM ADDRESS
    PROC   : C -> DATA ADDRESS
             A EXCHANGE C[W]
             IF S6 # 1
                    THEN GO TO PROC1
             DATA -> C
             12 -> P
             IF C[P] >= 1
                    THEN GO TO INIT9
```

```
209  L13321:  111.1.111.
210  L13322:  .11.....11       -> L3140
211  L13323:  ....1..1..
212  L13324:  .....1.1..
213  L13325:  11.11.1.11       -> L3332
214  L13326:  1....1.1..
215  L13327:  111....111       -> L3341
216  L13330:  .111...1..
217  L13331:  .......111       -> L3001
218  L13332:  1......1..
219  L13333:  111....111       -> L3341
220  L13334:  1.1...11..
221  L13335:  .....111..
222  L13336:  1...1.11..
223  L13337:  11.111.111       -> L3335
224  L13340:  .......111       -> L3001
225  L13341:  111.....11       -> L3340
226  L13342:  .1...1.11.
227  L13343:  11.11.1.1.
228  L13344:  ..11.11111       -> L3067
229  L13345:  .1.1.1..11       -> L3124
230  L13346:  1..111.11.
231  L13347:  111.1..111       -> L3351
232  L13350:  ..111...11       -> L3070
233  L13351:  1.11.1.11.
234  L13352:  11111.1.1.
235  L13353:  111..11.11       -> L3346
236  L13354:  .1.1.1..11       -> L3124
237  L13355:  1...11.1..
238  L13356:  ...1....11       -> L3020
239  L13357:  ..........
240  L13360:  11111....1       -> L3370
241  L13361:  ....11..111      -> L3031
242  L13362:  ..1..11...
243  L13363:  11..1..111       -> L3311
244  L13364:  ...1.11...
245  L13365:  11..1..111       -> L3311
246  L13366:  ......11...
247  L13367:  .11..1..111      -> L3311
248  L13370:  1...1..11.
249  L13371:  1..11....1.
250  L13372:  1111111.11       -> L3376
251  L13373:  1...1....1.
252  L13374:  ..1......1.
253  L13375:  .....11....
254  L13376:  .....1....1.
255  L13377:  111111.111       -> L3375
```

```
             A EXCHANGE C[W]
             GO TO STOP
WATR     :   0 -> S0
             IF S0 # 1
                 THEN GO TO CLK1
             IF S8 # 1
                 THEN GO TO WAT8
             1 -> S7
CLK2     :   GO TO WAT6
CLK1     :   1 -> S8
WAT9     :   GO TO WAT8
LOOP     :   10 -> P
OVER     :   P - 1 -> P
             IF P # 8
OOPS     :       THEN GO TO OVER
WAT7     :   GO TO WAT6
WAT8     :   GO TO WAT7
INIT2    :   SHIFT LEFT A[MS]
             A - 1 -> A[X]
             IF NO CARRY GO TO CLX3
             GO TO OKDP
INIT3    :   IF A[MS] >= 1
                 THEN GO TO INIT1
             GO TO CLX
INIT1    :   SHIFT RIGHT A[MS]
             A + 1 -> A[X]
             IF NO CARRY GO TO INIT3
             GO TO OKDP
*****  IN    :   DELAYED SELECT GROUP 0
             GO TO 0020
             NO OPERATION
NOCARY   :   JSB TSTBLK
             GO TO DEL10
TWO1     :   LOAD CONSTANT 2
             GO TO PROC
ONE1     :   LOAD CONSTANT 1
             GO TO PROC
ZER1     :   LOAD CONSTANT 0
             GO TO PROC
TSTBLK   :   9 -> P
             IF A[P] >= 1
                 THEN GO TO SEE
BLIND    :   B EXCHANGE C[P]
             B -> C[P]
SEE1     :   RETURN
SEE      :   0 -> B[P]
             GO TO SEE1
```

I claim:
1. A programmable calculator having a program mode and a run mode comprising:
   input means having keys for generating keycodes corresponding to numeric data and instruction legends denoting operations to be performed by the calculator;
   a first memory unit coupled to the input means for storing generated keycodes;
   a second memory unit having stored microinstructions and being coupled to the input means;
   a computing unit coupled to the input means and the first and second memory units for performing operations employing microinstructions stored in the second memory unit in response to keycodes from the input means and the first memory unit when the calculator is in the run mode and for storing keycodes from the input means at data locations corresponding to program line numbers in the first memory unit when the calculator is in the program mode and being responsive to the calculator being turned on for storing selected information at all locations corresponding to program line numbers in the first memory unit; and output display means coupled to the computing unit for displaying the results of operations performed by the calculator when the calculator is in the run mode and for displaying a key code corresponding to an actuated key and a number corresponding to a program line number when the calculator is in the program mode.

2. A programmable calculator as in claim 1 wherein the selected information corresponds to a branch instruction to a location corresponding to a selected program line number.

3. A programmable calculator as in claim 2 wherein the selected program line number is the program line number corresponding to the first line of a program.

4. A programmable calculator as in claim 3 wherein the computing unit in response to the calculator being turned on stores at said selected program line number information causing the calculator to stop performing operations, the calculator being in the run mode and the computing unit performing a plurality of operations defined by and in a sequence determined by keycodes stored in the first memory unit at locations corresponding to line numbers.

5. A programmable calculator as in claim 2 wherein one of said keys is operable when the calculator is in the run mode for causing the computing unit to perform a plurality of operations defined by and in a sequence determined by generated keycodes stored in the first memory unit at locations corresponding to program line numbers, said generated keycodes having been stored in the first memory with the calculator being in the program mode.

6. A programmable calculator as in claim 2 wherein one of said keys is operable when the calculator is in the run mode for causing the computing unit to stop performing operations in response to key codes stored in the first memory unit, said keycodes having been stored in the first memory with the calculator being in the program mode.

7. A programmable calculator as in claim 2 wherein one of said keys is operable when the calculator is in the program mode for causing the computing unit to access generated keycodes at a line number corresponding to a next following line number and for causing the output display means to display said next following line number and the keycode stored thereat.

8. A programmable calculator as in claim 2 wherein one of said keys is operable when the calculator is in the program mode for causing the computing unit to access a data location within the first memory corresponding to a next following line number and storing at said data location the keycode associated with said key.

9. A programmable calculator as in claim 2 wherein one of said keys is operable when the calculator is in the program mode for causing the computing unit to access a keycode at a line number corresponding to a next preceding line number and for causing the output display means to display said next preceding line number and the key code stored thereat.

10. A programmable calculator as in claim 2 wherein one of said keys is operable when the calculator is in the run mode for causing the computing unit to access a data location within the first memory where a line number is stored and causing the computing unit to replace said line number with a new line number in response to actuation of at least one key corresponding to the new line number.

11. A programmable calculator as in claim 2 wherein one of said keys is operable when the calculator is in the program mode for causing the computing unit to access a location within the first memory, said location being determined by further actuation of at least one of said keys corresponding to a branch instruction destination line number.

12. A programmable calculator as in claim 2 wherein one of said keys is operable when the calculator is in the program mode for causing the computing unit to access encoded information at a data location within the first memory corresponding to a next line number only if a condition corresponding to the actuated key is satisfied.

13. A calculator comprising:
an input unit having a plurality of keys;
an encoder unit coupled to the input unit for generating a keycode corresponding to the actuated key;
a first memory unit coupled to the encoder unit for storing keycodes;
a second memory unit having stored microinstructions and being coupled to the encoder unit;
a computing unit, coupled to the encoder unit and the first and second memory units for performing operations employing microinstructions stored in the second memory unit in response to keycodes from the encoder unit and the first memory unit; and
output display means coupled to the computing unit for displaying the results of operations performed by the calculator in a first display format and for automatically altering the display format in response to a selected display condition to a second display format.

14. A calculator as in claim 13 wherein the first display format is a fixed decimal display format.

15. A calculator as in claim 14 wherein the fixed decimal display is determined by actuation of one of said plurality of keys followed by actuation of one of said plurality of keys corresponding to the number of digits to be displayed.

16. A calculator as in claim 13 wherein the second display format is a scientific notation format.

17. A calculator as in claim 13 wherein the second format is a flashing display.

18. A calculator as in claim 17 wherein the selected condition is an attempted illegal operation.

19. A calculator as in claim 13 wherein the selected display condition is a number to be displayed which is too large in magnitude for the first display format.

20. A calculator as in claim 13 wherein the selected display condition is a number to be displayed which is too small in magnitude for the first display format.

21. A programmable calculator comprising:
an input unit having a plurality of keys;
an encoder unit coupled to the input unit for generating a keycode corresponding to an actuated key;
a first memory unit coupled to the encoder unit for storing keycodes;
a second memory unit having stored microinstructions and being coupled to the encoder unit;
a computing unit, coupled to the encoder unit and the first and second memory units for performing operations employing microinstructions stored in the second memory unit in response to keycodes from the encoder unit and the first memory unit and for storing keycodes from the encoder unit corresponding to a branch instruction at a data location corresponding to a single program line number in the first memory unit; and
output display means for displaying the results of operations performed by the calculator.

* * * * *